(12) United States Patent
Muramatsu et al.

(10) Patent No.: US 9,221,686 B2
(45) Date of Patent: Dec. 29, 2015

(54) CARBON MATERIAL AND METHOD FOR PRODUCING SAME

(75) Inventors: Kazuo Muramatsu, Kobe (JP); Masahiro Toyoda, Oita (JP)

(73) Assignee: INCUBATION ALLIANCE, INC., Kobe-shi (JP)

( * ) Notice: Subject to any disclaimer, the term of this patent is extended or adjusted under 35 U.S.C. 154(b) by 354 days.

(21) Appl. No.: 13/577,536

(22) PCT Filed: Feb. 18, 2011

(86) PCT No.: PCT/JP2011/053535
§ 371 (c)(1),
(2), (4) Date: Aug. 7, 2012

(87) PCT Pub. No.: WO2011/102473
PCT Pub. Date: Aug. 25, 2011

(65) Prior Publication Data
US 2012/0315482 A1  Dec. 13, 2012

(30) Foreign Application Priority Data

Feb. 19, 2010 (JP) .................. 2010-035466
Sep. 28, 2010 (JP) .................. 2010-216523
Nov. 25, 2010 (JP) .................. 2010-262449

(51) Int. Cl.
*D01F 9/12* (2006.01)
*C01B 31/04* (2006.01)
(Continued)

(52) U.S. Cl.
CPC ............ *C01B 31/04* (2013.01); *B01J 3/002* (2013.01); *B01J 3/03* (2013.01); *B01J 19/02* (2013.01);
(Continued)

(58) Field of Classification Search
USPC ..................... 264/29.1, 29.6, 29.7
IPC .... C04B 35/524,35/6224, 35/62281, 35/62889, C04B 35/62839, 35/6455, 2235/422; C01B 31/04, 31/02; H01G 11/34, 11/42; H01M 4/587; D01F 9/08, 9/127
See application file for complete search history.

(56) References Cited

U.S. PATENT DOCUMENTS

| 5,186,919 A | 2/1993 | Bunnell |
| 2006/0055303 A1 | 3/2006 | Liu et al. |
| 2012/0012796 A1 | 1/2012 | Chen et al. |

FOREIGN PATENT DOCUMENTS

| CN | 101174683 A | 5/2008 |
| CN | 101176181 | 5/2008 |

(Continued)

OTHER PUBLICATIONS

Kamiya, Kan-ichi, et al., "Effect of Pressure on Graphitization of Carbon IV. Abrupt Graphitization of Hard Carbon under 5 kbar," Bulletin of the Chemical Society of Japan, vol. 41, No. 9 (1968), pp. 2169-2172.

(Continued)

*Primary Examiner* — Mathieu Vargot
(74) *Attorney, Agent, or Firm* — Kratz, Quintos & Hanson, LLP

(57) ABSTRACT

There are provided a cluster of thin sheet graphite crystals or the like which is useful as an electrode material for lithium ion batteries, hybrid capacitors and the like, and a method for efficiently producing the same at high productivity. The method is one for producing a cluster of thin sheet graphite crystals composed of aggregates in such a state that thin sheet graphite crystals extend from the inside toward the outside, comprising charging a powdery and/or particulate material of an organic compound pre-baked to an extent of containing remaining hydrogen in a graphite vessel, and subjecting the powdery and/or particulate material together with the vessel to hot isostatic pressing treatment (HIP treatment) using a compressed gas atmosphere under the predetermined conditions.

7 Claims, 32 Drawing Sheets

Figure 1:
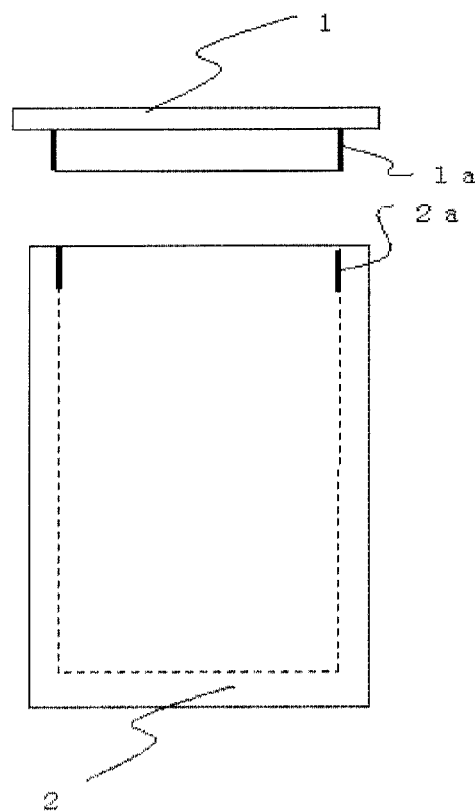

(51) Int. Cl.
- *H01G 11/34* (2013.01)
- *H01G 11/42* (2013.01)
- *H01M 4/587* (2010.01)
- *C01B 31/02* (2006.01)
- *C04B 35/524* (2006.01)
- *C04B 35/622* (2006.01)
- *C04B 35/628* (2006.01)
- *C04B 35/634* (2006.01)
- *C04B 35/645* (2006.01)
- *D01F 9/08* (2006.01)
- *D01F 9/127* (2006.01)
- *B01J 19/02* (2006.01)
- *B01J 3/00* (2006.01)
- *B01J 3/03* (2006.01)
- *B82Y 30/00* (2011.01)
- *H01G 11/50* (2013.01)
- *H01G 11/06* (2013.01)

(52) U.S. Cl.
CPC .......... *B82Y 30/00* (2013.01); *C01B 31/02* (2013.01); *C04B 35/524* (2013.01); *C04B 35/6224* (2013.01); *C04B 35/62281* (2013.01); *C04B 35/62839* (2013.01); *C04B 35/62889* (2013.01); *C04B 35/62892* (2013.01); *C04B 35/63476* (2013.10); *C04B 35/6455* (2013.01); *D01F 9/08* (2013.01); *D01F 9/127* (2013.01); *H01G 11/34* (2013.01); *H01G 11/42* (2013.01); *H01G 11/50* (2013.01); *H01M 4/587* (2013.01); *B01J 2219/0272* (2013.01); *C04B 2235/422* (2013.01); *C04B 2235/6582* (2013.01); *H01G 11/06* (2013.01); *Y02E 60/13* (2013.01); *Y10T 428/2982* (2015.01)

(56) References Cited

FOREIGN PATENT DOCUMENTS

| CN | 101474898 A | 7/2009 |
| CN | 101746755 A | 6/2010 |
| EP | 757374 * | 2/1997 |
| EP | 2 436 648 A1 | 4/2012 |
| JP | 62-049363 | 10/1987 |
| JP | 63-256434 | 10/1988 |
| JP | 02-051412 | 2/1990 |
| JP | 7-33420 | 2/1995 |
| JP | 2526408 | 6/1996 |
| JP | 2514134 | 7/1996 |
| JP | 2633638 | 4/1997 |
| JP | 2664819 | 6/1997 |
| JP | 3065896 | 5/2000 |
| JP | 2007-533581 A1 | 11/2007 |
| WO | WO 2010/137592 A1 | 12/2010 |
| WO | 2011/054305 A1 | 5/2011 |

OTHER PUBLICATIONS

Teranishi, Yoshikazu, et al., "Interior graphitization of furan resin-derived carbon by hot isostatic pressing," Materials Science and Engineering, vol. B, No. 148 (2008), pp. 270-272.
Knieke, C., et al., "Delamination of Graphite Sheets in Stirred Media Mills," Conference Proceedings, Aiche Annual Meeting, American Institute of Chemical Engineers, No. 255 (2008), pp. 1-3.
Partial Supplementary European Search Report dated Nov. 24, 2014 in the corresponding European patent application No. 11744759.9-1351.
Sumio Iijima: "Helical microtubules of graphitic carbon", Letters to Nature, vol. 354, Nov. 7, 1991, pp. 56-58.
Candace K. Chan et al.: "High-performance lithium battery anodes using silicon nanowires", Nature Nanotechnology, vol. 3, Jan. 2008, pp. 31-35.
Michio Inagaki: "Standardization of terminology related to carbon materials 2 Terminology on graphite intercalcation compounds", Sep. 1989, (10 pages).
Chinese Office Action dated Sep. 18, 2014, in the corresponding Chinese patent application No. 201180010173.6, with a partial English translation.
First Office Action issued Jan. 6, 2014 from the State Intellectual Property Office of People's Republic of China in counterpart application No. 201180010173.6 with partial English translation.
International Preliminary Report on Patentability issued for International Application No. PCT/JP2011/053535 dated Sep. 18, 2012.
International Search Report for International Application No. PCT/JP2011/053535 dated May 24, 2011.
Supplementary European Search Report, for the Corresponding EP Application No. 11744759, mailed on Apr. 7, 2015.
Hernandez, at al., High-yield production of graphene by liquid-phase exfoliation of graphite, Nature Nanotechnology, Aug. 10, 2008, pp. 563-568, vol. 3, Nature Publishing Group, London, GB.
Chinese Office Action, for the Corresponding CN Application No. 201410216364.3, mailed on Jul. 28, 2015, with partial translation.

* cited by examiner

Felt-like product

Graphite crucible body

Top cover of graphite crucible

JED-2200 Results of analysis

| Element | (keV) | Mass% | Tolerance % | No. of atoms % | K |
|---|---|---|---|---|---|
| C K | 0.277 | 34.63 | 0.10 | 46.72 | 8.3733 |
| O K | 0.525 | 35.72 | 0.15 | 36.18 | 34.9195 |
| Si K | 1.739 | 29.65 | 0.04 | 17.11 | 56.7072 |
| Total | | 100.00 | | 100.00 | |

CARBON MATERIAL AND METHOD FOR PRODUCING SAME

TECHNICAL FIELD

The present invention relates to novel structures and production methods of an artificial graphite material and a composite material of an artificial graphite material and artificial silicon (Si) which are used on electrode materials, diffusion layer and radiating materials for lithium ion battery, lithium ion capacitor, fuel cell, solar cell, primary battery, second battery, steel making, refining and electrolysis, crucible for crystal growth of crystalline silicon and silicon carbide, insulating material, reactor for nuclear electric power generation and adding material for conductive film and semiconductor film.

BACKGROUND ART

Graphite materials are chemically stable and are excellent in electric and thermal conductivity and mechanical strength at high temperature, and therefore, are widely used for electrodes for steel making, electrodes for arc melting and reducing of high purity silica and electrodes for aluminum refining. Graphite has a crystal structure formed by stacking of carbon hexagonal planes generated by growth of carbon hexagonal rings by sp2 hybridized orbital of carbon atoms, and is classified into a hexagonal system and rhombohederal system depending on the form of lamination. The both systems show good electric and thermal conductivity since a carrier concentration and carrier mobility of free electron and holes in the carbon hexagonal planes are high.

On the other hand, since the carbon hexagonal planes are weakly bonded to each other by so-called Van der Waals force, slip occurs relatively easily between the planes, and as a result, graphite has lower strength and hardness as compared with those of metallic materials and has self-lubricating property.

Since natural graphite produced naturally is a polycrystalline material, breakdown occurs at an interface of crystal grains and natural graphite is produced in a flaky form, not in a massive form having sufficient hardness and strength. Therefore, generally natural graphite is classified by its particle size and is used as an aggregate (filler).

On the other hand, in order to use graphite in various applications mentioned above by making use of excellent characteristics thereof, it is necessary to produce a graphite structure having practicable strength and hardness. Since it is difficult to obtain such a structure from natural graphite alone, various so-called artificial graphite materials have been developed and put into practical use.

(General Method for Producing Artificial Graphite Materials)

Artificial graphite materials are produced by mixing a filler as an aggregate and a binder and subjecting the mixture to molding, baking for carbonization and graphitization treatment. It is essential that both of the filler and the binder remain as carbon after the baking for carbonization so as to give high carbonization yield, and a suitable filler and binder are selected depending on applications.

A pre-baked petroleum coke, a pre-baked pitch coke, a natural graphite, a pre-baked anthracite, a carbon black and the like are used as a filler. These fillers are kneaded with coal tar pitch, coal tar, a polymer resin material, or the like and molded into a desired form by extruding, casting, pressing or the like method.

A molded material is baked for carbonization at a temperature of 1000° C. or more in an inert atmosphere and then baked at a high temperature of 2500° C. or more for developing a graphite crystal structure and graphitizing. During the baking for carbonization, the starting material are subject to decomposition, and moisture, carbon dioxide, hydrogen, and hydrocarbon gases are generated from component elements other than carbon such as hydrogen and nitrogen, and therefore, the baking is controlled to be a low temperature elevating rate, and generally a very long period of time of 10 to 20 days for heating up and 5 to 10 days for cooling, totally 15 to 30 days is necessary for production.

Graphitization process is carried out by electric heating with a large-sized oven such as an Acheson electrical resistance oven. Also in the graphitization process, a period of time of 2 to 7 days for electric heating and 14 days for cooling, totally 16 to 21 days is necessary. Totally about two months is required for production including preparation of a staring material, molding, baking for carbonization and graphitization. (Non-patent Document 1)

In general artificial graphite, a filler added in a molding step is easily formed evenly in a certain direction and crystallinity is enhanced as carbonization and graphitization proceed. Therefore, anisotropy tends to be increased and as a result, a bulk density and a mechanical strength tend to be decreased.

Both of the filler and binder to be used are hydrocarbon substances to be carbonized after heat treatment and are roughly classified into easily graphitizable materials to be easily graphitized due to a chemical structure thereof and hardly graphitizable materials hardly graphitized due to crosslinking of a benzene ring in a structure thereof.

(Method for Producing High Density Isotropic Graphite Material)

Examples of means for achieving high density are to use a filler capable of being easily graphitized such as mesocarbon microbeads comprising extracted matter of mesophase, gilsonite coke or carbon beads, and then to adjust particle size distribution thereof, to enhance compatibility thereof with a binder pitch, or to repeat impregnation treatment thereof. Also, in order to impart isotropic property, application of isotropic pressure with cold isostatic pressing equipment at the molding stage is effective and is a general method. In order to further increase a density, a process for impregnating the material with a binder pitch again after the graphitization and repeating the graphitization treatment has been carried out, but in this process, a total period of time required for production is as extremely long as 2 to 3 months.

In the case of use for electrode materials and nuclear power application, purity of a graphite material is critical, and it is necessary to carry out a treatment for securing high purity with halogen gas such as chlorine gas at a temperature of as high as around 2000° C. By the treatment for securing high purity, a concentration of impurities is decreased from about several hundreds ppm to about several ppm.

A starting material to be used for producing general artificial graphite and high density isotropic graphite is in a liquid or solid form. In molding, carbonizing and graphitizing processes, a liquid phase-solid phase reaction or a solid phase reaction proceeds predominantly. These hydrocarbon based materials expand its benzene ring network due to dissipation of elements such as hydrogen, oxygen and nitrogen therefrom, and approximates a graphite crystal structure by growth and stacking of carbon hexagonal planes. Particularly in the graphitization process, which is a solid phase reaction, an extremely long reaction time at a temperature of as high as 2500° C. or more is required.

In the case of artificial graphite and high density isotropic graphite, the graphitization proceeds in a liquid phase or a solid phase, and therefore even if heat treatment is carried out for a long period of time at a temperature of as high as 3000° C. or more, complete crystallization (graphitization) is difficult, a density of the graphite does not reach a theoretical density of 2.26 g/cm$^3$, and there is a limit in a crystallite size thereof.

(Heat Treatment of Polymer Resin Material)

In the case of a carbon fiber produced using a resin such as polyacrylonitrile (PAN), coal or petroleum pitch as a starting material, such starting materials of a polymer material are draw into a fiber and then carbonized and graphitized in the following heat treatment. In addition, a highly oriented graphite film having high crystallinity can be produced by depositing or applying boron, rare earth element or a compound thereof to a polyimide film or a carbonized polyimide film, laminating a plurality of films and then carrying out baking while applying pressure to the film surface in the vertical direction thereof at a temperature of 2000° C. or more in an inert atmosphere. However, an upper limit of the film thickness is several millimeters. (Patent Document 1)

(Method for Producing Graphite Material by Vapor Phase Growth)

There is a method for producing carbon and a graphite material through vapor phase growth by using hydrocarbon and hydrogen gas as starting materials and a reactor such as CVD (Chemical Vapor Deposition) equipment and bringing the starting materials into contact with a metal catalyst at high temperature. Examples of carbon materials to be produced by vapor phase growth are a vapor-phase-grown carbon fiber, a carbon nanotube, a carbon nanohorn, fullerene and the like.

In the case of a vapor-phase-grown carbon fiber, by suspending an oxide of transition metal having a size of several hundreds angstrom in a solvent such as an alcohol and spraying the solvent onto a substrate and drying it, the substrate carrying a catalyst is produced. This substrate is put in a reactor and a hydrocarbon gas is flowed thereinto at a temperature of about 1000° C., thus growing a carbon fiber from the surface of the transition metal on the substrate by vapor phase reaction. Alternatively there is a case of letting a mixture of a gas of organic transition metal compound and a hydrocarbon gas flow into a reactor of about 1000° C. (Patent Document 2)

A graphitized fiber is obtained by subsequently heat-treating the carbon fiber obtained by vapor phase growth at high temperature of 2000° C. or more in an oven for graphitization treatment. (Patent Document 3) In order to produce a graphitized fiber directly by vapor phase growth, a reaction temperature of around 2000° C. is required. However, in such a temperature range, a transition metal as a catalyst is liquefied and vaporized, and a function of the catalyst is not exhibited. Therefore, generally graphitization is carried out separately after carbonization at low temperature.

(Carbon Nanotube)

A carbon nanotube is a very minute substance having an outer diameter of the order of nanometer and comprising cylindrical shape carbon hexagonal plane having a thickness of several atomic layers, which was found in 1991. (Non-patent Document 1) It is known that this carbon nanotube exists in a deposit generated on a negative electrode due to arc discharge of a carbon material such as a graphite, and this carbon nanotube is produced by using a carbon material such as a graphite as a positive electrode and a heat resistant conductive material as a negative electrode and carrying out arc discharge while adjusting a gap between the positive electrode and the negative electrode in response to growth of a deposit on a negative electrode. (Patent Document 4)

A carbon nanotube is generated by arc discharge. However, a large-sized reactor is required and yield obtained is extremely low, and therefore, a mass production method has been studied. Generally in arc discharge of carbon to be used for production of a nanotube, plasma in a state of carbon molecular species such as C, C2 and C3 being contained is generated in a reactor fully filled with an inert gas, and, in the next stage, these carbon molecular species are solidified into soot, fullerene, a nanotube or a high density solid. Therefore, yield of nanotube is increased by optimizing a partial pressure of gases in a chamber and a plasma temperature. (Patent Document 5)

(Method for Precipitating Highly Oriented Graphite in Glassy Carbon)

In JP 2633638 B (Patent Document 6), it is disclosed that a graphite in the form of like bean jam of Monaka of a Japanese-style confection is precipitated in a glassy carbon by means of molding a thermosetting resin into a thick plate by hot press or the like, forming the resin into a glassy carbon by carbonization treatment and subsequently subjecting the glassy carbon to hot isostatic pressing treatment. In this method, it is necessary to control thickness of the glassy carbon to about 6 mm in order to enable baking and also necessary to break a shell of the glassy carbon after generation of graphite in order to take out a graphite precipitate.

(Composite Material of Artificial Graphite and Artificial Silicon (Si))

Si as a negative electrode material for a lithium ion battery can occlude Li of about ten times larger amount than graphite can. However, since such occlusion results in expansion of the volume by about three times, any electrode made of it in the form of particle, thin film or wafer is broken by such expansion. Such being the case, it is difficult to put Si into practical use as a negative electrode material for a battery. However, it was found that by forming Si into one-dimensional shape having a size of sub-micron (one-dimensional shape nano-silicon material, for example, Si nano-wire, Si nano-rod, etc.), resistance against expansion and breakage could be increased (Non-patent Document 2).

(Intercalation Compound)

A graphene layer can hold either of electron or hole as a carrier, and therefore, it can form any of intercalation compounds of electron-accepting acceptor type and electron-donating donor type. Many of such intercalation compounds have been researched and developed so far in a graphite having many laminated graphene layers and are known as graphite intercalation compounds (Non-patent Document 3).

PRIOR ART DOCUMENTS

Patent Documents

Patent Document 1: JP 3065896 B
Patent Document 2: JP 62-49363 B
Patent Document 3: JP 2664819 B
Patent Document 4: JP 2526408 B
Patent Document 5: JP 2541434 B
Patent Document 6: JP 2633638 B Non-Patent Documents Non-patent Document 1: Nature, 354: pp. 56-58, 1991
Non-patent Document 2: Nature nanotechnology, 3: p. 31, 2008
Non-patent Document 3: Michio Inagaki, Carbon 1989 (No. 139)

DISCLOSURE OF THE INVENTION

Problem to be Solved by the Invention

In the case of producing a graphite material having good crystallinity (degree of graphitization) and being in the form of mass, block, cylinder, polygonal rod or sheet, a material once carbonized need to be graphitized at high temperature of about 3000° C. for a long period of time in a solid phase reaction. Therefore, productivity is remarkably low and cost is high. In order to allow the graphitization to proceed in a solid phase, it has been difficult to obtain complete crystallinity of graphite in an industrially applicable processing time for graphitization. In addition, in order to obtain a high density graphite material, it is necessary to control an orientation of carbon hexagonal planes at the carbonization stage so that the graphitization should proceed even in a solid phase reaction. Further there is a problem that steps for preparing a starting material, molding and carbonizing are complicated and troublesome, productivity is very low and metal impurities remain in the graphite material.

Also, in electrodes of secondary batteries such as lithium ion batteries and hybrid capacitors and electrodes and diffuser panels of fuel cells, a porous graphite panel or sheet having a high open pore ratio is required. However, when a porous article is made of an artificial graphite material, strength of the material cannot be maintained, and therefore, it is necessary to pulverize the material into a powdery and/or particulate form, to form it into slurry and then to coat the slurry on a metal plate or the like.

In the method for producing vapor-phase-grown carbon fibers using hydrocarbon gas as a starting material, the fibers can be produced by a relatively easy process. However, it is necessary to provide a vapor phase reaction chamber (reactor) and graphitizing treatment is required separately, and therefore, there is a problem that equipment cost increases greatly in a mass production. In addition, an obtained material is in the form of fiber having a diameter of 1 mm or less, and therefore, in order to obtain a graphite material with a desired shape having a sufficient strength, it is necessary to combine with a binder by impregnation or to mold together with a resin or to conduct carbonization and graphitization again. Further, since a metal catalyst is an essential material for generation of fibers, it is necessary to remove the added catalytic metal in order to achieve a highly purity.

Also, in the case of nanocarbon materials such as a carbon nanotube, fullerene and carbon nanohorn, yield is extremely low, and in order to use them as a structural component, it is necessary to combine with a polymer material as an additive and then conduct carbonization and graphitization again or coating of slurry and drying.

In the method for producing a highly oriented graphite by treating a polyimide resin at high pressure (application of direct pressure on a material in a vertical direction thereto) at high temperature, there are problems that there is a limit in a thickness of a producible product, anisotropy is large and strength is very low.

In the method for precipitating highly oriented graphite inside a thick glassy carbon material by hot isostatic pressing treatment, it is difficult to bake a dense glassy carbon into a thickness of 10 mm or more, and further, since it is necessary to take out precipitated graphite by breaking a shell of a glassy carbon, there is a problem that a large in size or porous graphite cannot be obtained.

As mentioned above, in the methods for carbonization and graphitization in a solid phase using a liquid or solid starting material in the conventional methods for producing graphite materials, there is a problem that (1) in order to develop carbon hexagonal planes (graphite crystal structure), a very long period of time of about two months is required at a maximum ultimate temperature of about 3000° C., (2) a complete graphite crystal structure cannot be obtained, (3) even if a complete graphite crystal structure is obtained, anisotropy is high and strength is low (being strong in a plane direction but low in a thickness direction), and (4) it is difficult to produce a porous article having a large open pore ratio.

In the method for allowing carbonization and graphitization to proceed in a gaseous phase (including radical in plasma) by using a gaseous or solid starting material or for producing a material mainly comprising a graphite crystal structure such as a carbon nanotube, graphene, fullerene, a carbon nanofiber and a carbon nanohorn, there are problems that a reactor is required, production efficiency is very low, a mass production is difficult, and it is difficult to directly produce a material of a large size in a form such as a mass, block, cylinder, polygonal rod or plate.

Since a conventional method for producing Si nano material (Si nano-wire, Si nano-rod, etc.) of one-dimensional shape is a method for synthesizing them on a substrate carrying a catalyst such as Au, In or Sn, purity of the obtained target product is low and there is a problem that productivity is low and cost is high.

Means to Solve the Problem

The inventors of the present invention have made intensive study and as a result, have found a first aspect of the present invention such that a cluster of thin sheet graphite crystals which is composed of aggregation in such a state that thin sheet graphite crystals extend from the inside toward the outside (hereinafter also referred to simply as "a cluster of thin sheet graphite crystals of the present invention") can be produced by charging the powdery and/or particulate material of an organic compound pre-baked to an extent of containing remaining hydrogen (pre-baked starting material) in a closed vessel made of heat resistant material (for example, a vessel made of graphite) and subjecting the powdery and/or particulate material together with the vessel to hot isostatic pressing treatment (HIP treatment) under the predetermined conditions, and have found that such a cluster of thin sheet graphite crystals is useful as electrode materials for lithium ion batteries and hybrid capacitors and the method for production thereof is high in efficiency and productivity, and have completed the present invention.

Further, the inventors of the present invention have found a second aspect of the present invention such that a nano-silicon (Si) material (Si nano-wire and Si nano-rod in a fibrous form) of one-dimensional shape is produced at the same time as the production of the above-mentioned cluster of thin sheet graphite crystals by mixing a silicon powder to the pre-baked starting material, and subjecting the mixture together with the vessel to the HIP treatment by adjusting a maximum ultimate temperature in the HIP treatment to a temperature (about 1320° C.) being close to the melting point of Si or more, and have completed the present invention.

Furthermore, the inventors of the present invention have found a third aspect of the present invention such that thin sheet graphite crystals (for example, multiple-layer graphene having high crystallinity and a thickness of about 10 nm or less, especially multiple-layer graphene having a thickness of about 3.5 nm (about 10 layers) or less) and/or wrinkled and shrunk thin sheet graphite crystals and/or roll-shaped thin sheet graphite crystals that are suitable for preparing a transparent conductive film can be produced by pulverizing a mass of thin sheet graphite crystals composed of aggregates of thin sheet graphite crystals as a starting material, dispersing the pulverized resultant in a solvent, subjecting the dispersion to ultrasonic wave treatment and centrifuging, collecting a supernatant therefrom, and distilling off the solvent from the supernatant, and have completed the present invention.

Namely, the present invention relates to:

(1) a method for producing a cluster of thin sheet graphite crystals composed of aggregates in such a state that thin sheet graphite crystals extend from the inside toward the outside, comprising preparing a powdery and/or particulate material of an organic compound pre-baked to an extent of containing remaining hydrogen, charging the powdery and/or particulate material in a closed vessel made of heat resistant material, and subjecting the powdery and/or particulate material together with the vessel to hot isostatic pressing treatment using a compressed gas atmosphere, wherein a maximum ultimate temperature in the hot isostatic pressing treatment is 900° C. or more and lower than 2000° C., (2) the production method of above (1), wherein the maximum ultimate temperature is 1000° C. or more and lower than 2000° C., (3) the production method of above (1) or (2), wherein the closed vessel made of heat resistant material is a closed vessel made of graphite.

(4) the production method of any of above (1) to (3), wherein an amount of the remaining hydrogen is not less than 6500 ppm, (5) the production method of any of above (1) to (3), wherein a pre-baking temperature is 1000° C. or lower, (6) the production method of any of above (1) to (5), wherein the closed vessel made of graphite is of triangular screw-capped type having an open pore ratio of less than 20%, (7) the production method of any of above (1) to (6), wherein the organic compound is one or more selected from the group consisting of starch, cellulose, protein, collagen, alginic acid, dammar, kovar, rosin, gutta-percha, natural rubber, cellulose resin, cellulose acetate, cellulose nitrate, cellulose acetate butyrate, casein plastic, soybean protein plastic, phenol resin, urea resin, melamine resin, benzoguanamine resin, epoxy resin, diallyl phthalate resin, unsaturated polyester resin, bisphenol A type epoxy resin, Novolac type epoxy resin, polyfunctional epoxy rein, alicyclic epoxy resin, alkyd resin, urethane resin, polyester resin, vinyl chloride resin, polyethylene, polypropylene, polystyrene, polyisoprene, butadiene, nylon, vinylon, acrylic fiber, rayon, polyvinyl acetate, ABS resin, AS resin, acrylic resin, polyacetal, polyimide, polycarbonate, modified polyphenylene ether, polyarylate, polysulfone, polyphenylene sulfide, polyether ether ketone, fluorine-containing resin, polyamide imide, silicon resin, petroleum pitch, coal pitch, petroleum coke, coal coke, carbon black, activated carbon, waste plastic, waste PET bottle, waste wood, waste plants and garbage, (8) the production method of any of above (1) to (7), wherein the powdery and/or particulate material of an organic compound is a phenol resin having an average particle size of less than 100 μm, (9) the production method of any of above (1) to (8), wherein hot isostatic pressing treatment is carried out in such a state that a part or the whole of periphery of the pre-baked powdery and/or particulate material of an organic compound charged in the closed vessel made of graphite is covered with a spacer and a sleeve,

(10) the production method of above 9, wherein the spacer and the sleeve are made of one or more selected from the group consisting of glassy carbon, diamond-like carbon and amorphous carbon,

(11) the production method of any of above (1) to (10), wherein one or more carbon materials selected from the group consisting of carbon fiber, natural graphite, artificial graphite, glassy carbon and amorphous carbon are mixed to the pre-baked powdery and/or particulate material of an organic compound,

(12) a method for producing a cluster of graphite crystals, in which the thin sheet graphite crystals are partly cleaved, comprising preparing an intercalation compound of graphite composed of, as a host material, the cluster of thin sheet graphite crystals produced by the method of any of above (1) to (11), and subjecting the intercalation compound to rapid heating.

(13) a cluster of thin sheet graphite crystals composed of aggregates in such a state that thin sheet graphite crystals extend from the inside toward the outside,

(14) a cluster of thin sheet graphite crystals obtained by partly cleaving the thin sheet graphite crystals of the cluster of thin sheet graphite crystals of above (13),

(15) a method for producing a nano-silicon material of one-dimensional shape, comprising preparing a powdery and/or particulate material of an organic compound pre-baked to an extent of containing remaining hydrogen, mixing a silicon powder thereto, charging the mixture in a closed vessel made of heat resistant material, and subjecting the mixture together with the vessel to hot isostatic pressing treatment using a compressed gas atmosphere, wherein a maximum ultimate temperature in the hot isostatic pressing treatment is 1320° C. or more and lower than 2000° C.,

(16) a method for producing a graphite-silicon composite material, comprising a cluster of thin sheet graphite crystals composed of aggregates in such a state that thin sheet graphite crystals extend from the inside toward the outside and a nano-silicon material of one-dimensional shape, the method comprises preparing a powdery and/or particulate material of an organic compound pre-baked to an extent of containing remaining hydrogen, mixing a silicon powder thereto, charging the mixture in a closed vessel made of heat resistant material, and subjecting the mixture together with the vessel to hot isostatic pressing treatment using a compressed gas atmosphere, wherein a maximum ultimate temperature in the hot isostatic pressing treatment is 1320° C. or more and lower than 2000° C.,

(17) the production method of above (15) or (16), wherein the maximum ultimate temperature is 1350° C. or more and 1800° C. or less,

(18) the production method of any of above (15) to (17), wherein the silicon powder is one having a particle size of less than 500 μm,

(19) a graphite-silicon composite material comprising a cluster of thin sheet graphite crystals composed of aggregates in such a state that thin sheet graphite crystals extend from the inside toward the outside and a nano-silicon material of one-dimensional shape,

(20) a method for producing thin sheet graphite crystals and/or wrinkled and shrunk graphite crystals thereof and/or roll-shaped graphite crystals thereof which are dispersed in a solvent, comprising dispersing in a solvent a pulverized resultant of mass of thin sheet graphite crystals composed of aggregates of thin sheet graphite crystals, subjecting the dispersion to ultrasonic wave treatment and centrifuging, and then collecting a supernatant therefrom,

(21) a method for producing thin sheet graphite crystals and/or wrinkled and shrunk graphite crystals thereof and/or roll-shaped graphite crystals thereof, comprising distilling off the solvent from the thin sheet graphite crystals dispersed and/or wrinkled and shrunk graphite crystals thereof and/or roll-shaped graphite crystals thereof of above (20) which are dispersed in a solvent,

(22) the production method of above (20) or (21), wherein the mass of thin sheet graphite crystals composed of aggregates of thin sheet graphite crystals is a cluster of thin sheet graphite crystals composed of aggregates in such a state that thin sheet graphite crystals extend from the inside toward the outside,

(23) thin sheet graphite crystals and/or wrinkled and shrunk graphite crystals thereof and/or roll-shaped graphite crystals thereof which are dispersed in a solvent and comprise multi-layer graphene having a thickness of not more than 10 nm,

(24) thin sheet graphite crystals and/or wrinkled and shrunk graphite crystals thereof and/or roll-shaped graphite crystals thereof which comprise multi-layer graphene having a thickness of not more than 10 nm,

(25) the production method of any of above (1) to (10), wherein silicon, silicon oxide, titanium oxide or zinc oxide is mixed to the pre-baked powdery and/or particulate material of an organic compound,

(26) the cluster of thin sheet graphite crystals of above (13), wherein silicon is dispersed uniformly,

(27) the cluster of thin sheet graphite crystals of above (13), wherein titanium oxide is dispersed uniformly, and

(28) the cluster of thin sheet graphite crystals of above (13), wherein zinc oxide is dispersed uniformly.

Effect of the Invention

According to the method for producing the cluster of thin sheet graphite crystals in the first aspect of the present invention, it is possible to produce an artificial graphite material having excellent crystallinity, and graphite particles and graphite structures which, being useful for fuel cells, capacitors, etc, are isotropic in total while keeping high crystallinity and therefore have been hardly produced. It is also possible to shorten a period of time required for producing an artificial graphite material from 2 or 3 months to several hours, thus enhancing productivity to a great extent. As a result, cost can be reduced, which expedites cost reduction in applications such as fuel cells and capacitors where a percentage of carbon material cost in the total cost is high, and, therefore, the applications are expected to be widespread.

In the present invention, since graphite is produced by vapor-phase growth, it is possible to design and produce a wide range of high density and porous graphite mass having an ideal graphite crystal structure and crystallite size. Also, it is possible to produce a thin material in which edge portions of the carbon hexagonal planes face toward the plane direction (For obtaining a thin material, it is carbon hexagonal planes that have been aligned in the plane direction so far). Therefore, it is possible to provide a thin material having an ideal structure as electrode materials for batteries using a generation reaction of a graphite intercalation compound such as lithium ion batteries and hybrid capacitors. Further, it is possible to produce and provide an ideal material in applications such as a diffuser panel requiring graphite materials having a proper open pore ratio, good fuel gas permeability, high crystallinity of graphite, high conductivity, high purity and high strength.

According to the second aspect of the present invention, it is possible to produce, as an electrode material, a nano-silicon material of one-dimensional shape having increased resistance to expansion and breakage and a graphite-silicon composite material comprising such a nano-silicon material of one-dimensional shape and a cluster of thin sheet graphite crystals, under catalyst-free condition without a substrate, at high productivity and/or at low cost. Moreover, any of the cluster of thin sheet graphite crystals and the nano-silicon material of one-dimensional shape which constitute the obtained nano-silicon material or graphite-silicon composite material is high in purity. Therefore, electrode materials and the like having high performance can be provided.

According to the third aspect of the present invention, it is possible to efficiently produce thin sheet graphite crystals, and/or wrinkled and shrunk graphite crystals thereof and/or roll-shaped graphite crystals thereof. Moreover, these thin sheet graphite crystals, and/or wrinkled and shrunk graphite crystals thereof and/or roll-shaped graphite crystals thereof are useful for a transparent conductive film, a conductive film, heat-conductive film and an adding material therefor.

BRIEF DESCRIPTION OF THE DRAWINGS (FIG. 1) A cross-sectional view showing a structure of a graphite crucible in the embodiment of the present invention.

Figure 2:
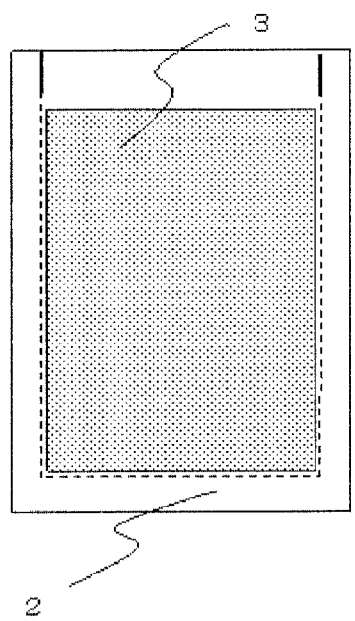

(FIG. 2) A cross-sectional view showing a structure of a graphite crucible in the embodiment of the present invention with a pre-baked starting material being charged therein.

Figure 3:
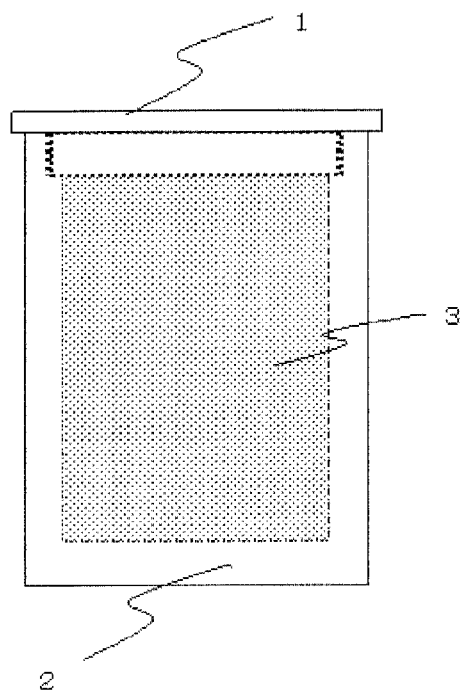

(FIG. 3) A cross-sectional view showing a structure of a graphite crucible in the embodiment of the present invention with a pre-baked starting material being charged therein and the crucible being sealed.

(FIG. 4) A cross-sectional view showing a structure of a graphite crucible in the embodiment of the present invention, in which the whole of the top and bottom of the pre-baked starting material 3 is covered with spacers and the crucible is sealed.

Figure 5:
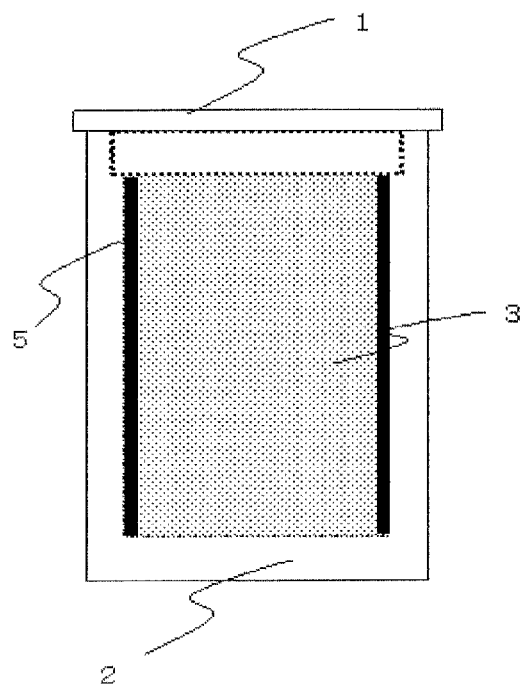

(FIG. 5) A cross-sectional view showing a structure of a graphite crucible in the embodiment of the present invention, in which the whole of the side of the pre-baked starting material 3 are covered with a sleeve and the crucible is sealed.

(FIG. 6) A cross-sectional view showing a structure of a graphite crucible in the embodiment of the present invention, in which the whole of the bottom, top and side of the pre-baked starting material 3 are covered with spacers and a sleeve and the crucible is sealed.

(FIG. 7) A diagrammatic (cross-sectional) view explaining a mechanism of generation of vapor-phase-grown graphite on the surface of the pre-baked starting material in the embodiment of the present invention.

(FIG. 8) A crystal orientation of carbon hexagonal planes in a graphite crystal structure.

(FIG. 9) A diagrammatic view explaining a mechanism of the vapor-phase-grown graphite of the present invention growing outward (approximately radially) from the surface of the pre-baked starting material in the direction of "a" axis of graphite crystal.

(FIG. 10) A diagrammatic (cross-sectional) view according to the embodiment of the present invention showing generation of a vapor-phase-grown graphite around the powdery and/or particulate material of the pre-baked starting material in various forms.

(FIG. 11) A diagrammatic view showing a mechanism of anisotropic generation and growth of a conventional graphite material.

(FIG. 12) A diagrammatic view according to the embodiment of the present invention showing a mechanism of isotropic growth of the vapor-phase-grown graphite from the surface of the pre-baked starting material.

(FIG. 13) A diagrammatic view (cross-section) according to the embodiment of the present invention showing a mechanism of generation of vapor-phase-grown graphite on an outer surface and inside of spherical pre-baked starting material.

(FIG. 14) A diagrammatic view (cross-section) according to the embodiment of the present invention showing a mechanism of generation of vapor-phase-grown graphite and a bulky graphite structure on an outer surface of spherical pre-baked starting material.

(FIG. 15) An electron micrograph showing a surface of the product of Sample No. 1 in Example 1.

Figure 15:
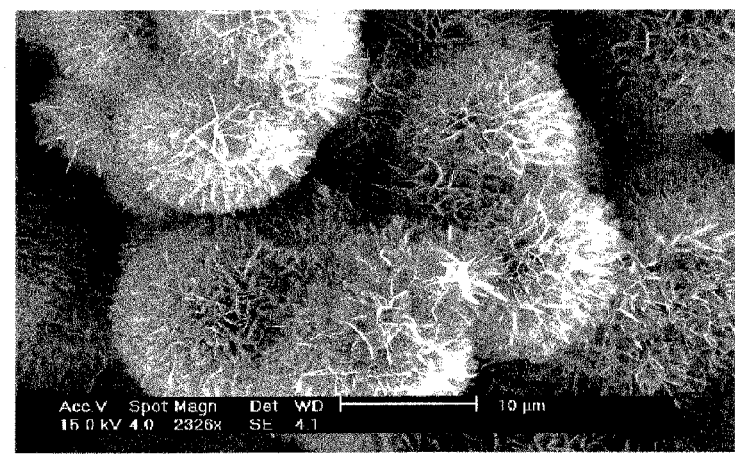

(FIG. 16) A photograph showing a high magnification image of FIG. 15.

(FIG. 17) An electron micrograph showing a broken surface of the product of Sample No. 1 in Example 1.

(FIG. 18) An electron micrograph showing a broken surface of the product of Sample No. 5 in Example 1.

(FIG. 19) An electron micrograph showing a broken surface of the product of Sample No. 6 in Example 1.

(FIG. 20) Measuring result of Raman spectroscopic spectrum of Sample No. 1 in Example 1.

(FIG. 21) Measuring result of Raman spectroscopic spectrum of Sample No. 5 in Example 1.

(FIG. 22) An electron micrograph showing a surface of the product of Example 2.

Figure 22:
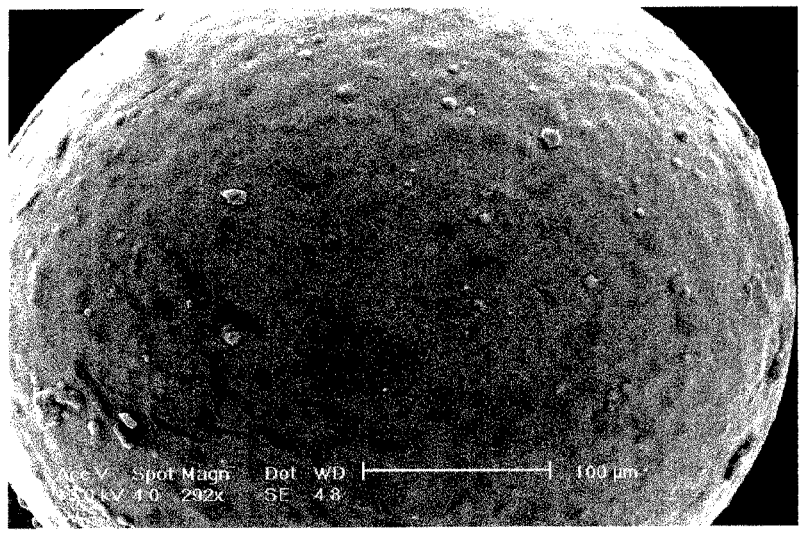

(FIG. 23) A photograph showing a high magnification image of FIG. 22. A bar in this photograph represents 2 µm.

(FIG. 24) An electron micrograph showing a surface of the product of Example 3. A bar in this photograph represents 20 µm.

(FIG. 25) A photograph by a scanning electron microscope (SEM) of the sample obtained in Example 8. Vapor-phase-grown graphite is slightly generated on the surface of the spherical pre-baked starting material, and carbon nanotubes are also observed.

(FIG. 26) A photograph by SEM of the sample obtained in Example 8. In the photograph, white ones are silicon and are kept in a state of particles.

(FIG. 27) A photograph showing an appearance of the sample subjected to pressing and heating in Example 9. The photograph shows the inside of the opened graphite crucible body and the inner surface of the top cover of the graphite crucible. As shown therein, white portions are products in the form of felt and black portions are composite materials of vapor-phase-grown graphite and fibrous silicon compound.

(FIG. 28) A photograph by SEM of a felt-like white-colored product in the foregoing figure.

(FIG. 29) An enlarged view of the foregoing figure.

(FIG. 30) An enlarged view of the foregoing figure.

Figure 28:
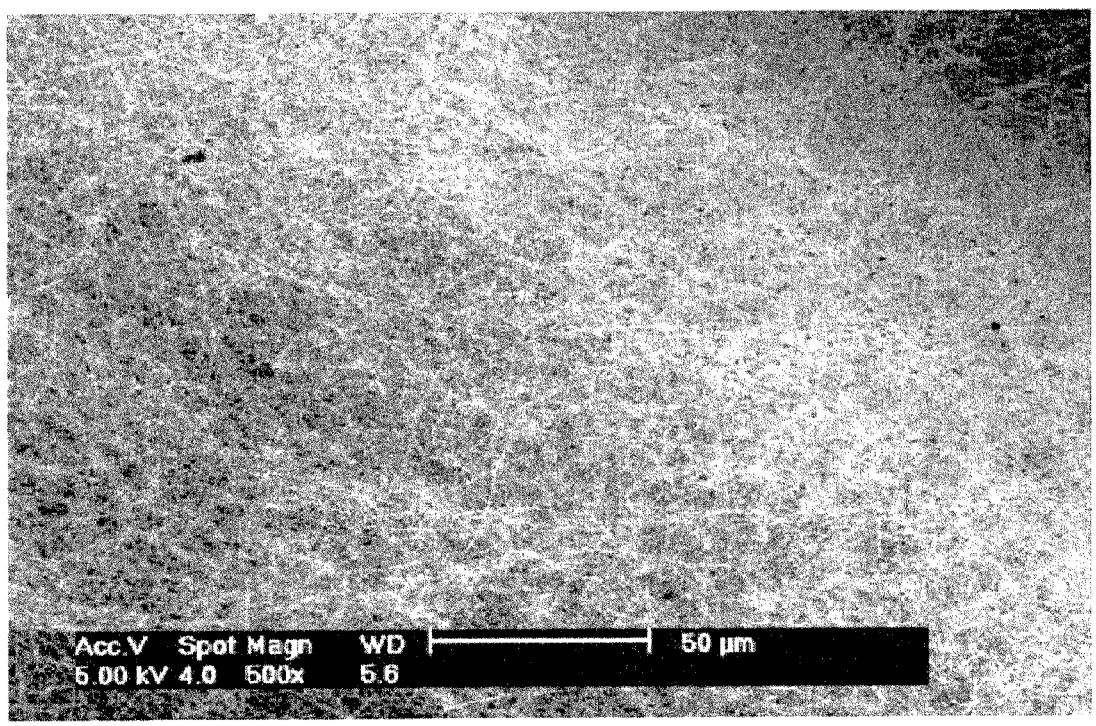

(FIG. 31) A photograph by SEM of a portion which is contained in the felt-like white-colored product in FIG. 28 and in which spherical and disk-like products are generated in a moniliform shape on fibers of nano size.

(FIG. 32) A photograph by SEM of the same product as in the foregoing figure.

(FIG. 33) A photograph by SEM of the vapor-phase-grown graphite and the silicon compound generated in Example 9. Many of silicon generated in the form of rod are observed.

(FIG. 34) An enlarged view of rod-like silicon shown in the foregoing figure.

(FIG. 35) A photograph by SEM of the vapor-phase-grown graphite and the silicon compound generated in Example 9. Many of fibrous silicon compounds generated are shown.

(FIG. 36) A photograph by SEM of a portion of the sample obtained in Example 9 where many of rod-like silicon are generated.

(FIG. 37) A photograph by SEM of a portion where disk-like products are coalescing on fibrous products in a moniliform shape in the silicon product obtained in Example 9.

(FIG. 38) An X-ray diffraction pattern of the sample subjected to pressing and heating in Example 9. In the figure, the upper portion represents the measuring result of the white-colored felt-like product and the lower portion represents the measuring result of the black-colored portion. In any of the results, diffraction curves corresponding to the structures of vapor-phase-grown graphite, silicon and silicon carbide were observed.

(FIG. 39) A photograph by SEM of the rod-like silicon.

(FIG. 40) Results of qualitative analysis of EDX (energy dispersion X-ray spectroscopy) of the portion observed in the foregoing figure. A strong peak derived from silicon was observed. A peak of Ar corresponds to argon occluded in the vapor-phase-grown graphite.

Figure 39:
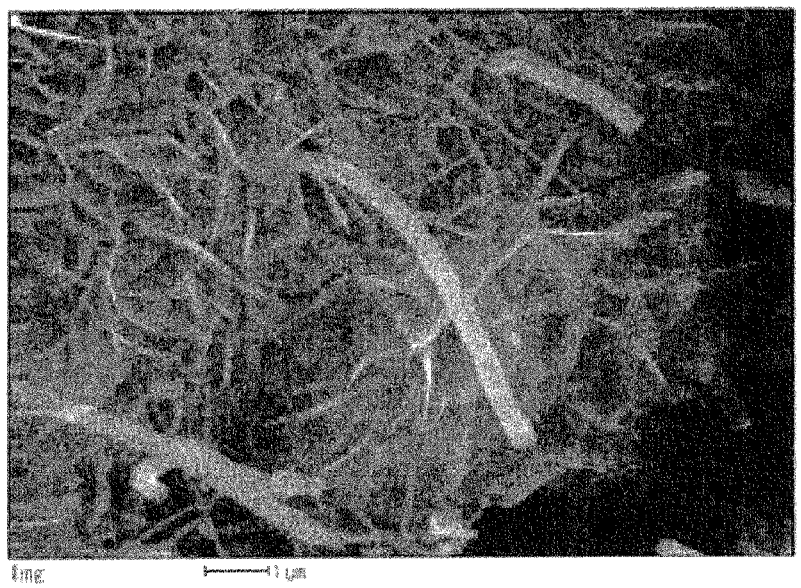

(FIG. 41) A characteristic X-ray map of the portion observed in FIG. 39 by the measurement of EDX. The portion marked SEM is an SEM image (secondary electron image), and photographs marked Si, C and Ar show the characteristic X-ray maps of the respective elements (Portions where the respective elements are present are indicated by white dots). In the map marked Si, the same forms as the rod-like product in SEM image is observed, and it is seen that Si elements are present there. In the map marked C, no rod-like forms can be observed, and therefore, the rod-like portions observed in SEM are mainly composed of Si.

Figure 27:
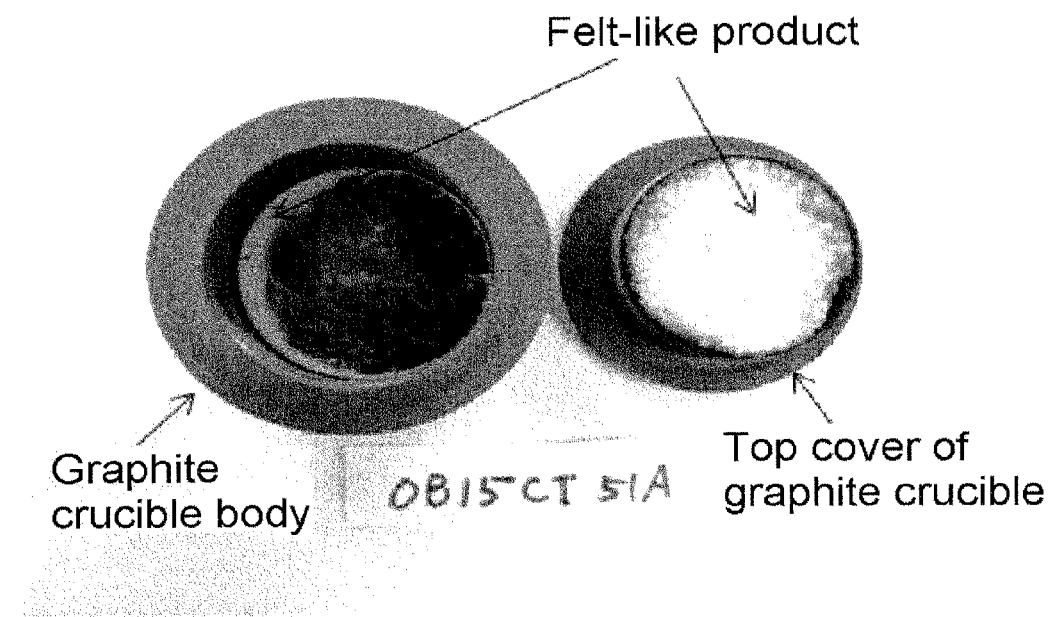

(FIG. 42) Measuring results of EDX of the portion in which spherical and disk-like products are generated in a moniliform shape on fibers of nano size and which is contained in the felt-like white-colored product in. FIG. 27) In this figure, the upper photographs show SEM photograph and characteristic X-ray maps, and the lower graph shows qualitative and quantitative analysis results of EDX. In the characteristic X-ray maps of SEM, Si and O, the same moniliform can be observed, but in the characteristic X-ray map of C, such a moniliform is not observed. From this, it is confirmed that the products in a moniliform shape are composed of Si and O.

(FIG. 43) A photograph by SEM of the surface of the sample generated in Example 10 in which the pre-baking temperature was 900° C.

(FIG. 44) A photograph by SEM of the surface of the sample generated in Example 10 in which pre-baking temperature was 600° C.

(FIG. 45) A diagrammatic view showing the structures of the graphite crucible and the glassy carbon spacer and a state of the sample filled.

(FIG. 46) A photograph showing an appearance of the generated film-like product in Example 11 being formed on the surface of the glassy carbon spacer and comprising vapor-phase-grown graphite (multi-layer graphene).

(FIG. 47) A photograph by SEM of an edge part of the film-like product generated in Example 11.

Figure 47:
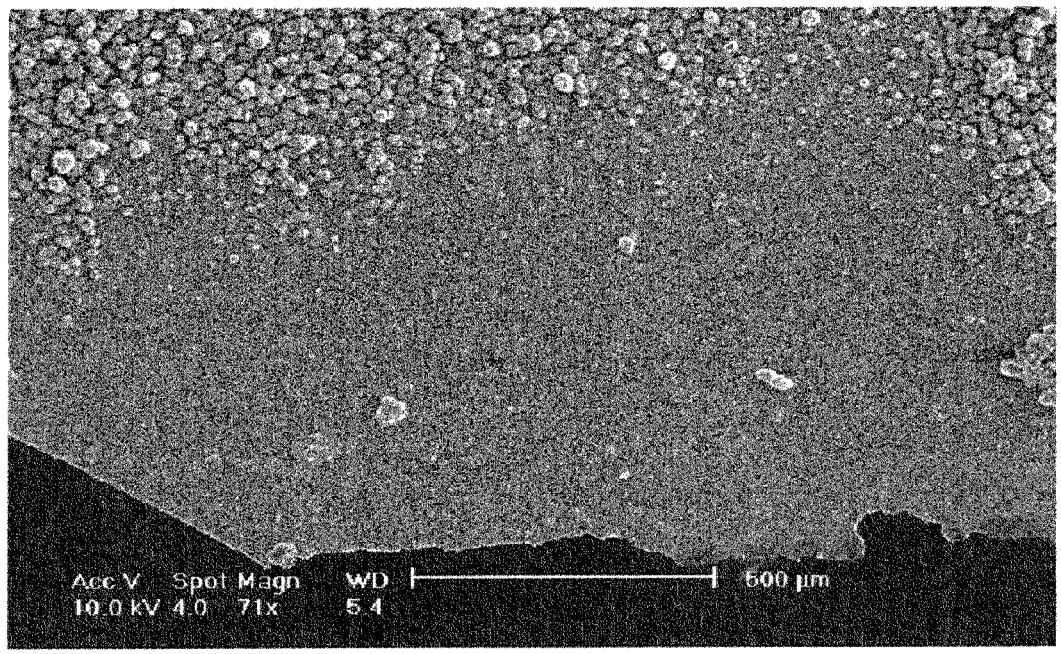

(FIG. 48) An enlarged photograph by SEM of the portion which looks flat in FIG. 47.

Figure 48:
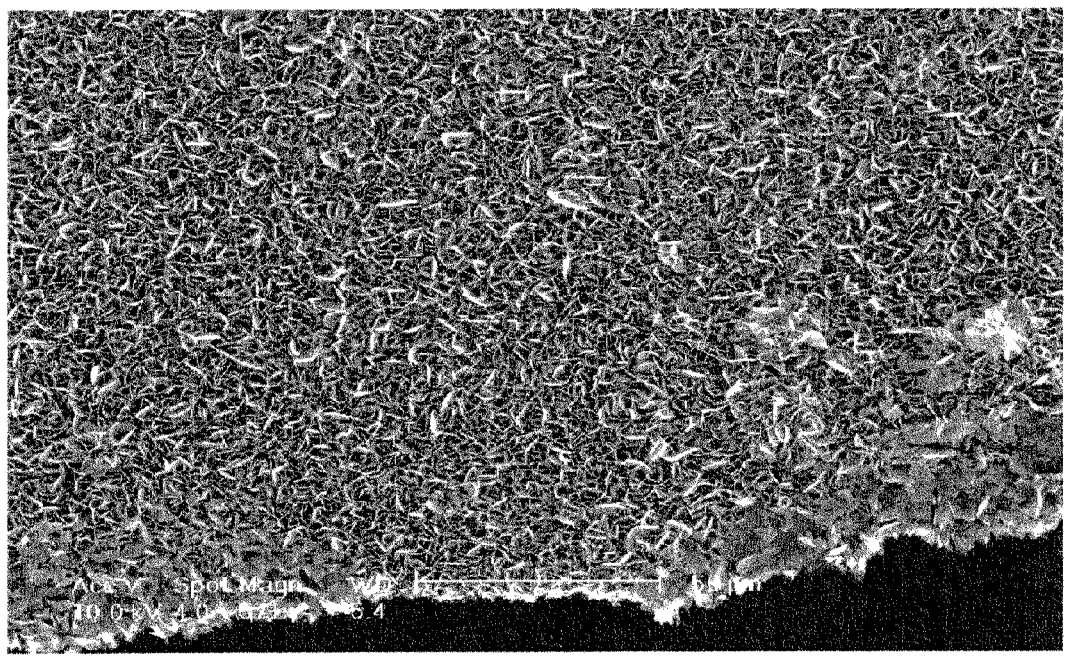
Figure 49:
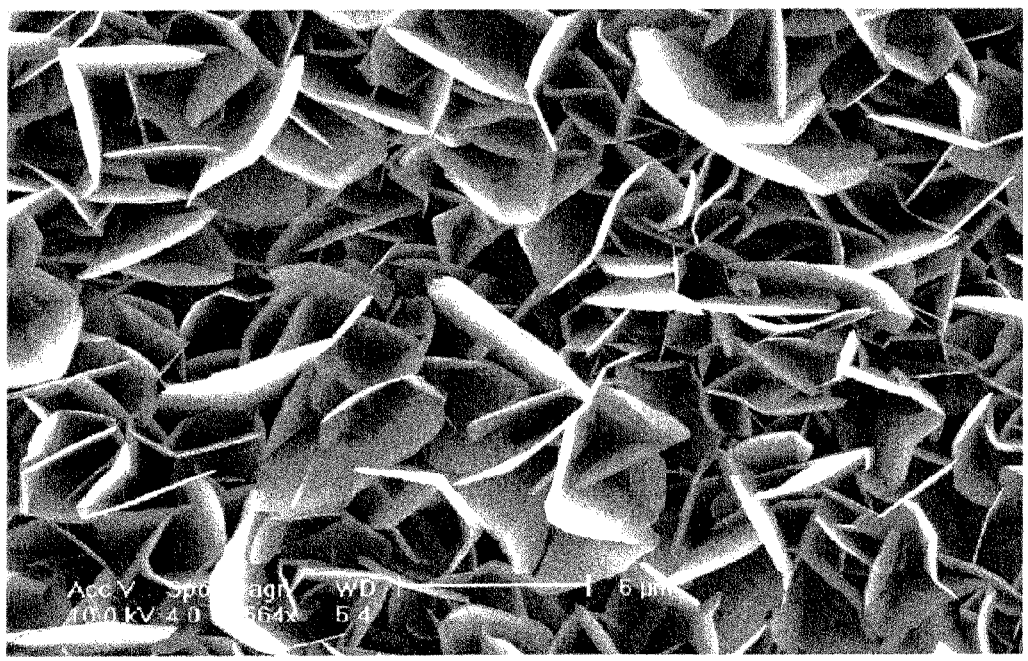

(FIG. 49) An enlarged photograph of FIG. 48.

(FIG. 50) An enlarged photograph by SEM of the portion which looks like a protruding portion in FIG. 47.

Figure 50:
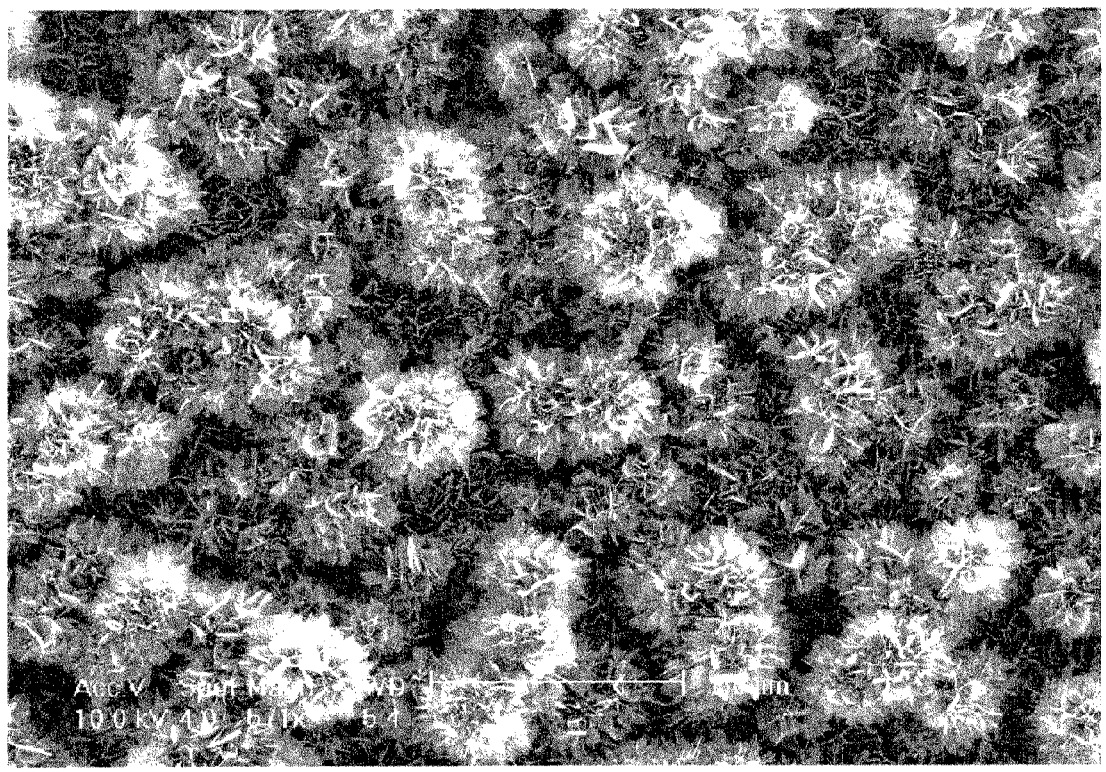
Figure 51:
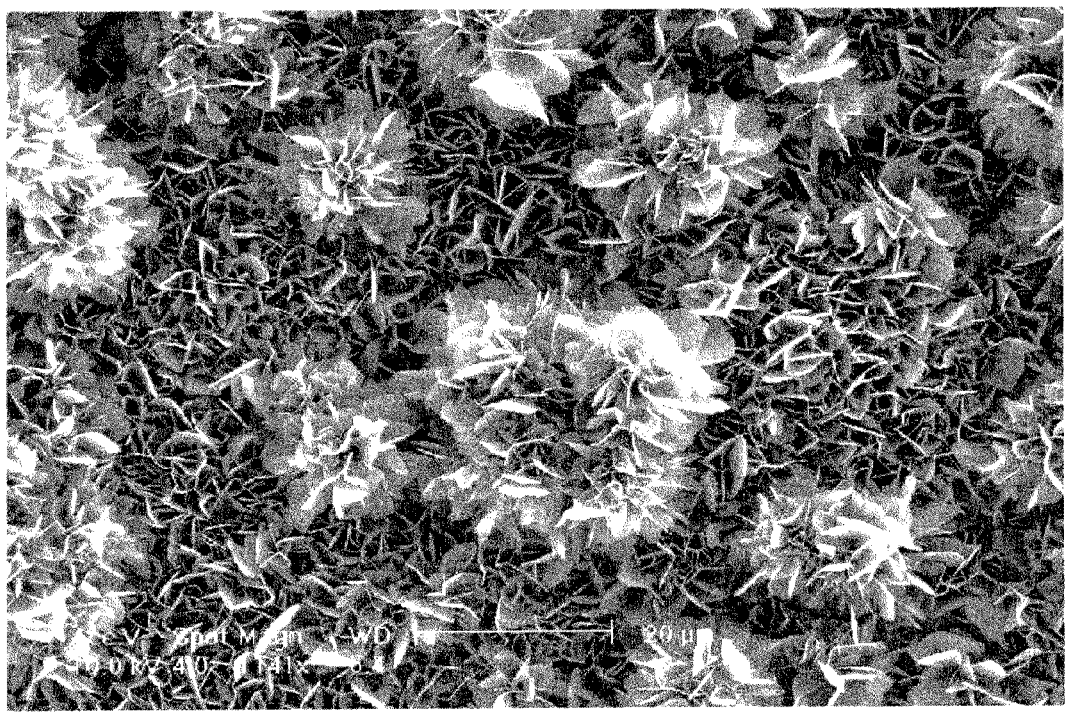

(FIG. 51) An enlarged photograph of FIG. 50.

Figure 59:
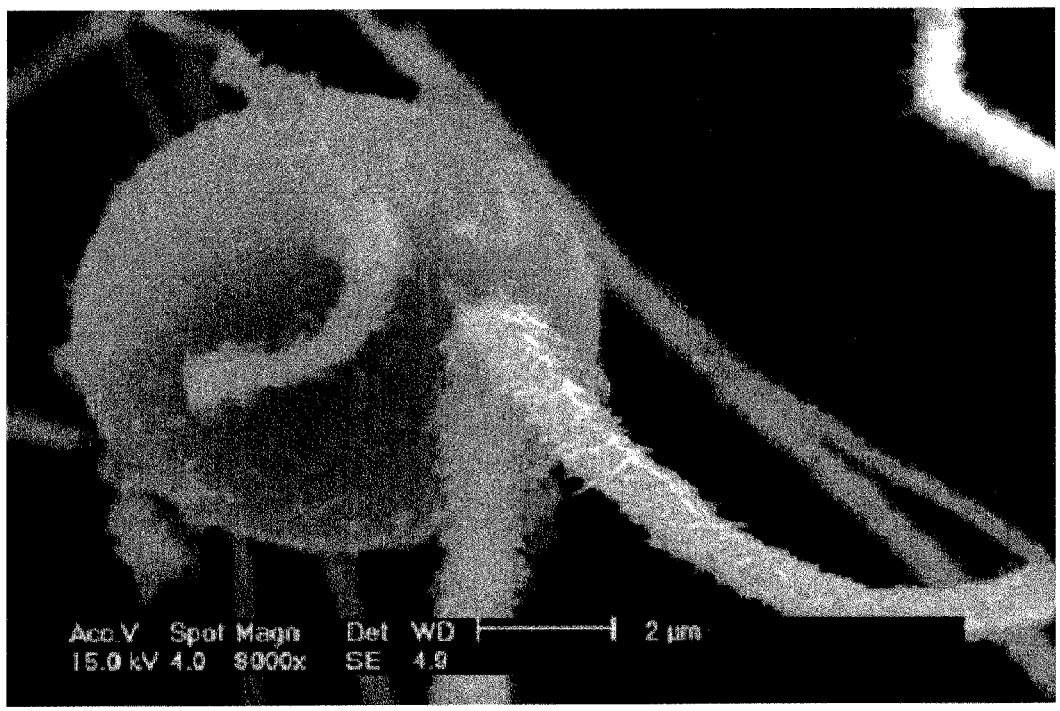
Figure 60:
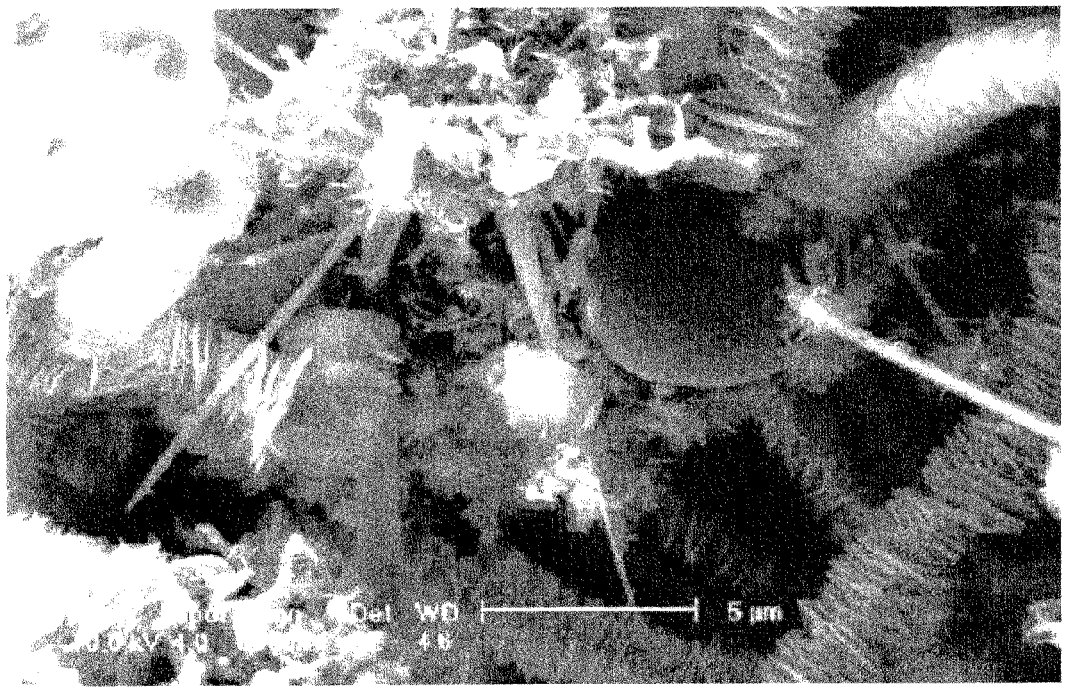

(FIG. 52) A photograph by SEM of the product formed on the surface of the sample in Example 12.
(FIG. 53) An enlarged photograph of FIG. 52.
(FIG. 54) An enlarged photograph of FIG. 53.
(FIG. 55) A photograph by SEM of the product of Example 13.
(FIG. 56) An enlarged photograph of FIG. 55.
(FIG. 57) A photograph by SEM of the product of Example 14.
(FIG. 58) An enlarged photograph of FIG. 57.
(FIG. 59) A photograph by SEM of the graphene-laminated carbon nanofiber (CNF) generated in Example 15. This figure shows many graphene sheets laminated to form a fiber.
(FIG. 60) A photograph by SEM of the graphene-laminated CNF generated in Example 16.
(FIG. 61) An enlarged photograph of the foregoing figure.
(FIG. 62) A photograph by SEM of the cluster of thin sheet graphite crystals of the present invention generated in Example 17.
(FIG. 63) An enlarged photograph of the foregoing figure.
(FIG. 64) A photograph by transmission electron microscope (TEM) of wrinkled and shrunk thin sheet graphite crystals (multi-layer graphene shrunk in the form like reed screen) generated in Example 18.
(FIG. 65) A photograph by TEM of wrinkled and shrunk thin sheet graphite crystals (multi-layer graphene shrunk in the form like reed screen) generated in Example 18.
(FIG. 66) A photograph by TEM of a part of the surface of the thin sheet graphite crystals (multi-layer graphene) generated in Example 18.
(FIG. 67) An enlarged photograph of the thin sheet graphite crystals (multi-layer graphene) of the foregoing figure, indicating a lattice image of an edge part thereof.
(FIG. 68) A view of a cluster of graphite crystals in which the thin sheet graphite crystals of the cluster of thin sheet graphite crystals of the present invention are subjected to cleavage partly (Example 19).
(FIG. 69) An enlarged photograph of the foregoing figure.
(FIG. 70) A photograph by a scanning electron microscope (SEM) of the surface of the cluster of thin sheet graphite crystals obtained in Example 20.

BEST MODE FOR CARRYING OUT THE INVENTION

The first aspect of the present invention is described.

The graphite vessel (for example, graphite crucible) made of heat-resistant material relating to the present invention functions as a reaction vessel for causing the CVD reaction with gases such as hydrogen, hydrocarbon, carbon monoxide and water generated from the pre-baked starting material during the HIP treatment. Since it is necessary to cause a chemical reaction without scattering the generated reaction gas outside the vessel while keeping isotropic high pressure by a gas pressure, the material of the vessel and the sealing structure thereof are properly selected. If the material is too dense, a difference in pressure between the inside and the outside of the vessel (for example, graphite crucible) arises, which results in an explosive breakdown of the vessel. On the other hand, if the material is too porous, the reaction gas generated inside the vessel is easily scattered outside the vessel and efficiency of the chemical reaction is lowered.

The material and structure of the vessel (for example, graphite crucible) are properly selected in consideration of necessity of taking a HIP-treated product out of the vessel, sealing the vessel (for example, crucible) as easily as possible in view of facilitating charging of the starting material before the HIP treatment, exposure to high temperature of about 1000° C. or more during the HIP treatment and maintaining strength of the vessel at high temperature so as to be capable of withstanding the inside pressure caused by generation of the reaction gas from the pre-baked starting material.

Examples of the heat resistant materials constituting the reaction vessel are graphite and in addition, ceramics such as alumina, magnesia and zirconia, and metals such as iron, nickel, zirconium and platinum.

Graphite material is suitable as a material for the vessel (for example, crucible). The graphite vessel can be made using artificial graphite materials specifically prepared by extrusion molding, CIP molding, squeeze molding, vibration molding or rammer molding, hard carbon materials including glassy carbon prepared mainly by molding a thermosetting resin, carbon fiber-reinforced carbon materials or composite materials thereof. The porosity of the graphite material is important for efficiently causing the chemical reaction in the vessel (for example, crucible), and therefore, a material having an open pore ratio of less than 20% can be used suitably. In the case of a material having an open pore ratio of 20% or more, the reaction gases are diffused outside the vessel (for example, crucible), and therefore, a concentration of the gases necessary for generating the graphite cannot be kept. However, in the case where there is not so large difference between the volume of the vessel (for example, crucible) and the volume of a HIP-treating chamber where the vessel is charged, even if an open pore ratio of the vessel (for example, crucible) is 20% or more, an amount of gases scattering outside the vessel (for example, crucible) is not so large, and therefore, efficiency is not affected so much.

With respect to the vessel to be used in the present invention, a screw-capped graphite crucible can be used so that charging of the pre-baked starting material in the vessel and discharging of the product after the HIP treatment can be carried out efficiently. (FIGS. 1 to 3) The inner wall 2a at the top of the crucible body 2 and the outer circumference 1a of the crucible cap 1 have thread-cutting by specified tap processing, and thereby the crucible can be sealed by turning the cap 1 to the thread after charging of the pre-baked starting material 3.

Figure 4:
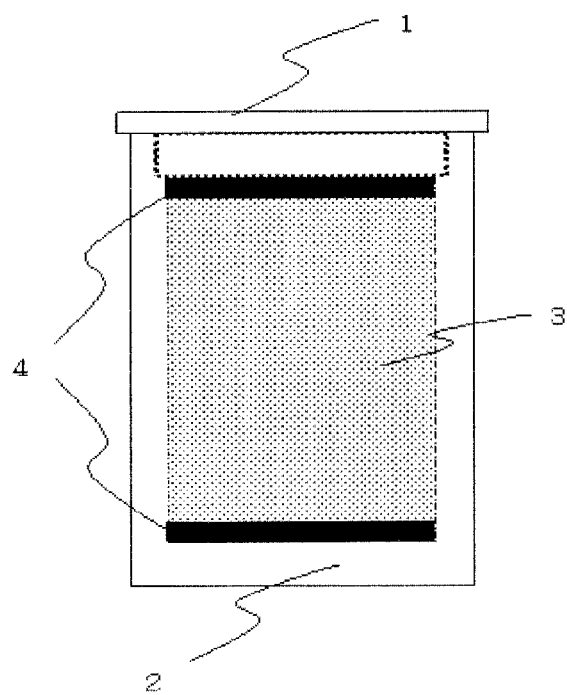

By carrying out hot isostatic pressing treatment by covering the whole (or a part) of the bottom and the top of the pre-baked starting material 3 with a spacer 4 made of a hard carbon material having low open pore ratio in order to increase a degree of sealing of the pre-baked starting material, scattering of the reaction gases generated from the pre-baked starting material 3 from the top and the bottom of the crucible can be controlled. (FIG. 4)

Figure 6:
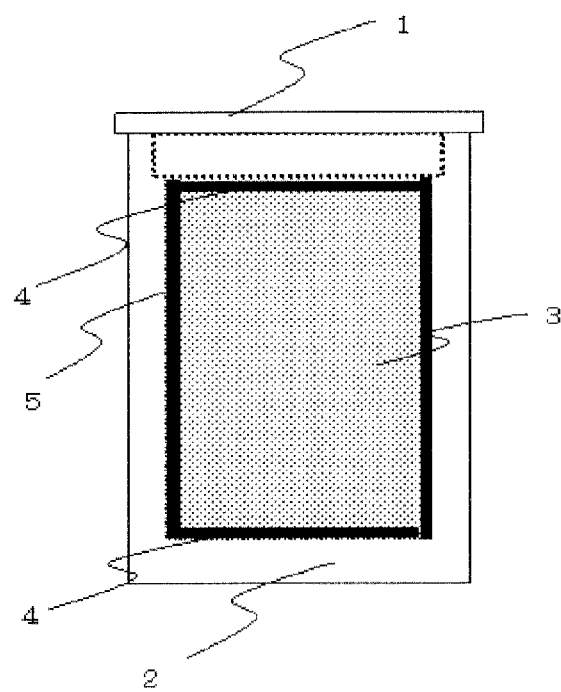

Further, a reaction efficiency can be increased by carrying out hot isostatic pressing treatment by covering the whole (or a part) of the side of the pre-baked starting material 3 with a sleeve 5 made of a hard carbon material having low open pore ratio (FIG. 5) or by covering the whole (or a part) around the pre-baked starting material 3 with a spacer 4 and a sleeve 5 (FIG. 6). Examples of the carbon material for the spacer and the sleeve are glassy carbon, diamond-like carbon, amorphous carbon and the like, and one of them can be used alone, or two or more thereof can be used together. The open pore ratio of the carbon material is usually less than 0.5%. Even if the pre-baked starting material is covered with a spacer and a sleeve having an open pore ratio of 0%, there is a gap between the spacer and the sleeve. Therefore, the pre-baked starting material cannot be sealed completely with the spacer and the sleeve.

Examples of a screw of a screw-capped graphite crucible are a triangular screw (having a cross-section of screw thread in the form like equilateral triangle), a square screw, a trapezoid screw and the like, and among these, a triangular screw is preferred.

In the process for generating vapor-phase-grown graphite by HIP treatment using the pre-baked starting material containing remaining hydrogen, irrespective of kind of a starting material to be used, a degree of crystallinity and a true density of the generated graphite can be controlled by a pre-baking temperature, an amount of remaining hydrogen in the pre-baked starting material, a shape of the pre-baked starting material, a HIP treatment temperature and pressure, and temperature and pressure elevating rates.

With respect to an amount of remaining hydrogen, from the viewpoint of production of the target product of the present invention, there is no problem if the amount is enough for sufficiently generating gases such as hydrogen, hydrocarbon, carbon monoxide and water which are necessary for the CVD reaction at the time of HIP treatment. The amount is usually about 6500 ppm or more, preferably about 10000 ppm or more, further preferably about 20000 ppm or more. The pre-baked starting material containing remaining hydrogen can be obtained by pre-baking a powdery and/or particulate material of an organic compound. In this case, usually the amount of the remaining hydrogen changes depending on the pre-baking temperature. Namely, as the pre-baking temperature increases, the amount of the remaining hydrogen decreases.

A pre-baking temperature is about 1000° C. or lower, preferably about 850° C. or lower, more preferably about 800° C. or lower, further preferably about 700° C. or lower.

Figure 19:
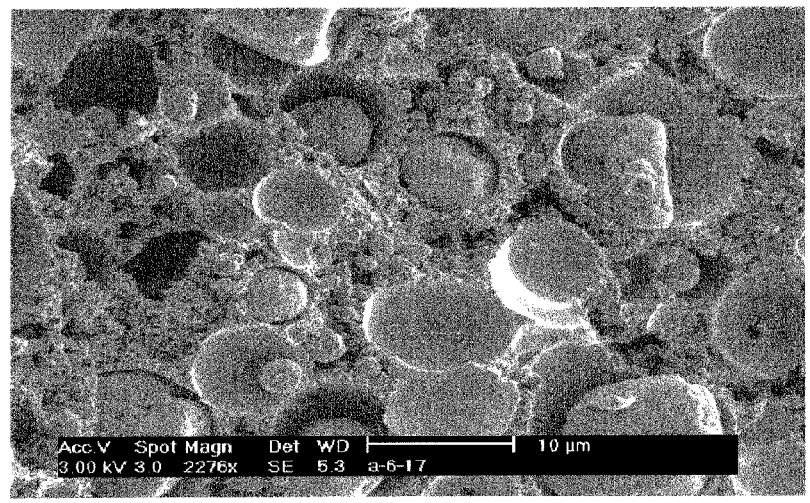

The thus obtained pre-baked starting material containing remaining hydrogen is subjected to HIP treatment under the proper conditions. The vapor-phase-grown graphite can be obtained at a HIP treatment temperature of about 900° C. or more, preferably about 1000° C. or more, but at too high temperatures (for example, about 2000° C.), the target product is subject to damage by etching with the exciting hydrogen (FIG. 19). Therefore, in the present invention, it is necessary that the maximum ultimate temperature at the HIP treatment is about 900° C. (preferably about 1000° C.) or more and lower than about 2000° C. Further, from the viewpoint of efficient production of the target product of the present invention, the maximum ultimate temperature at the HIP treatment is within the range from about 1200° C. to about 1900° C., preferably from about 1400° C. to about 1800° C. It is necessary that the maximum ultimate temperature at the HIP treatment is higher than the pre-baking temperature and is usually higher by 100° C. or more, preferably 400° C. or more.

A suitable maximum ultimate pressure at the HIP treatment varies with a particle size of the pre-baked starting material, and the HIP treatment can be suitably carried out at a pressure usually within the range from about 1 MPa to about 300 MPa, preferably from about 10 MPa to about 200 MPa, preferably from about 30 MPa to about 200 MPa. For example, in the case of a large particle size, a higher pressure is required as the maximum ultimate pressure, and in the case of a small particle size, a lower pressure suffices. In the case of a particle size of from several microns to several tens microns (for example, synthetic resins), the maximum ultimate pressure is preferably 70 MPa or more, and when a particle size is about 1 μm or less (for example, carbon black), HIP treatment can be suitably carried out at a pressure of about 10 MPa.

In the HIP treatment, except the case of a particle size of as small as about 1 μm or less, it is desirable from the viewpoint of production efficiency that usually, the pressure is firstly elevated to a specified pressure before the temperature is elevated to approximately the pre-baking temperature (pressure-preceding pattern), so that the pre-baked starting material is not scattered, and then, the temperature is elevated to the pre-baking temperature and thereafter, the temperature and pressure are elevated to the maximum ultimate temperature and the maximum ultimate pressure, respectively. Example of the specified pressure is about 70 MPa. In the case of a particle size of as small as about 1 μm or less, the pressure-preceding pattern as mentioned above is not necessary particularly, and HIP treatment can be carried out efficiently.

The thus obtained cluster of thin sheet graphite crystals as a target product of the present invention has a high degree of crystallinity. The true density thereof is usually about 1.85 g/cm$^3$ or more, preferably about 2.0 g/cm$^3$ or more, more preferably about 2.1 g/cm$^3$ or more, further preferably about 2.2 g/cm$^3$ or more, and the cluster of thin sheet graphite crystals has good crystallinity. An "about" of this true density means that a tolerance of approximately ±1% is allowable. In the case of a large particle size of the pre-baked starting material, as mentioned infra, a production rate of the cluster of thin sheet graphite crystals tends to decrease, and therefore, when the true density of the product after the HIP treatment is measured as it is, there may be a case where the true density of the whole product is lower than the values mentioned above. However, as far as true density of generated cluster of thin sheet graphite crystals of any part is within the range mentioned above, the obtained product can be used suitably as the cluster of thin sheet graphite crystals of the present invention.

Moreover, the total pore ratio of the cluster of thin sheet graphite crystals is preferably 40% or more, more preferably 50% or more. Among the above-mentioned cluster of thin sheet graphite crystals, those satisfying both of the true density and total pore ratio within the mentioned "preferred range" are preferred as compared with a cluster of thin sheet graphite crystals satisfying either of the true density or the total pore ratio within the mentioned "preferred range". Non-limiting examples of such preferred cluster of thin sheet graphite crystals are those having a true density of 1.85 g/cm$^3$ or more and a total pore ratio of 40% or more and those having a true density of 2.0 g/cm$^3$ or more and a total pore ratio of 50% or more, and any other combinations can also be within the scope of the present invention.

Figure 7:
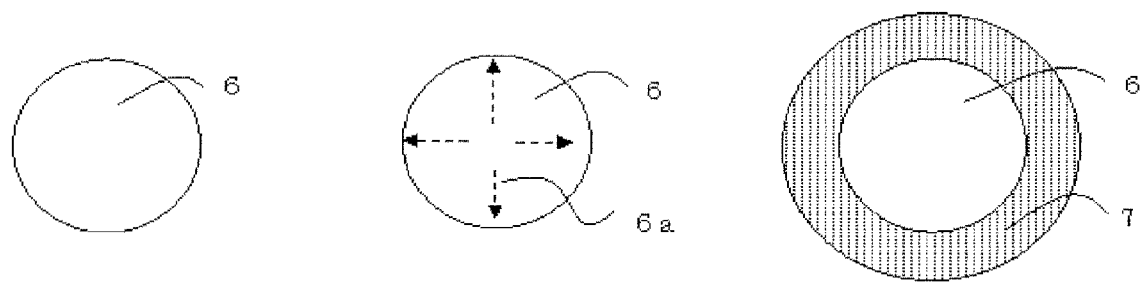

A mechanism of generation of vapor-phase-grown graphite from the pre-baked starting material is shown in FIG. 7. By carrying out HIP treatment of particles 6 of the starting material obtained by pre-baking an organic compound, gases 6a such as hydrogen, hydrocarbon, carbon monoxide and carbon dioxide are generated from the inside of the pre-baked starting particles 6 heated to a temperature higher than the pre-baking temperature. The gases 6a pass through the pores of the material and reach the surface of the particles 6 of the pre-baked starting material. During this process, the vapor-phase-grown graphite 7 is generated physically and chemically by excitation with a temperature and a pressure. The pre-baked starting material shrinks as the reaction gases are generated, and vapor-phase-grown graphite is generated inside and outside of the material.

Figure 8:
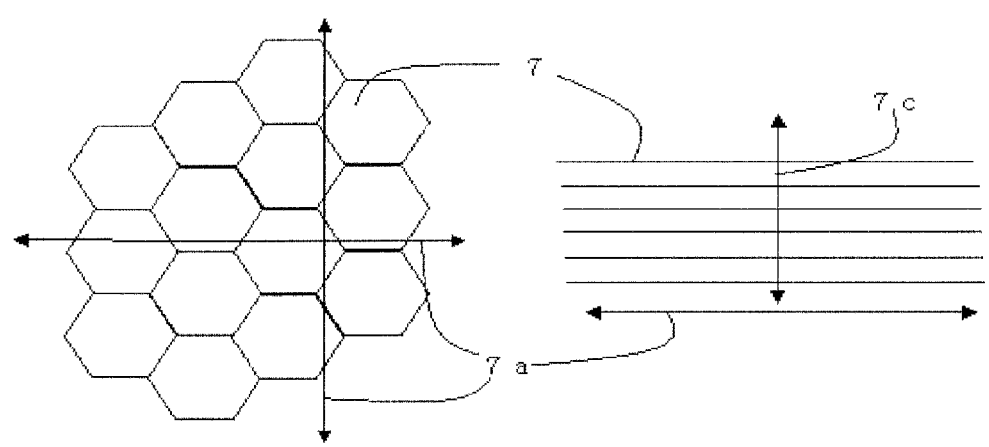
Figure 9:
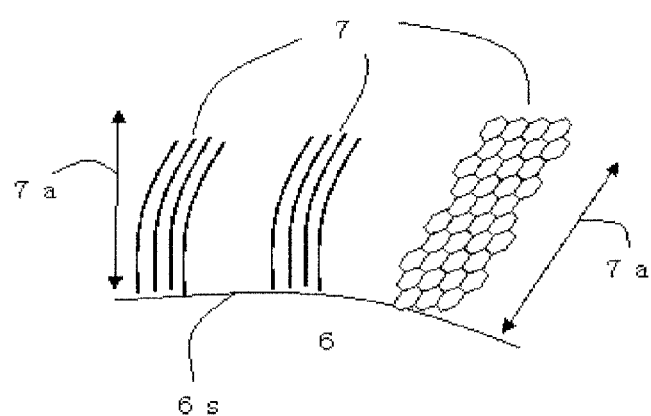

In the HIP treatment, since a pressure is applied with gases such as argon and nitrogen in an isotropic manner, as shown in FIGS. 8 and 9, graphite crystals are grown approximately radially from the surface 6s of the particles 6 of the pre-heated starting material to an in-plane direction 7a of the graphite hexagonal planes 7 (in the direction of "a" axis of graphite crystal). Further, graphite structures are grown in such a manner that the graphite hexagonal planes 7 spread while connecting carbons in the direction of 7a from a starting point of graphite hexagonal planes (graphene) 7 formed at an initial stage of a reaction and at the same time, the graphite hexagonal planes 7 are laminated in the direction of 7c. In this case, it can be considered that since a high pressure compressed gas exhibits a shielding effect on the surface of graphene, thus inhibiting graphenes from adhering and jointing to each other to form into a multi-layer, the growth of graphenes is inhibited much in the direction of 7c and graphenes are grown much radically in the direction of 7a, thereby generating the cluster of thin sheet graphite crystals of the present invention.

Figure 10:
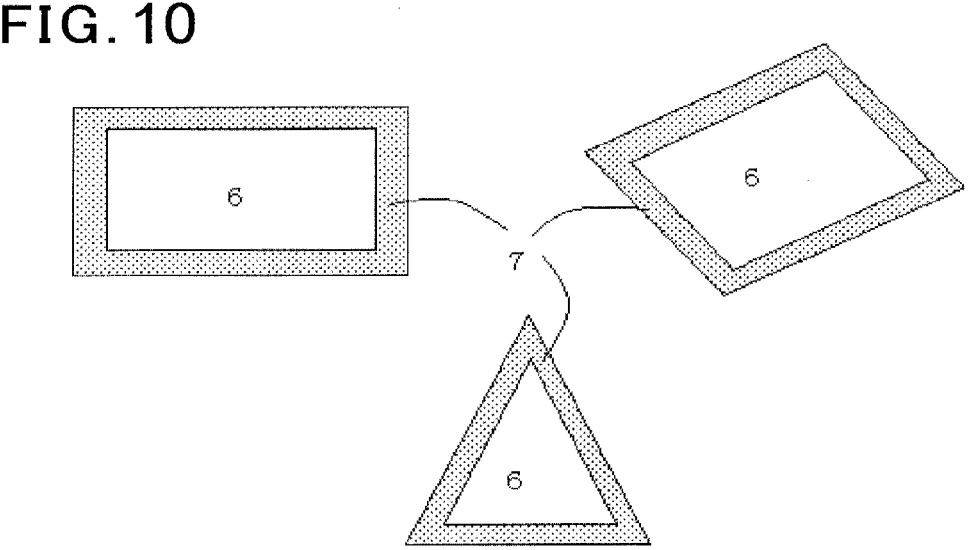
Figure 11:
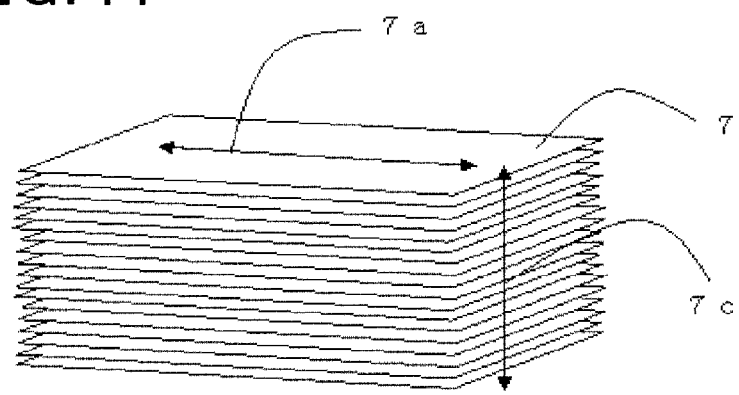
Figure 12:
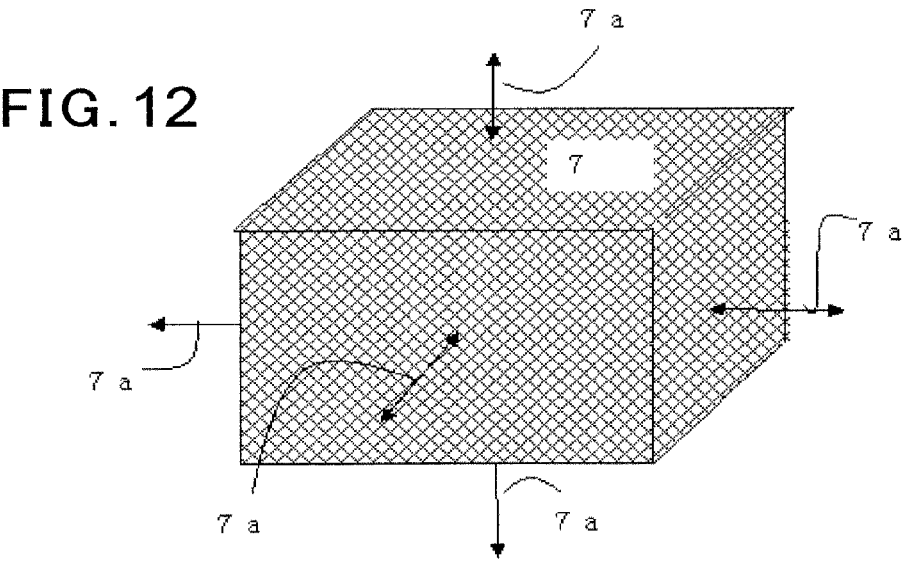

The pre-baked starting material to be subjected to HIP treatment can be a powdery and/or particulate material in various forms such as circle, ellipse, column, cylindrical column, fiber and block having an undefined shape (FIG. 10). In any shapes, graphite structures are grown such that graphite hexagonal planes 7 spread approximately radially from the surface 6s of the pre-baked starting material 6 in a direction 7a while connecting carbons and at the same time, the graphite hexagonal planes 7 are laminated in the direction of 7c. So far, only graphite materials, in which graphite hexagonal planes 7 are grown all together in one direction on the particle, for example, graphite materials having high anisotropy, which have orientation in the direction of 7a on the surface of the particle and orientation in the direction of 7c in the thickness of the particle, have been able to be produced (FIG. 11). However, according to the present invention, the graphite hexagonal planes 7 are grown toward the direction of 7a and the growth toward the direction of 7a extends approximately radially. As a result, a cluster of thin sheet=graphite crystals (including isotropic graphite particles and bulky graphite structure) composed of aggregates in such a state that thin sheet graphite crystals extend from the inside toward the outside can be obtained (FIG. 12). Moreover, such a cluster of thin sheet graphite crystals can be in the form of isotropic graphite particles or in the form of a bulky graphite structure comprising such isotropic graphite particles.

Figure 13:
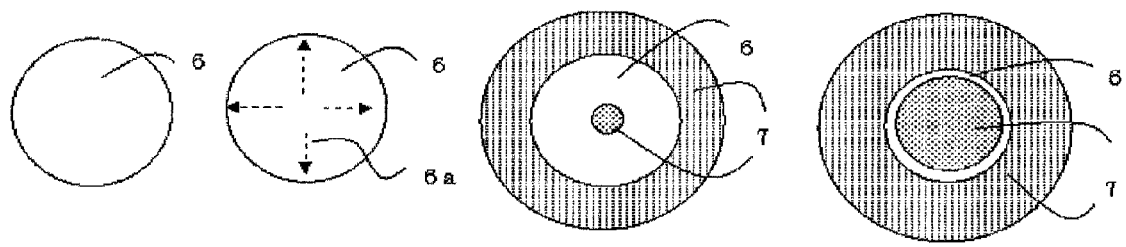

A degree of growth of the vapor-phase-grown graphite inside and outside of the pre-baked starting material 6 is determined by selection of a pre-baking temperature and an amount of remaining hydrogen of the pre-baked starting material, a structure of a graphite crucible and HIP treatment conditions. By selecting suitable conditions, the vapor-phase-grown graphite 7 can be generated on the outer surface and the inside of the pre-baked starting material 6 as shown in FIG. 13, a degree of crystallinity as a bulky graphite can be increased, and a true density can be enhanced.

The mechanism of generation of the vapor-phase-grown graphite of the present invention is explained in more detail. The pre-baked starting material is subjected to isostatic application of pressure with a pressurized medium such as argon and nitrogen in the HIP treatment. Therefore, at the initial stage of the HIP treatment, a high pressure and high density phase is formed around the particles of the pre-baked starting material. When the HIP-treatment temperature is elevated more than the pre-baking temperature, generation of gases from the pre-baked starting material starts, but since a coefficient of diffusion of the gases into the pressurized medium having a high pressure and high density becomes small, reaction gas regions (hydrogen, hydrocarbon, carbon monoxide, and the like) of high concentration are formed around the pre-baked starting material. In the HIP-treatment, isotropic application of a pressure is carried out, and therefore, the reaction gas regions are formed uniformly on the outer surface of the particles in the form being analogous to the shape of the particles.

In these reaction gas regions, when the HIP-treatment temperature becomes further high, particularly about 900° C. or more, excitation occurs and so-called thermal CVD reaction occurs to precipitate vapor-phase-grown graphite. Generally CVD reaction is carried out by supplying a reaction gas to a surface of a substrate using a CVD apparatus, a plasma CVD apparatus, or the like. However, the reaction mechanism of the present invention is characterized by carrying out CVD reaction in a reaction gas region generated around the pre-baked starting material in the graphite crucible by using HIP equipment. Therefore, in the case of a spherical pre-baked starting material, vapor-phase-grown graphite is generated approximately radially from the surface of the spherical particle as shown in FIG. 15, and in the case of particles having irregular shapes, vapor-phase-grown graphite analogous to each other is generated from the surfaces of the particles.

The reason why there is an optimum temperature range for pre-baking the starting material is such that proper percentages of gas components such as hydrocarbon, hydrogen and carbon monoxide are necessary in order to generate graphite efficiently in the CVD reaction. For example, in the case of a pre-baking temperature exceeding about 1000° C., an amount of remaining hydrogen becomes small, and graphite is not precipitated efficiently. Moreover, the reason why there is an optimum range of HIP treatment temperature is such that it was found that when the HIP treatment temperature is lower than about 900° C., thermal excitation of the generated gas hardly occurs and CVD reaction hardly proceeds, and when the HIP treatment temperature exceeds about 2000° C., etching of precipitated graphite due to hydrogen occurs.

Figure 14:
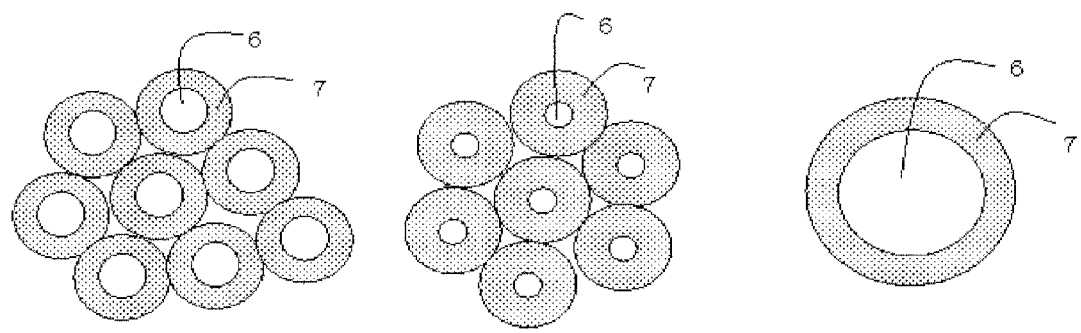

With respect to a particle size of the pre-baked starting material to be used, since CVD reaction occurs mainly on the surface of the particles, if the particle size is large, a ratio of the surface area to the volume of the particle is small, and as a result, an amount of the vapor-phase-grown graphite in the obtained material is reduced. Therefore, when using a starting material having a smaller particle size, a ratio of generated vapor-phase-grown graphite 7 as a bulk graphite material can be increased (FIG. 14). Accordingly, from the viewpoint of production efficiency, in the case of using a spherical resin, it is preferable that its particle size (average) is about 100 μm or less. Meanwhile, in the case of application where it is desired to grow vapor-phase-grown graphite only in the vicinity of surfaces of hard carbon material particles such as glassy carbon, a target material can be obtained easily by selecting particles having a particle size larger than 100 μm according to necessity.

When using a starting material which is once melted in a pre-baking process (for example, a thermoplastic resin and the like), the pre-baked starting material may be pulverized and classified to obtain the pre-baked starting material having a desired particle size prior to HIP treatment. For example, a thermoplastic resin is obtained as a foamed article (in the form of fragile sponge) after the pre-baking, and therefore, the foamed article is pulverized and classified to obtain a pre-baked starting material having a desired particle size before HIP treatment.

In a conventional method for producing vapor-phase-grown graphite, only those having high anisotropy in which carbon hexagonal planes are laminated in the form of film on a surface of a substrate could be produced. However, the present invention made it possible to grow vapor-phase-grown graphite efficiently in a three-dimensional space and as a result, to produce a cluster of thin sheet graphite crystals (including isotropic graphite particles and a bulky graphite structure) composed of aggregates in such a state that thin sheet graphite crystals extend from the inside toward the outside in a very short period of time.

Generally, an organic compound, as it is heated, becomes larger in molecular weight, and then, oxygen, nitrogen and hydrogen atoms in its structure become thermodynamically instable and released, and thereby, carbonization proceeds. Therefore, in most of organic compounds, such a reaction proceeds by heat-treating at a temperature of about 300° C. or more. In the case of about 400° C. or more, a pre-baked starting material comprising carbon and proper amounts of remaining hydrogen, oxygen and nitrogen is obtained. In the present invention, the thus pre-baked organic compound can be used as a pre-baked starting material.

Examples of usable organic compound are those mentioned below. There can be used, for example, natural organic polymers such as starch, cellulose, protein, collagen, alginic acid, dammar, kovar, rosin, gutta-percha and natural rubber; semisynthetic polymers such as cellulose resin, cellulose acetate, cellulose nitrate, cellulose acetate butyrate, casein plastic and soybean protein plastic; and synthetic polymers such as thermosetting reins such as phenol resin, urea resin, melamine resin, benzoguanamine resin, epoxy resin, diallyl phthalate resin, unsaturated polyester resin, bisphenol A type epoxy resin, Novolac type epoxy resin, polyfunctional epoxy resin, alicyclic epoxy resin, alkyd resin and urethane resin, thermoplastic resins such as polyester resins (polyethylene terephthalate (PET) resin, polytrimethylene terephthalate resin, polybutylene terephthalate resin, polyethylene naphthalate resin, polybutylene naphthalate resin and the like), vinyl chloride resin, polyethylene, polypropylene and polystyrene, synthetic rubbers such as polyisoprene and butadiene, synthetic fibers such as nylon, vinylon, acrylic fiber and rayon, and other materials such as polyvinyl acetate, ABS resin, AS resin, acrylic resin, polyacetal, polyimide, polycarbonate, modified polyphenylene ether (PPE), polyarylate, polysulfone, polyphenylene sulfide, polyether ether ketone, fluorine-containing resin, polyamide imide, and silicon resin.

It is a matter of course that petroleum pitch, coal pitch, petroleum coke, coal coke, carbon black and active carbon which are generated when fossil fuels such as petroleum and coal, for example, being refined can be used as a starting material. In addition, toward the establishment of resources-recycling society, introduction of carbonization system has been advanced from the viewpoint of effective utilization of carbon in wastes, and waste plastics and waste PET bottles which are mixtures of the above-mentioned various resins, waste wood, waste plants and food wastes such as garbage can also be used as an organic compound being a starting material.

These hydrocarbon starting materials are pre-baked at a pre-baking temperature at a specified temperature elevating rate in an inert atmosphere such as in a nitrogen gas stream by burning with oxygen without releasing carbon dioxide and carbon monoxide. For the pre-baking, an electric heating or gas heating type externally heating batch oven, continuous multi-tubular oven, internal heating rotary kiln, rocking oven or the like is used.

Vapor-phase-grown carbon and composite materials of graphite and various carbon materials, for example, carbon fiber-reinforced carbon materials (CC composite) and graphite/carbon composite materials can be produced by subjecting a pre-baked starting material to mixing or laminating with various carbon materials such as a carbon fiber, a natural graphite, an artificial graphite, a glassy carbon or an amorphous carbon, charging the starting material in a graphite crucible and conducting heat treatment under isotropic gas pressure. Therefore, in the case of various needs of high strength, high pore ratio and low pore ratio depending on applications of graphite materials, such needs can be satisfied by combining various carbon materials.

Graphite is excellent in electric and thermal conductivity and therefore, is widely used for a current collector and a heat collector. These devices have been produced by mixing a material fulfilling a prime function with graphite, an organic binder and the like, and heating, drying and pressurizing the mixture. In the present invention, by mixing such a functional material with the pre-baked starting material uniformly and subjecting the mixture to HIP treatment, it is possible to produce a vapor-phase-grown graphite and to configure a device in which these functional materials are uniformly dispersed and fixed to the vapor-phase-grown graphite. Specifically, by mixing metal silicon, silicon oxide, titanium oxide, zinc oxide and the like with the pre-baked starting material uniformly, charging the mixture in a graphite crucible and conducting heat treatment under isotropic gas pressure, a composite material, in which these functional materials are uniformly dispersed in the vapor-phase-grown graphite, can be produced.

The cluster of thin sheet graphite crystals of the present invention can be formed into a cluster of graphite crystals, in which graphite crystals are subjected to partial cleaving, by preparing a graphite intercalation compound (compound in which sulfate ion, organic complex of alkali metal, and the like are invading between the graphite layers) using the cluster of thin sheet graphite crystals as a host material and subjecting the graphite intercalation compound to rapid heating. Namely, by intercalation of ion, and the like between the graphite layers, an interval between the layers of the thin sheet graphite crystals forming the cluster of thin sheet graphite crystals is increased, and thereby, a stress arises at various portions of the cluster of thin sheet graphite crystals. Further, by subjecting the graphite intercalation compound to rapid heating, a volume of graphite crystal expands rapidly in the direction of "c" axis of the graphite crystal. Through these processes, a thinner graphene, in which thin sheet graphite crystals have been subjected to cleaving effectively, can be produced. The cluster of graphite crystals subjected to cleaving comprises graphene and multi-layer graphene formed by lamination of several layers of graphene, and therefore, is useful as an additive for a transparent conductive film having light transmission and electric conductivity.

A graphite intercalation compound can be prepared by a usual process, for example, by adding the cluster of graphite crystals of the present invention obtained above into a mixed solution of concentrated sulfuric acid and concentrated nitric acid, a tetrahydrofuran solution of alkali metal and condensation polycyclic hydrocarbon, or the like and then stirring the mixture. A method for rapid heating of the thus obtained graphite intercalation compound is not limited particularly, and for example, there is exemplified a method for charging an intercalation compound in a magnetic crucible made of ceramic or the like and charging the crucible in a heated electric oven. In this case, the temperature of the electric oven is preferably within a range from 600° to 1000° C. Through such a process, the thickness of the thin sheet graphite crystals will be from about 0.35 nm to about 9 nm.

The second phase of the present invention is then described.

Example of silicon in the form of powder which can be used suitably as a starting material is one having a particle size of, for example, less than 500 µm, preferably less than 100 µm, more preferably less than 10 µm, further preferably less than 5 µm, still further preferably less than 1 µm. Here, for example, "one having a particle size of less than 500 µm"

means that 90% or more, preferably 99% or more, more preferably 99.9% or more of the total particles has a particle size of less than 500 μm. The same thing can be said with respect to "one having a particle size of less than 100 μm", "one having a particle size of less than 10 μm", "one having a particle size of less than 5 μm" and "one having a particle size of less than 1 μm". Whether or not these criterions are satisfied can be determined by calculating a ratio of particles satisfying these criterions from the results of actual observation of a particle size of particles within a specified region using an electron microscope such as a scanning electron microscope (SEM).

The mixing of the pre-baked starting material and powder silicon can be carried out by a usual method, using a ball mill, a powder mixer, or the like. Or, the mixture of the pre-baked starting material and powder silicon can be obtained by pouring relatively coarse scrap silicon in the pre-baked starting material and then pulverizing in a mortar or the like for mixing.

It is necessary to carry out the HIP treatment at a maximum ultimate temperature of about 1320° C. or more being close to a melting point of silicon because a vapor-phase growth reaction with a silane gas generated by a reaction of silicon with hydrogen, etc., which come from the pre-baked starting material, and an interface generated between the silicon liquid layer and the solid phase are necessary. Meanwhile, an upper limit of the maximum ultimate temperature is lower than 2000° C. which is the same as in the first aspect of the present invention. The preferred maximum ultimate temperature is within a range from about 1350° C. to about 1800° C., more preferably from about 1400° C. to about 1600° C.

The preferred maximum ultimate pressure during the HIP treatment is within a range from about 1 MPa to about 300 MPa, more preferably from about 5 MPa to about 200 MPa.

The nano-silicon material of one-dimensional shape of the present invention is vapor-phase-grown silicon in the form of fiber having a diameter of submicron size, and specifically includes a Si nano-wire having a diameter of from about 10 nm to about 100 nm and/or a Si nano-rod having a diameter of about 100 nm or more and less than about 1 μm. The length thereof is from several microns to several millimeters.

Other conditions are as explained in the first aspect of the present invention. Namely, the descriptions on the first aspect can be applied to the second aspect of the present invention unless they are inconsistent with the descriptions on the second aspect.

The third aspect of the present invention relates to the production of thin sheet graphite crystals and/or wrinkled and shrunk graphite crystals thereof and/or roll-shaped graphite crystals thereof, comprising dispersing in a solvent a pulverized resultant of mass of thin sheet graphite crystals composed of aggregates of thin sheet graphite crystals as a starting material, subjecting the dispersion to ultrasonic wave treatment and centrifuging, collecting a supernatant therefrom, and distilling off the solvent from the supernatant.

Here, a pressurized medium gas is deposited on the surface of the mass of thin sheet graphite crystals, and therefore, if desired, the mass of thin sheet graphite crystals or the pulverized resultant thereof may be subjected to heat-treatment (for example, at a temperature of 100° C. or more) to remove the pressurized medium gas and then subjected to the following steps. The mass of thin sheet graphite crystals may be pulverized after having been formed into a thinner laminated layer. Or, the mass of thin sheet graphite crystals may be formed into a thinner laminated layer after having been pulverized.

The mass of thin sheet graphite crystals composed of aggregates of thin sheet graphite crystals includes thin sheet graphite crystals aggregated without being laminated with each other, and a shape and form thereof is not limited. Specifically, there are exemplified (A) the cluster of thin sheet graphite crystals of the first aspect of the present invention composed of aggregates in such a state that thin sheet graphite crystals extend from the inside toward the outside (including isostatic graphite particles and bulky graphite structure thereof. A size of the graphite particles is from about 1 μm to about 1000 μm or from about 1 μm to about 100 μm. A diameter or a width of the thin sheet graphite crystals constituting the graphite particles is from about 0.1 μm to 500 μm, or from about 0.1 μm to about 50 μm, and a thickness thereof is from about 0.35 nm to about 100 nm, preferably from about 0.35 nm to about 10 nm, more preferably from about 0.35 nm to about 3.5 nm, or from about 1 nm to about 100 nm.); (B) a mass of thin sheet graphite crystals in the form of a film, in which each of the thin sheet graphite crystals is grown in the direction of "a" axis of the graphite crystals approximately being vertical to the substrate, and these thin sheet graphite crystals cover the surface of the substrate to form a film as a whole (A diameter or a width of the thin sheet graphite crystals constituting the mass is from about 1 μm to about 500 μm, or from about 1 μm to about 50 μm, and a thickness thereof is from about 0.35 nm to about 100 nm, preferably from about 0.35 nm to about 10 nm, more preferably from about 0.35 nm to about 3.5 nm, or from about 1 nm to about 100 nm.); (C) a mass of thin sheet graphite crystals in the form of a fiber, in which each of the thin sheet graphite crystals is grown in the direction of "a" axis of the graphite crystals being from the center of the fiber toward the outside, and many of these thin sheet graphite crystals lie in a row and as a whole and constitute aggregates in the form of a fiber (A diameter or a width of the mass is from about 1 μm to 500 μm, or from 1 μm to 50 μm, a length thereof is from 0.01 mm to 30 mm, and a diameter or a width of the thin sheet graphite crystals constituting the mass is from 0.1 μm to 500 μm, or from 0.1 μm to 50 μm, and a thickness thereof is from 1 nm to 100 nm.); (D) a mass of thin sheet graphite crystals in the form of a fiber, in which many of these thin sheet graphite crystals are laminated in the direction of "c" axis of the graphite crystals and constitute, as a whole, aggregates in the form of a fiber (The fiber is called a graphene-laminated carbon nanofiber (CNF). A diameter or a width of the mass is from about 0.2 μm to several microns, a length thereof is from about 10 μm to several millimeters, and a thickness of the thin sheet graphite crystals constituting the mass is about several nanometers.); and the like.

The "thin sheet graphite crystals" constituting the mass of thin sheet graphite crystals can include a single layer graphene. Example of other preferred "thin sheet graphite crystals" is several-layer graphene having a size as mentioned above (Few-layer graphene: multi-layer graphene up to about 10 layers having a thickness of from about 0.35 nm to about 3.5 nm).

The pulverizing can be carried out by physically grinding the mass of thin sheet graphite crystals into small pieces by means of a dry or wet mechanical pulverizer, a mixer, a blender, a ball mill, a vibration mill, an ultrasonic mill, a homogenizer, an ultrasonic homogenizer, an ultrasonic pulverizer, a mortar or the like. The wet pulverizing can be carried out, for example, by physically grinding the mass of thin sheet graphite crystals into small pieces in a solvent with a rotary mixer or the like. The same solvent as the one used for dispersing the pulverized mass of thin sheet graphite crystals can be used, and in this case, the pulverized mass can be subjected to ultrasonic wave treatment immediately after the wet pulverizing.

Forming into a thin layer can be carried out by subjecting the mass of thin sheet graphite crystals or the mass pulverized into small pieces as described above to peeling or cleaving. In this case, the cleaving can be carried out, for example, in the same manner as in the above-mentioned partial cleaving of the cluster of thin sheet graphite crystals.

Examples of the solvent which can be used in the third aspect of the present invention are carbonic acid esters such as 1,2-dichloroethane, benzene, thionyl chloride, acetyl chloride, tetrachloroethylene carbonate, dichloroethylene carbonate, benzoyl fluoride, benzoyl chloride, nitromethane, nitrobenzene, acetic anhydride, phosphorus oxychloride, benzonitrile, selenium oxychloride, acetonitrile, tetramethylsulfone, dioxane, 1,2-propanediol carbonate, benzyl cyanide, ethylene sulfite, isobutyronitrile, propionitrile, dimethyl carbonate, propylene carbonate, ethyl methyl carbonate and ethylene carbonate; alcohols such as phenyl phosphoric acid difluoride, methyl acetate, n-butyronitrile, acetone, ethyl acetate, water, phenyl phosphoric acid dichloride, diethyl ether, tetrahydrofuran, diphenyl phosphoric acid chloride, trimethyl phosphate, tributyl phosphate, dimethylformamide, N-methylpyrrolidine, n-dimethylacetamide, dimethyl sulfoxide, N-diethylformamide, N-diethylacetamide, pyridine, hexamethylphosphoric amide, hexane, carbon tetrachloride, diglyme, trichloromethane, 2-propanol, methanol, ethanol, propanol and ethylene glycol; methyl ethyl ketone, 2-methoxyethanol, dimethylacetamide, toluene, polybenzimidazole, and the like. These solvents can be used alone or in a mixture of two or more thereof.

In addition, a dispersant can be added to these solvents in order to increase an amount of thin sheet graphite crystals to be dispersed or to prevent agglomeration of the thin sheet graphite crystals in a solvent. Examples of a dispersant are surfactants and in addition, those having a week binding force to graphene and an electric attracting force such as a Coulomb's force and having a hydrophilic functional group such as hydroxyl and carboxyl in a structure thereof. Examples of the latter dispersants are monomers and polymers of phenols such as phenol and naphthol having hydroxyl bonded to a benzene nucleus, styrene, propylene, acrylonitrile, monomers and polymers having carbon double bond such as vinyl acetate, proteins such as collagen, keratin, actin, myosin, casein, albumin, GFP and RFP, amino acids such as glycine, tyrosine, threonine and glutamine, and the like.

Examples of surfactants to be used suitably are: anion based surfactants (anionic surfactants) such as fatty acid salts (for example, sodium dodecanoate), cholic acid salts (for example, sodium cholate), monoalkyl sulfates (for example, sodium lauryl sulfate), alkyl polyoxyethylene sulfate, alkyl benzene sulfonates (for example, sodium dodecyl benzene sulfonate) and monoalkyl phosphate; cation based surfactants (cationic surfactants) such as alkyl trimethyl ammonium salts (for example, cetyl trimethyl ammonium bromide), dialkyl dimethyl ammonium salts (for example, didecyl dimethyl ammonium chloride) and alkyl benzyl dimethyl ammonium salts (for example, alkyl benzyl dimethyl ammonium chloride); amphoteric surfactants (Gemini surfactants) such as alkyl dimethyl amine oxide and alkyl carboxybetaine; and non-ionic surfactants (nonionic surfactants) such as polyoxyethylene alkyl ether (for example, polyoxyethylene dodecyl ether), fatty acid sorbitan ester, alkyl polyglucoside, fatty acid diethanol amide and alkyl monoglyceryl ether. Among these, monoalkyl sulfates and fatty acid salts can be suitably used.

Among the above-mentioned solvents, preferred are dimethylformamide, water to which a dispersant (preferably a surfactant) is added, 2-methoxyethanol and the like.

An amount of a dispersant is within a range from 0.001 to 10% by weight, preferably from 0.02 to 5% by weight based on the weight of a solvent.

An amount of the mass of thin sheet graphite crystals is within a range from 0.001 to 50% by weight, preferably from 0.01 to 10% by weight based on the weight of a solvent.

A means for ultrasonic wave treatment is not particularly limited, and it can be carried out by using, for example, an ultrasonic cleaner. It is preferable that a frequency of an ultrasonic wave to be applied is within a range from about 20 kHz to about 100 kHz. A period of time for the treatment is preferably from about 1 minute to about 60 minutes.

It is preferable that centrifugation is carried out at an acceleration rate within a range from about 100 G to about 100000 G, preferably from about 100 G to about 10000 G, for about 1 minute to about 60 minutes, preferably for about 5 minutes to about 30 minutes.

In the supernatant obtained after the centrifugation are dispersed thin sheet graphite crystals and/or a thin layer obtained therefrom and/or wrinkled and shrunk graphite crystals thereof and/or roll-shaped graphite crystals thereof (This dispersion is referred to as "graphene dispersion"). To this dispersion can be added additives (for example, a viscosity improver, a dispersant, a diluent, and the like) which are usually used in this field, if desired so. The graphene dispersant can be used as it is for a transparent conductive film, a conductive film, a heat-conduction film or an additive therefor without distilling off a solvent. In addition, thin sheet graphite crystals and/or a thin layer obtained therefrom and/ or wrinkled and shrunk graphite crystals thereof and/or roll-shaped graphite crystals thereof (Hereinafter, these are collectively referred to as "Graphenes") can be obtained from the dispersion by distilling off the solvent through a usual method, and can be used for a transparent conductive film or the like or an additive therefor.

The thus obtained Graphenes have a diameter or a width of from several microns to several tens microns and a thickness of about 10 nm or less, preferably about 3.5 nm or less (the number of laminated layers is about ten), and have high crystallinity.

Figure 64:
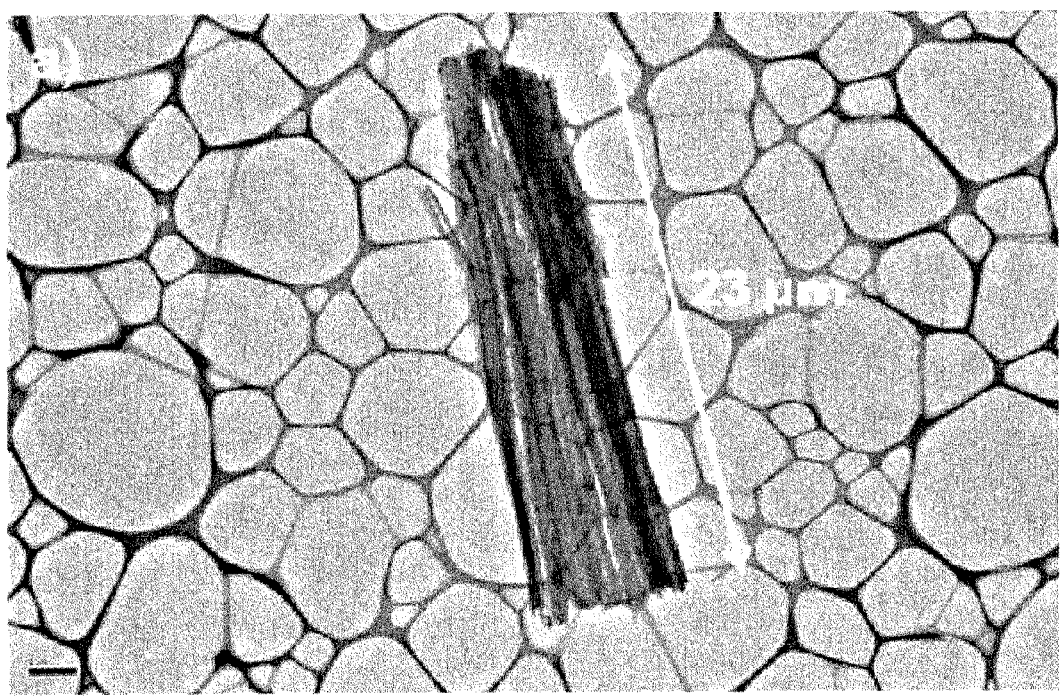

In the present invention, wrinkled and shrunk graphite crystals and/or roll-shaped graphite crystals of thin sheet graphite crystals (or a thin layer obtained therefrom) include any of wrinkled and shrunk graphite crystals and roll-shaped graphite crystals of thin sheet graphite crystals (or a thin layer obtained therefrom) and partly wrinkled and shrunk graphite crystals and partly roll-shaped graphite crystals thereof. "Wrinkling and shrinking" means that the thin sheet graphite crystals shrink by wrinkling, and the thin sheet graphite crystals may be wrinkled and shrunk in a single direction and may be wrinkled and shrunk in different directions at different portions. Also, "roll-shaping" means that it includes the thin sheet graphite crystals not only in the form of a single roll but also in the form having plural rolls at different portions. With respect to a size of the wrinkled and shrunk graphite crystals and/or roll-shaped graphite crystals of thin sheet graphite crystals (or a thin layer obtained therefrom), a length thereof is approximately several tens microns and a width thereof is several microns. Example of the wrinkled and shrunk graphite crystals of thin sheet graphite crystals is the thin sheet graphite crystals wrinkled and shrunk in a single direction as shown in FIG. 64.

The graphene dispersion can be used, for example, as an ink to be used for forming a circuit and a thin film for printable electronic products. In other words, a circuit and the like can be formed by printing the dispersion on a surface of a substrate by various printing methods such as flexographic printing (letterpress printing), offset printing (planographic printing), gravure printing (intaglio printing), screen printing, ink jet printing, electrophotography, heat transfer and laser transfer.

Moreover, a desired circuit can be obtained by applying the dispersion on a substrate by wet coating such as spin coating, slit coating, bar coating, blade coating or spray coating and then carrying out patterning on the coated substrate by using a patterning technique such as nano-micro contact printing, dip-pen lithography, nano-micro transfer, nanoimprinting, electron beam lithography, or photolithography.

Furthermore, a desired circuit can be obtained by applying the Graphenes on a substrate by dry coating such as vacuum deposition, sputtering or CVD to form a film on the substrate and then carrying out patterning on the substrate by using the above-mentioned patterning technique.

Moreover, various high functional films such as a transparent conductive film, a highly conductive film and a high thermal conduction film containing the Graphenes can be obtained by dispersing or mixing the Graphenes or dispersion obtained above in a starting resin for a PET film, an ionomer film (JO film), a polyethylene film made of high density polyethylene (HDPE), medium-density polyethylene (MDPE), low-density polyethylene (LDPE), linear low-density polyethylene (L-LDPE) or metallocene catalyst type linear low-density polyethylene (mL-LDPE), hard, semi-hard or soft polyvinyl chloride film (PVC film), polyvinylidene chloride film (PVDC film), polyvinyl alcohol film (PVA film), polypropylene film (PP film), polyester film, polycarbonate film (PC film), polystyrene film (PS film), polyacrylonitrile film (PAN film), ethylene-vinyl alcohol copolymer film (EVOH film), ethylene-methacrylic acid copolymer film (EMAA film), nylon film (NY film, polyamide (PA) film), cellophane, or polyimide film. Or, various high functional films such as a transparent conductive film, a highly conductive film and a high thermal conduction film coated with the Graphenes can be obtained by laminating or coating and drying the Graphenes or dispersion on the above-mentioned films.

For the production of the above circuits and films, it is possible to suitably use existing techniques such as melt extrusion molding method, inflation method, T die method, flat die method, solvent casting method, calendaring method, stretching method, multilayer processing method, co-extrusion method, co-extrusion by inflation method, multi-manifold method, laminating method, extrusion-laminating method, laminating method using an adhesive, wet laminating method, dry laminating method, hot-melt laminating method, heat-seal method, external heating method, internal heating method, corona treatment, plasma treatment, flame treatment, matt processing, coating, wet coating, dry coating, deposition, ion plating, and sputtering.

Moreover, resin composite materials such as molded resin articles and fiber-reinforced plastics (FRP) containing the Graphenes and having improved electric conductivity, thermal conductivity, heat resistance, strength, fracture toughness and flexibility can be obtained by dispersing or mixing the obtained Graphenes or dispersion in or with natural resins derived from plants such as rosin, dammar, mastic, copal, amber, balsam and natural rubber, natural resins derived from animals such as shellac, glue, tortoiseshell and casein, thermosetting resins such as phenol resin, epoxy resin, melamine resin, urea resin, unsaturated polyester resin, alkyd resin, polyurethane and thermosetting polyimide, thermoplastic resins such as polyethylene, high density polyethylene, medium-density polyethylene, low-density polyethylene, polypropylene, polyvinyl chloride, polyvinylidene chloride, polystyrene, polyvinyl acetate, polytetrafluoroethylene, ABS resin, AS resin and acrylic resin, and plastic materials such as engineering plastics such as polyamide, nylon, polyacetal, polycarbonate, modified polyphenylene ether, polybutylene terephthalate, polyethylene terephthalate, glass fiber-reinforced polyethylene terephthalate, cyclic polyolefin, polyphenylene sulfide, polysulfone, polyether sulfone, amorphous polyarylate, crystalline polymer, polyether ether ketone, thermoplastic polyimide and polyamide-imide, and, then, kneading, drying and molding.

Also, rubbers and rubber composite materials containing Graphenes and having improved electric conductivity, thermal conductivity, heat resistance, strength and flexibility can be obtained by dispersing or mixing the obtained Graphenes or dispersion in or with synthetic rubbers such as acrylic rubber, nitrile rubber, isoprene rubber, urethane rubber, ethylene propylene rubber, epichlorohydrine rubber, chloroprene rubber, silicone rubber, styrene-butadiene rubber, butadiene rubber, fluorine-containing rubber and polyisobutylene rubber, and, then, kneading, drying and molding.

Moreover, various composite materials containing Graphenes and having improved electric conductivity, thermal conductivity, heat resistance, strength, fracture toughness and electromagnetic wave shielding property can be obtained by dispersing or mixing the obtained Graphenes or dispersion in or with oxides of pottery, glass, cement, mortar, gypsum, enamel, alumina and zirconia, hydroxides such as hydroxyapatite, carbides such as silicon carbide and boron carbide, carbonates, nitrides such as silicon nitride, boron nitride, aluminum nitride and GaN, halides such as fluophosphate, and ceramic materials such as phosphate, barium titanate, high temperature superconductive ceramics, ferrite, lead zirconium titanate, steatite, zinc oxide and GaAs, and, then, kneading, drying, molding, baking and sintering.

Moreover, various materials containing Graphenes and having improved electric conductivity, thermal conductivity, heat resistance, magnetic properties, strength, elasticity and fracture toughness can be obtained by dispersing or mixing the obtained Graphenes or dispersion in or with elements such as tungsten, rhenium, osmium, tantalum, molybdenum, niobium, iridium, ruthenium, hafnium, technetium, boron, rhodium, vanadium, chromium, zirconium, platinum, thorium, lutecium, titanium, palladium, protactinium, thulium, scandium, iron, steel, cast iron, yttrium, erbium, cobalt, holmium, nickel, dysprosium, silicon, terbium, curium, gadolinium, beryllium, manganese, americium, promethium, uranium, copper, samarium, gold, actinium, neodymium, berkelium, silver, germanium, praseodymium, lanthanum, californium, calcium, europium, ytterbium, cerium, strontium, barium, radium, aluminum, magnesium, plutonium, neptunium, antimony, tellurium, zinc, lead, cadmium, thalium, bismuth, polonium, tin, lithium, indium, sulfur, sodium, potassium, rubidium, gallium, cesium, and alloys, carbides, oxides, nitrides and hydroxides of these elements, and, then, kneading, drying, molding, extruding, pressing, melting, casting, forging, rolling, granulating and flame spraying.

Among materials, graphene has most excellent electron mobility and strength, and therefore, from this point of view, high functionalization can be achieved in the above-mentioned various materials using graphene. Further, it is possible to obtain composite materials by further mixing it with fibers such as carbon fiber, graphene, carbon nanofiber and poly-paraphenylene terephthalamide according to necessity.

Furthermore, intercalation compounds can be formed by incorporating various guest species to Graphenes (especially multilayer Graphenes having a small number of layers) like the case of graphite, and in the case of a single layer graphene, various guest species can be coordinated on its surface (coordination compound). By selecting suitable materials as guest species, characteristics of semiconductors (including n-type and p-type semiconductors) such as a band gap and carrier mobility can be adjusted.

With respect to such guest species, examples of a donor type material which can be suitably used are alkali metals such as Li, K, Rb, Cs and Na; alkali earth metals such Ca, Sr and Ba; metal elements such as Sm, Eu, Yb and Tm; alloys such as K—Hg, Rb—Hg, K-Tl and Ba—Na; hydrogen or heavy hydrogen compounds such as KH, NaH and KD; and compounds, for example, Li-THF, K-THF, Rb-THF, Cs-THF, Na-THF, K—NH3, Be—NH3, Eu—NH3, Ba-THF and Sr-THF in which ammonia or various organic molecules are coordinated on alkali metals and alkali earth metals. Examples of an acceptor type material which can be suitably used are halogens such as $Br_2$, $F_2$, IC1 and $IF_3$, chlorides such as $MgCl_2$, $FeCl_3$, $FeCl_2$ and $NiCl_2$, halogen compounds such as $AlBr_3$, $CdBr_2$, $HgBr_2$, $FeBr_3$, $AsF_5$, $SbF_5$ and $NbF_5$, oxides such as $CrO_3$, $MoO_3$, $HNO_3$, $H_2SO_4$ and $HClO_4$, and the like. In addition, hydrogen fluoride, graphite fluoride, graphite oxide, and the like can be used suitably as an acceptor type material.

Examples of graphite intercalation compounds are a 1st stage compound, in which guest species are inserted between all the layers, a 2nd stage compound, in which guest species are inserted on every other layer, and a higher stage compound, and physical properties of the obtained material can be controlled by adjusting the number of stages. The same thing can be applied in the case of graphene, too. Examples of a method for adjusting the number of stages are methods of adjusting a temperature, a pressure, a concentration when bringing a solvent containing guest species or vaporized or liquefied guest species into contact with a host material.

For synthesizing the intercalation compound and coordination compound, it is possible to suitably use various synthesizing methods such as a two-zone method or a two valve method, in which Graphenes being a host material (one to be intercalated) and guest species (intercalating one) are charged into separate portions in a reaction tube mainly in vacuo or under reduced pressure or under inert gas atmosphere and, then, a temperature difference or a pressure difference is applied to both of the host material and guest species to undergo a vapor phase reaction; a method of subjecting a reaction tube containing a simple mixture of the respective materials to high temperature treatment; a solution method or an immersion method, in which a host material is immersed in various solutions; and a ternary solution method, in which complexes or ions of alkali metal and alkali earth metal are formed in a solvent and are brought into contact with a host material.

Moreover, it is effective to carry out functionalization of conventional carbon materials by mixing the obtained Graphenes or dispersion with various carbon materials such as artificial graphite, natural graphite, kish graphite, HOPG, activated carbon, carbon black, glassy carbon, diamond-like carbon and mesophase spherical graphite.

Further, it is possible or expectable for the obtained Graphenes or dispersion thereof to be applied to electrode materials for various batteries such as lithium ion battery, lithium ion capacitor, fuel cell electrode substrate, dye-sensitized solar cell, thin film solar cell, metal-air battery, lithium ion battery and nickel-metal hydride battery, occlusion material for hydrogen, etc., catalytic effect in a chemical reaction using a graphene surface, a novel reaction site in medical and pharmaceutical fields, and a drug delivery system.

The above-mentioned mass (B) and (C) of thin sheet graphite crystals can be produced in the same manner as in the production of (A) the cluster of thin sheet graphite crystals which is a target product in the first aspect of the present invention. For example, the mass (B) of thin sheet graphite crystals is generated on the surface of a spacer as a substrate in the above-mentioned method for producing the cluster (A) of thin sheet graphite crystals. Examples of usable material for the substrate are glassy carbon, diamond-like carbon, amorphous carbon, graphite, copper, nickel, iron, cobalt, other heat-resistant metals, ceramics, SiC, GaN, Si and other semiconductors. The surface of the substrate may be subjected to rough grinding or mirror polishing previously.

Moreover, the mass (D) of thin sheet graphite crystals can be produced by preparing a powdery and/or particulate material of an organic compound pre-baked to an extent of containing remaining hydrogen and carrying a catalyst thereon, charging the powdery and/or particulate material in a closed vessel made of heat resistant material, and subjecting the powdery and/or particulate material together with the vessel to hot isostatic pressing treatment using a compressed gas atmosphere. Examples of the catalyst are metals such as cobalt, iron, nickel and zinc, and it is desirable that the catalyst is carried in a state of being dispersed uniformly in the pre-baked starting material. The catalyst can be carried by mixing the pre-baked starting material with the catalyst adjusted in a fine shape, or by preparing a solution obtained by dissolving a metal chloride or metal complex (metal acetylacetonate) as a catalyst in water, alcohol or a mixture thereof and pouring the pre-baked starting material in the solution. An amount of the catalyst is usually 1000 ppm or more, preferably 2000 ppm or more, more preferably 10000 ppm or more, further preferably 100000 ppm or more based on the pre-baked starting material. The other conditions can be the same as in the method for producing the cluster (A) of thin sheet graphite crystals which is a target product in the first aspect of the present invention.

In the present invention, an amount of hydrogen is one measured in accordance with General Rules for Determination of Hydrogen in Metallic Materials (JIS Z 2614: 1990. Determination is carried out by an inert gas heating method which is a condition for "steel". The measurement is concretely conducted by heating a sample up to 2000° C. under argon gas atmosphere and measuring an integrated amount of generated hydrogen by gas chromatograph.).

There is no definite limitation in a size and a shape of particles constituting a powdery and/or particulate material, and a powdery material being composed of relatively fine particles and particulate material being composed of comparatively coarse particles are encompassed.

Further, the open pore ratio (apparent pore ratio) is a ratio of a volume of a (open) cavity which exists in a volume obtained from the outer shape of a material and into which a liquid or gas can invade. Generally a material having a high open pore ratio has a continuous pore and has air permeability. In this specification, the open pore ratio is obtained from the following equation.

$$\text{Open pore ratio (\%)} = \{(\text{Apparent specific gravity} - \text{Bulk specific gravity})/\text{Apparent specific gravity}\} \times 100$$

Apparent specific gravity: A value measured using a sample before pulverization by a helium gas substitution pycnometer method using a densimeter AccuPyc 1330-PCW available from Shimadzu Corporation Bulk specific gravity: A value obtained by dividing a sample weight by a volume calculated from outer dimensions of the sample Further, the total pore ratio is a ratio of a volume of a total cavity (including closed pores in addition to open pores) existing in a volume calculated from outer shape of a sample. In this specification, the total pore ratio is obtained from the following equation.

Total pore ratio (%)={(True specific gravity−Bulk specific gravity)/True specific gravity}×100

The true specific gravity is a specific gravity measured using a target material in a state of being pulverized into a fine powder in order to minimize an effect attributable to a cavity contained in the target material, and in this specification, the true specific gravity is measured using a powder sample having passed through a 74 μm filter.

An apparent specific gravity, a bulk specific gravity and a true specific gravity are synonymous with an apparent density, a bulk density and a true density, respectively.

In this specification, the spacer and the sleeve are used being placed inside the closed vessel made of graphite and is inserted between the inner wall of the vessel and the pre-baked starting material so that the both do not come into direct contact with each other. The spacer is one covering the pre-baked starting material mainly from the top and bottom thereof, and the sleeve is one covering the pre-baked starting material from the side thereof. There can be a case where discrimination between the spacer and the sleeve is meaningless depending on a shape of the vessel.

"Bulk" in the terms such as "bulky", "bulky state" or "bulky structure" means that the basic component units are put in a row.

The average particle size (particle size (average)) was measured by a laser diffraction scattering method using a laser diffraction density distribution measuring device. Namely, a density distribution was determined by emitting laser beam to the group of particles and calculating from a distribution pattern of intensity of beams diffracting and scattering therefrom.

In this specification, in the case of a numerical range shown, for example, by 1200 to 1900, this stands for a range of 1200 or more and 1900 or less.

EXAMPLE

The present invention is then described by means of Examples, but is not limited to these Examples.

Example 1

A powder of phenol-formaldehyde resin having an average particle size of 20 μm was pre-baked at each of maximum ultimate temperatures of 600° C., 700° C., 900° C. and 1000° C. under inert gas atmosphere. An amount of hydrogen remaining in the starting material after the pre-baking was analyzed in accordance with General Rules for Determination of Hydrogen in Metallic Materials (JIS Z 2614: 1990), and the results are shown in Table 1. The starting material pre-baked at each temperature was charged in a screw-capped (triangular screw) graphite crucible made of a material having a bulk density of 1.80 and an open pore ratio of 10%, and a threaded top cover was turned to be closed, and thus the crucible containing the pre-baked starting material was sealed. After charging the graphite crucible in hot isostatic pressing equipment, a temperature and pressure inside the equipment were increased to 600° C. and 70 MPa, respectively in one hour using argon gas, and thereafter, heating at a temperature elevating rate of 500° C. per hour and increase in a pressure were continued to reach a maximum ultimate pressure of 190 MPa and each of maximum ultimate temperatures of 1400° C., 1800° C., 2000° C. and 2500° C. Then, the maximum ultimate temperature and pressure were maintained for one hour, and the temperature was reduced to room temperature and the pressure was decreased. A period of time required from charging of the graphite crucible up to taking out thereof was 8 to 12 hours. A bulk density, a pore ratio and a true density of the treated sample were measured, and the results are shown in Table 1. Measurement of a density was carried out by a helium gas substitution pycnometer method using a densimeter AccuPyc 1330-PCW available from Shimadzu Corporation, and a true density was measured in a state of a sample being pulverized into a fine powder (hereinafter the same with respect to the measurement of densities) (Table 1).

TABLE 1

| | Pre-baking (sintering) | | Hot isostatic pressing treatment | | | Physical properties of material after treatment | | |
|---|---|---|---|---|---|---|---|---|
| Sample No. | Pre-baking ° C. | Amount of remaining hydrogen ppm | Temp. ° C. | Pressure MPa | Maintained time hr | True density g/cm³ | Bulk density g/cm³ | Pore ratio % |
| 1 | 600 | 20000 | 1400 | 190 | 1 | 2.16 | 0.66 | 69 |
| 2 | | | 1800 | 190 | 1 | 2.16 | 0.63 | 71 |
| 3 | 700 | 10000 | 1800 | 190 | 1 | 2.09 | 0.58 | 72 |
| 4 | 900 | 5000 | 1800 | 190 | 1 | 1.88 | 0.68 | 64 |
| 5 | | | 2000 | 190 | 1 | 1.93 | 0.99 | 49 |
| 6 | | | 2500 | 190 | 1 | 1.73 | 1.15 | 34 |
| 7 | 1000 | 2000 | 2000 | 190 | 1 | 1.83 | 1.01 | 45 |

Figure 16:
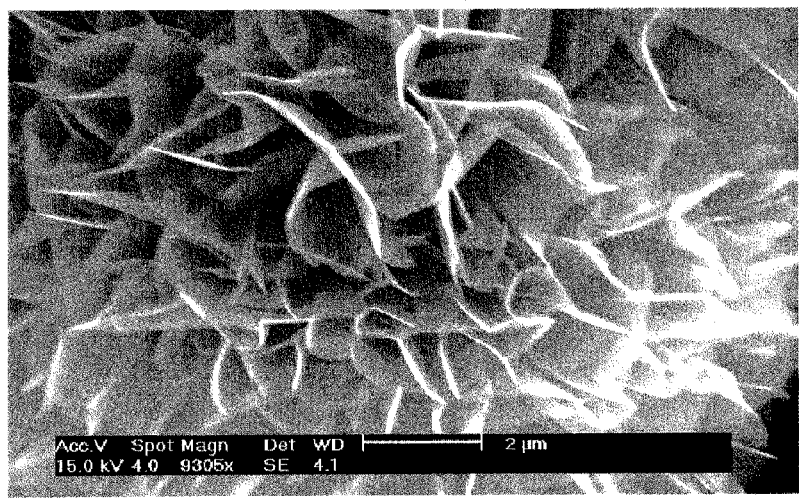
Figure 17:
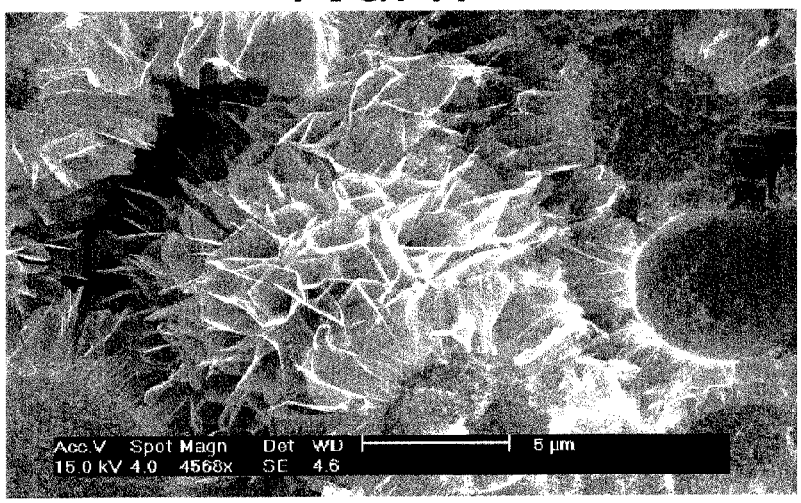

As shown in Table 1, in the case of a pre-baking temperature of 600° C. and an amount of remaining hydrogen of 20000 ppm measured by the above-mentioned measuring method, a true density being most approximate to a theoretical density of graphite was obtained (Sample Nos. 1 and 2), and as a pre-baking temperature increased, a value of a true density decreased (Sample Nos. 3 and 4). In the case of a pre-baking temperature of 900° C. and an amount of remaining hydrogen of 5000 ppm measured by the above-mentioned measuring method, a true density was 1.88 (Sample No. 4). In the case of a pre-baking temperature of 900° C. or 1000° C. and a maximum ultimate temperature of 2000° C. or 2500° C. at the hot isostatic pressing treatment, any of true densities are less than 2.0. FIG. 15 is an electron micrograph of a surface of the sample No. 1, and FIG. 16 is an expanded electron micrograph of the surface of FIG. 15. FIG. 17 is an electron micrograph of a broken surface of the sample No. 1, and graphite hexagonal planes are vapor-grown radially on a surface of the spherical pre-baked starting material.

Figure 18:
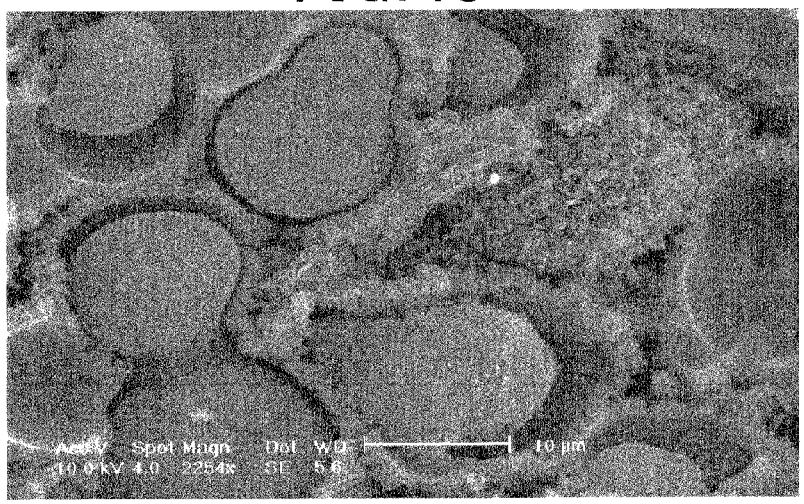

(FIG. 18 is an electron micrograph showing a broken surface of the sample No. 5, and FIG. 19 is an electron micrograph showing a broken surface of the sample No. 6. As compared with the sample No. 1, a degree of growth of carbon hexagonal planes is low, and especially in the case of the sample No. 6, a trace of etching of graphite due to hydrogen excited at a high temperature of 2000° C. or more was recognized.

Figure 20:
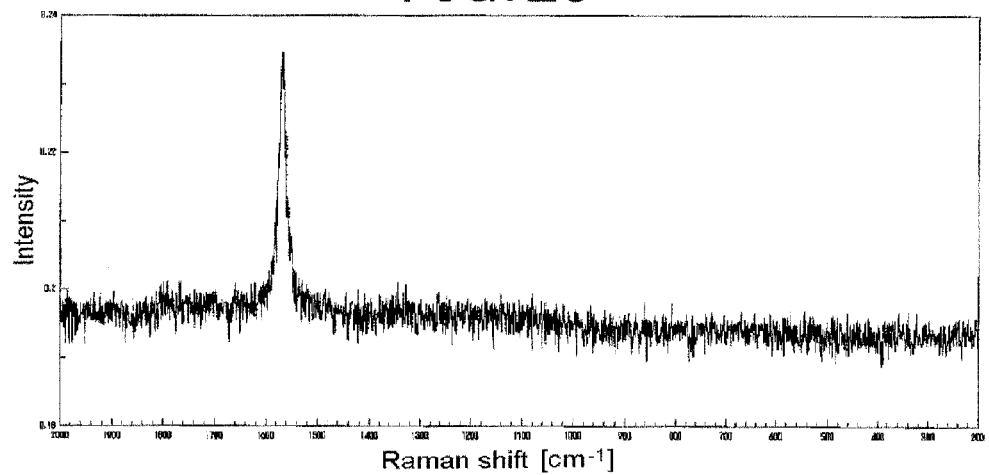
Figure 21:
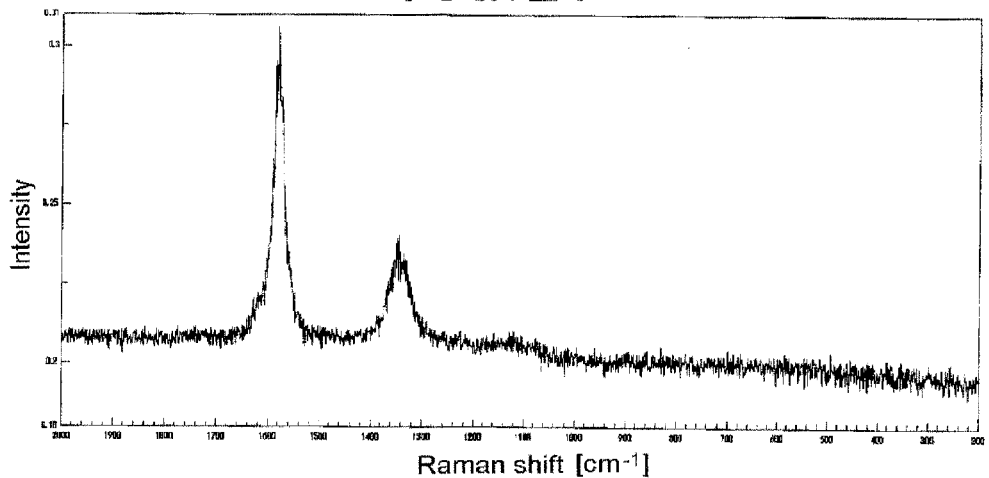

(FIG. 20 shows the measuring results of a spectrum of the sample No. 1 with Raman spectroscopy. A sharp peak of $SP^2$ graphite bonding around 1580 cm$^{-1}$ was recognized, and a peak around 1360 cm$^{-1}$ showing a turbostratic structure was hardly recognized. An R value represented by its intensity ratio of I1360/I1580 ($I_D/I_G$) was a value being close to zero, and the structure was one having very good graphite crystallinity. On the other hand, the measuring results of a spectrum of the sample No. 5 with Raman spectroscopy is shown in FIG. 21. A peak around 1360 cm$^{-1}$ was observed, and its intensity ratio of I1360/I1580 ($I_D/I_G$) was a large value.

Example 2

Figure 23:
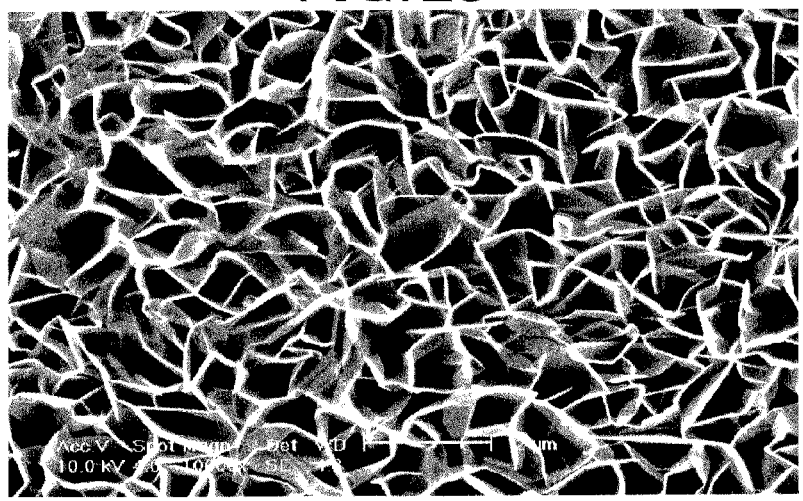

A powder of phenol-formaldehyde resin having an average particle size of 500 μm was pre-baked at a maximum ultimate temperature of 600° C. under inert gas atmosphere. The pre-baked starting material was treated in the same manner as in Example 1 except that a maximum ultimate temperature during the hot isostatic pressing treatment was 1400° C. A period of time required from charging of the graphite crucible up to taking out thereof was 12 hours. An electron micrograph of the treated sample is shown in FIG. 22, and an expanded photograph of the surface thereof is shown in FIG. 23. Vapor-phase-grown graphite grown radially over the whole surfaces of the spherical particles was recognized, but a bulk structure comprising bonded particles was not obtained. A true density of the obtained sample was 1.80.

Example 3

Figure 24:
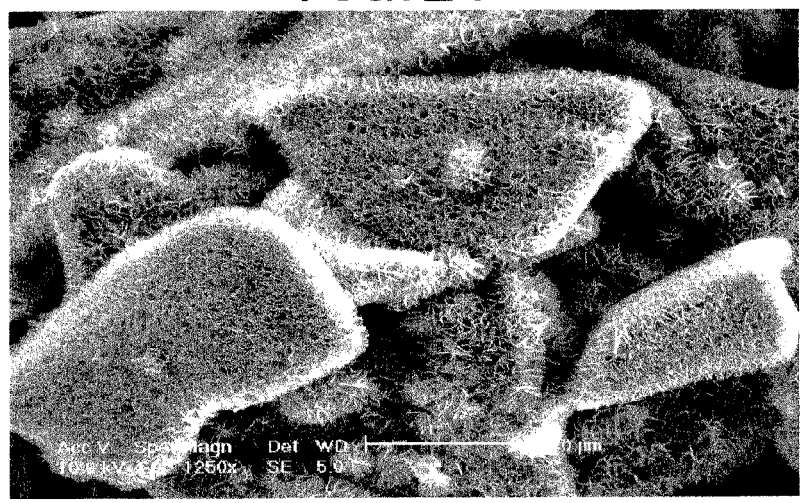

A waste PET beverage bottle was finely cut into an average particle size of about 200 μm (a size of the longest portion in a lengthwise and crosswise directions) and was pre-baked at a maximum ultimate temperature of 600° C. under inert gas atmosphere. The pre-baked starting material was pulverized into particles in a stainless steel mortar, and was then treated in the same manner as in Example 2. A period of time required from charging of the graphite crucible up to taking out thereof was 12 hours. An electron micrograph of the treated sample is shown in FIG. 24. Vapor-phase-grown graphite grown approximately radially over the whole surfaces of the irregular particles was recognized. A true density of the obtained sample was 1.90.

Example 4

A powder of phenol-formaldehyde resin having an average particle size of 20 μm was pre-baked at a maximum ultimate temperature of 700° C. under inert gas atmosphere. The pre-baked starting material was charged in each of graphite crucibles shown in Table 2, and a screw type top cover was tightened to seal the crucible containing the pre-baked starting material. The graphite crucibles were treated in the same manner as in Example 2 except that a maximum ultimate temperature during the hot isostatic pressing treatment was 1500° C.

TABLE 2

| | Graphite crucible | | | | Spacer | Sleeve | True density of |
| --- | --- | --- | --- | --- | --- | --- | --- |
| | Bulk | Pore | Screw | | Material: | Material: | treated |
| Sample No. | density g/cm³ | ratio % | Type | Pitch | No. of threads | Glassy carbon | Glassy carbon | sample g/cm³ |
| 8 | 1.85 | 8 | Triangular screw | 1 | 16 | Nil | Nil | 2.17 |
| 9 | 1.8 | 10 | Triangular screw | 1 | 16 | Nil | Nil | 2.16 |
| 10 | 1.6 | 23 | Triangular screw | 1 | 16 | Nil | Nil | 2.05 |
| 11 | 1.85 | 8 | Triangular screw | 1 | 3 | Nil | Nil | 2.01 |
| 12 | 1.85 | 8 | Triangular screw | 1 | 5 | Nil | Nil | 2.05 |
| 13 | 1.85 | 8 | Triangular screw | 2 | 8 | Nil | Nil | 1.99 |
| 14 | 1.85 | 8 | Square screw | 1 | 16 | Nil | Nil | 1.98 |
| 15 | 1.85 | 8 | Trapezoidal screw | 1 | 16 | Nil | Nil | 2.03 |
| 16 | 1.85 | 8 | Triangular screw | 1 | 16 | used | Nil | 2.19 |
| 17 | 1.85 | 8 | Triangular screw | 1 | 16 | used | used | 2.23 |

When the graphite crucible made of a material having a higher pore ratio and a lower bulk density is used, a true density of the treated sample decreases (Sample Nos. 8 to 10). When the pitch of the thread of the graphite crucible is 2 mm (Sample No. 13) and the number of threads is small (Sample Nos. 11 to 12), a true density thereof is low as compared with Sample No. 8. As compared with the case where the screw of the graphite crucible is triangular (Sample No. 8), a low true density was obtained in the case of a square screw (Sample No. 14) and a trapezoidal screw (Sample No. 15).

When charging the pre-baked starting material in a graphite crucible and then sealing while setting spacers, which are made of glassy carbon having low air permeability and a pore ratio of 0%, to cover the whole top and bottom of the pre-baked starting material (FIG. 4, Sample No. 16), a true density increased up to 2.19. Further, in Sample No. 17, in which in addition to these spacers, a sleeve was used so as to cover the whole side surface of the pre-baked starting material (FIG. 6), a true density of 2.23 was obtained.

Example 5

After pulverizing Sample Nos. 2, 5, 6, 16 and 17 in an agate mortar, the sample, polyvinylidene fluoride and carbon black were mixed in a weight ratio of 8:1:1 and the mixture was kneaded with a small amount of N-methyl-2-pyrrolidone to prepare a slurry. Then, the slurry was applied uniformly to a 0.05 mm thick nickel mesh of 200 mesh size using a stainless steel guide having 10 mm diameter punched holes to give a coating film having a diameter of 10 mm, which was then subjected to vacuum drying at 120° C. for 12 hours to distill off the solvent. The dried sample was put between the stainless steel plates and subjected to hot pressing at 120° C. at 20 MPa to produce a sample electrode having a diameter of 10 mm. A bipolar cell comprising the sample as a working electrode, metallic lithium as a counter electrode and $LiBF_4$ as an electrolyte was made using a glove box containing argon gas atmosphere, and charge-discharge characteristics were measured at a potential of from 0 to 3 V at a current density of 40 mA/g.

Table 3 shows a reversible capacitance and a coulombic efficiency after the fifth charge-discharge cycle as evaluation results of initial charge-discharge characteristics of each sample. As the true density of the material increased, both of a reversible capacitance and a coulombic efficiency were improved. In Sample No. 17, the reversible capacitance was 312 mAh/g, and the coulombic efficiency was 90.8%.

TABLE 3

| Sample No. | True density | Reversible capacitance mAh/g | Coulombic efficiency % |
|---|---|---|---|
| 2 | 2.16 | 126 | 89.7 |
| 5 | 1.93 | 118 | 74.2 |
| 6 | 1.73 | 50 | 96.3 |
| 16 | 2.19 | 291 | 90.7 |
| 17 | 2.23 | 312 | 90.8 |

Example 6

Sample No. 2 was sliced into a diameter of 10 mm and a thickness of 90 μm by using a fixed diamond multi-wire saw. A bipolar cell comprising the sliced sample dried at 120° C. for one hour as a working electrode, metallic lithium as a counter electrode and $LiBF_4$ as an electrolyte was made in a glove box containing argon gas atmosphere, and charge-discharge characteristics were measured at a potential of from 0 to 3 V at a current density of 40 mA/g. After the fifth charge-discharge cycle, the reversible capacitance was 225 mAh/g, and the coulombic efficiency was 95.3%. Since the sample comprises bulky vapor-phase-grown graphite containing no binder, a higher coulombic efficiency was obtained as compared with the case of preparing slurry using the same sample in the form of powder and a binder.

Example 7

Silicon chips generated when cutting an ingot of silicon for solar cell with a diamond saw together with a coolant were recovered in the form of slurry. The recovered slurry was dried in the air and then dried at 120° C. for twelve hours in a desiccator. In a stainless steel mortar, 80 parts by weight of phenol resin powder pre-baked at 600° C. and having an average particle size of 20 μm and 20 parts by weight of the dried silicon chips were poured, followed by sufficiently mixing while pulverizing. This starting material was charged in a screw type graphite crucible made of a material having a bulk density of 1.80 and an open pore ratio of 10%, followed by turning the screw type top cover to seal the crucible containing the starting material. The sealed graphite crucible was charged in hot isostatic pressing equipment, and then, equipment temperature and pressure were increased to 600° C. and 130 MPa using argon gas in three hours. Thereafter, heating at a temperature elevating rate of 500° C. per hour and increase in a pressure were continued to reach a maximum ultimate pressure of 190 MPa and a maximum ultimate temperature of 1300° C. Then, the maximum ultimate temperature and pressure were maintained for one hour, and the temperature was reduced to room temperature and the pressure was decreased. The sample after the treatment was in a bulky state, and a composite material in which fine silicon particles are dispersed in the vapor-phase-grown graphite was obtained.

Example 8

HIP treatment was carried out in the same manner as in Example 7 except that a temperature of 600° C. and a pressure of 130 MPa were reached in two hours instead of three hours and a maximum ultimate temperature was 1200° C.

Figure 25:
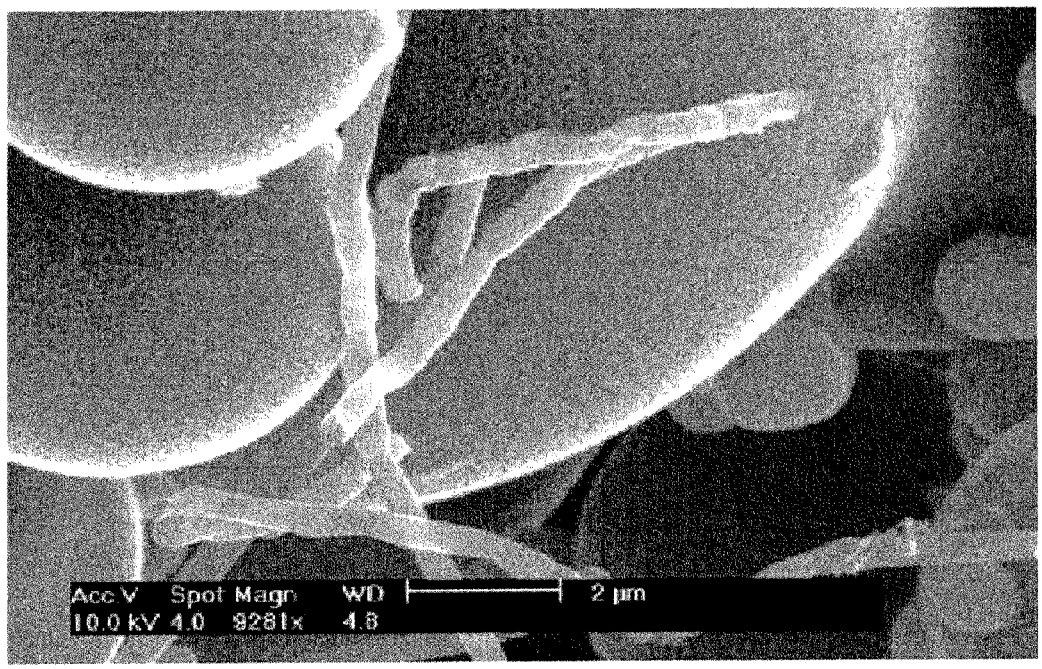
Figure 26:
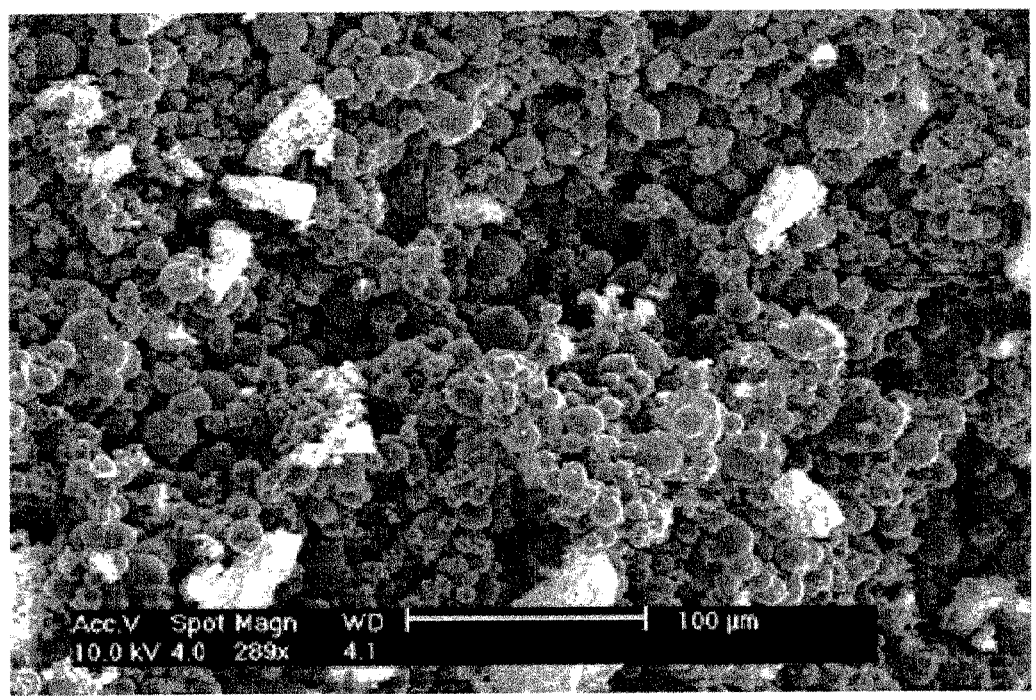

After the treatment, the pre-baked starting material kept a shape of primary particles without being connected to each other and vapor-phase-grown graphite comprising multilayer graphene had been grown on the surfaces thereof (FIG. 25). In addition, carbon nano-tubes having a diameter of about 100 nm were slightly generated. Silicon in the pre-baked starting material was present in the form of particles, and silicon products in the form of fiber were not generated. (FIG. 26)

<Graphite-Silicon Composite Material>

Example 9

HIP treatment was carried out in the same manner as in Example 8 except that a pressure of 70 MPa instead of 130 MPa was reached in initial three hours, a maximum ultimate temperature was 1450° C., and a maximum ultimate pressure was 90 MPa instead of 190 MPa.

Figure 29:
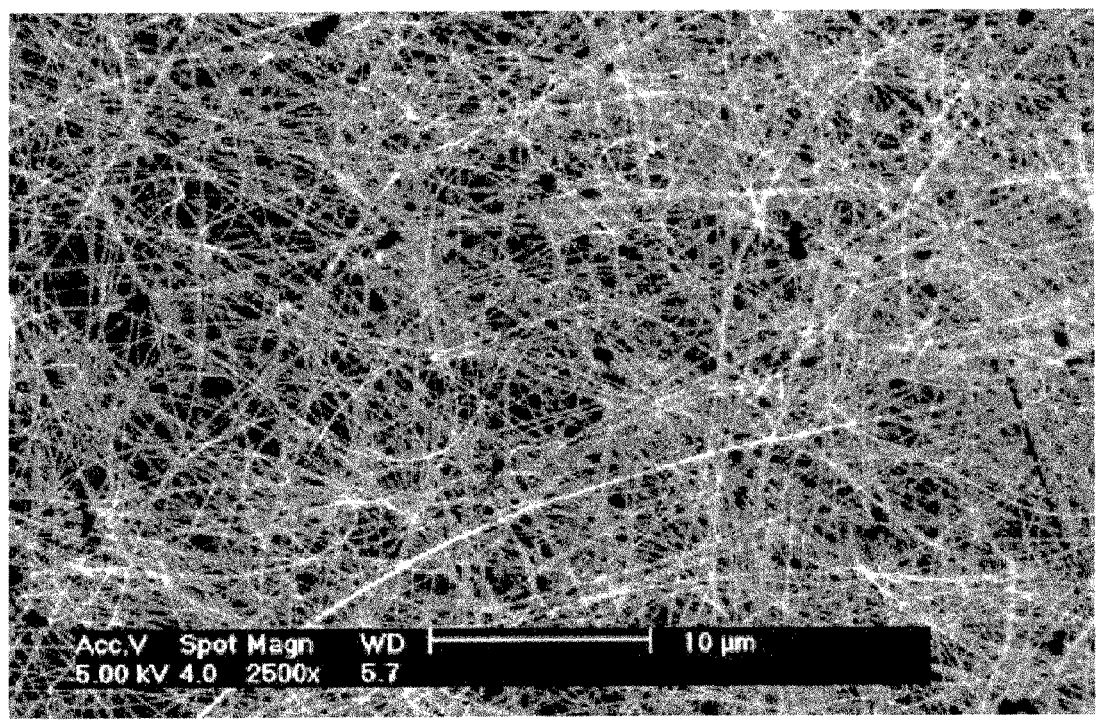
Figure 30:
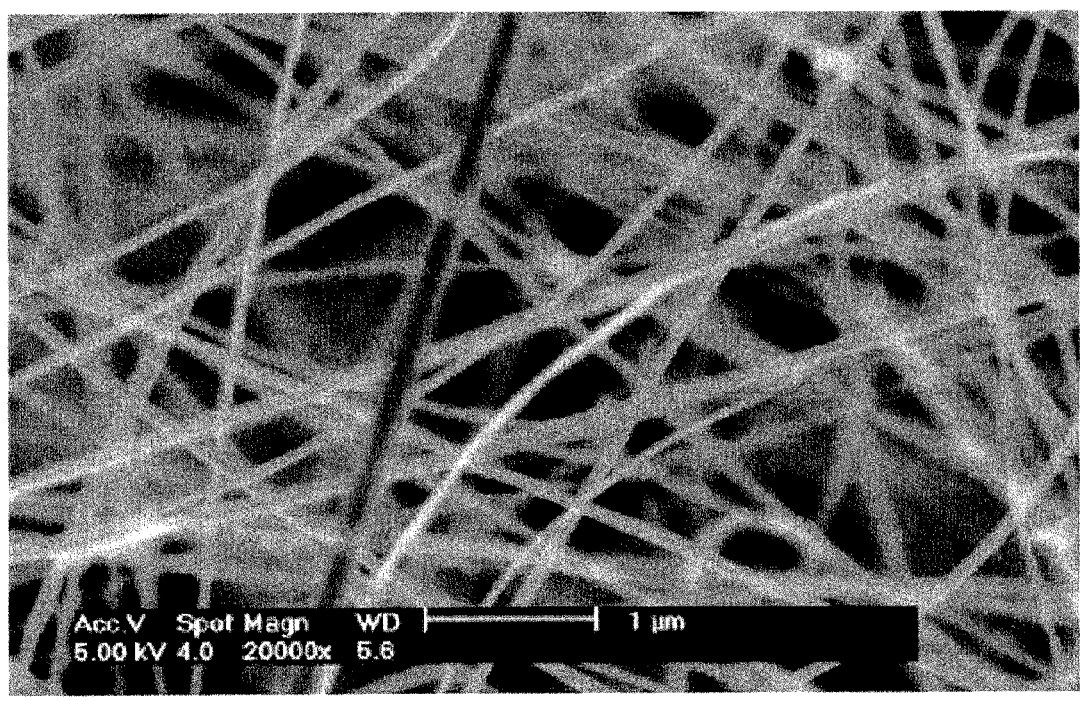

On the top portion of the graphite crucible after the treatment (in a space between the surface portion of the charged starting material and the top cover of the crucible), there was generated a large amount of fibrous products of a nano scale which had white appearance visually, were in the form of felt and comprised silicon, silicon carbide and silicon oxide (silicon compound). FIG. 27 is a photograph showing an appearance of these products stuck to the graphite crucible body and the surface of the top cover thereof, and FIGS. 28 to 30 show SEM photographs. The fibrous products having a diameter of from about 10 nm to about 100 nm and a length of from several microns to several millimeters were observed.

Figure 31:
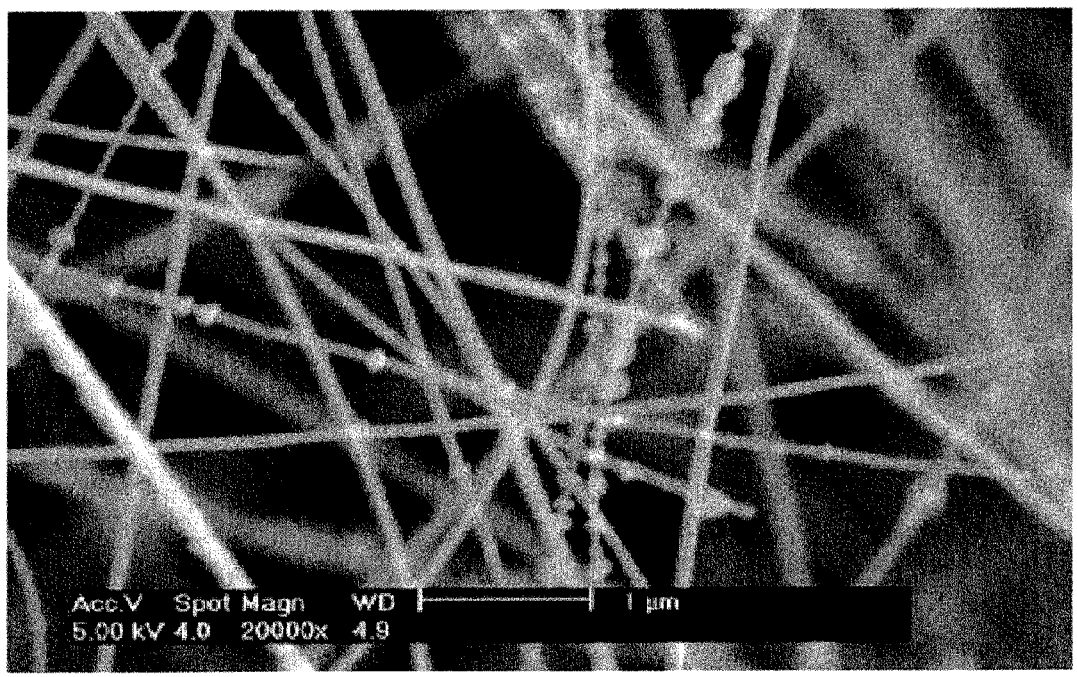
Figure 32:
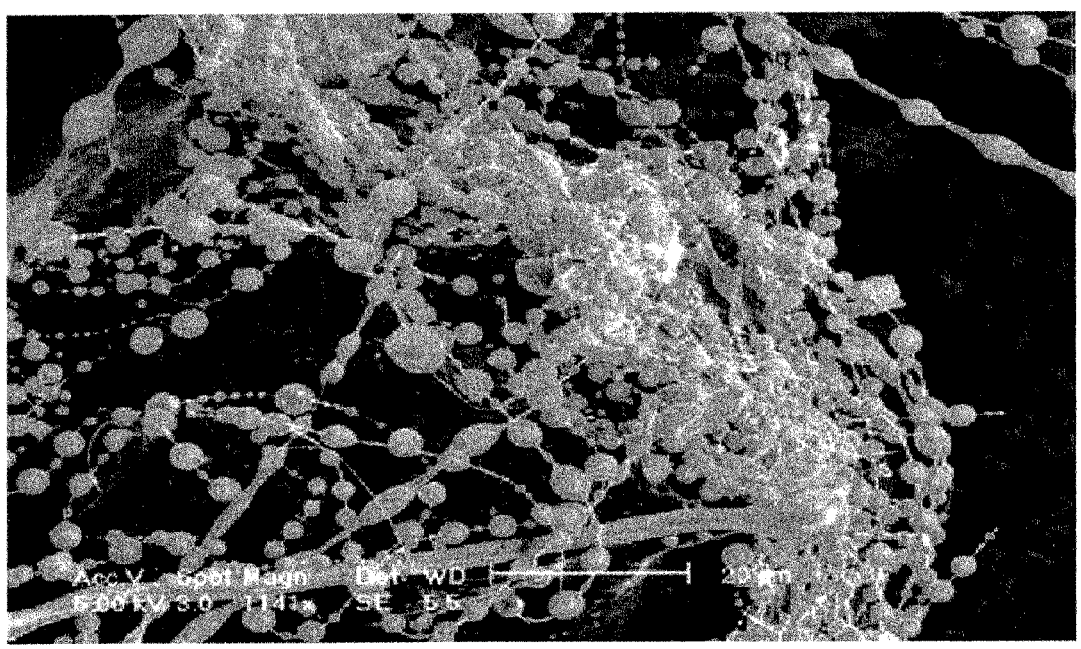

In the sample, as shown in FIG. 31, FIG. 32, there were observed many thin fibrous products on which spherical and disk-like products were coalescing in a moniliform shape.

Figure 33:
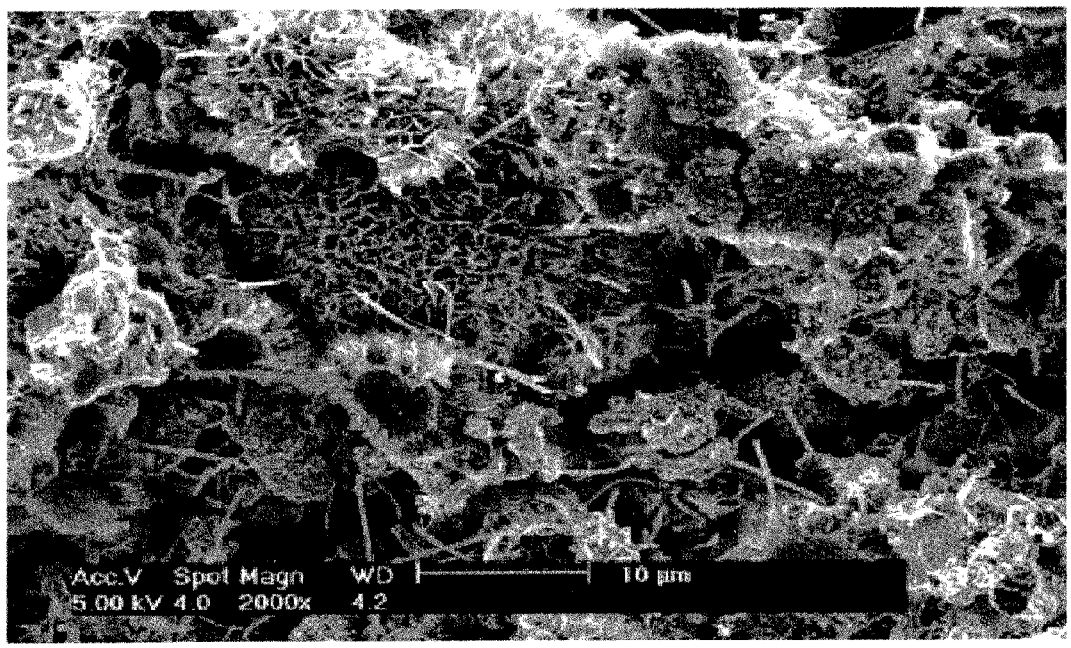
Figure 34:
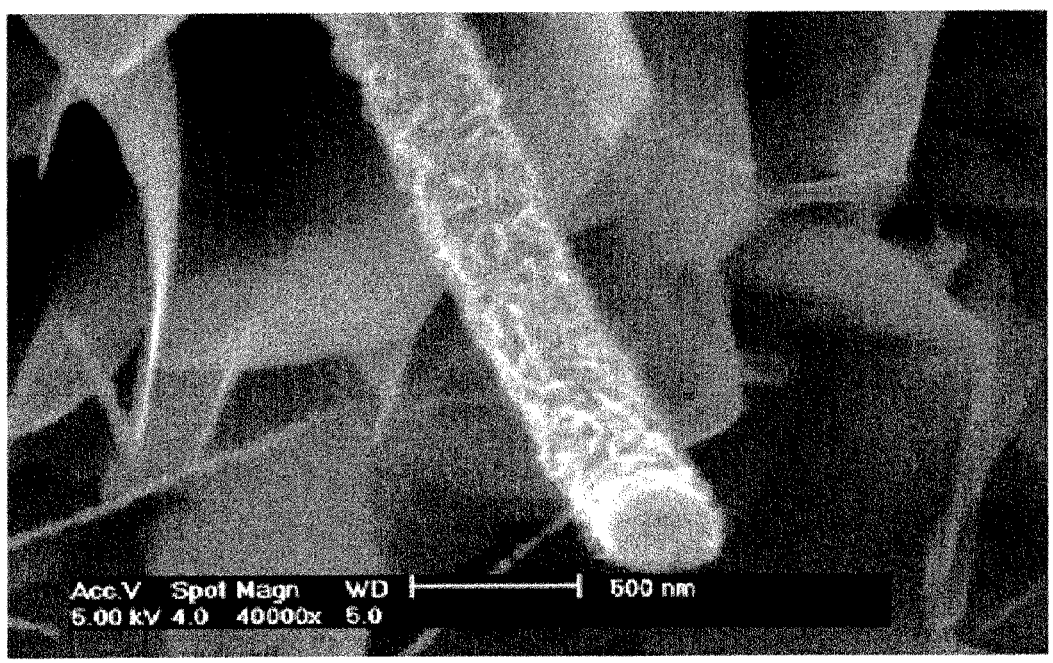
Figure 35:
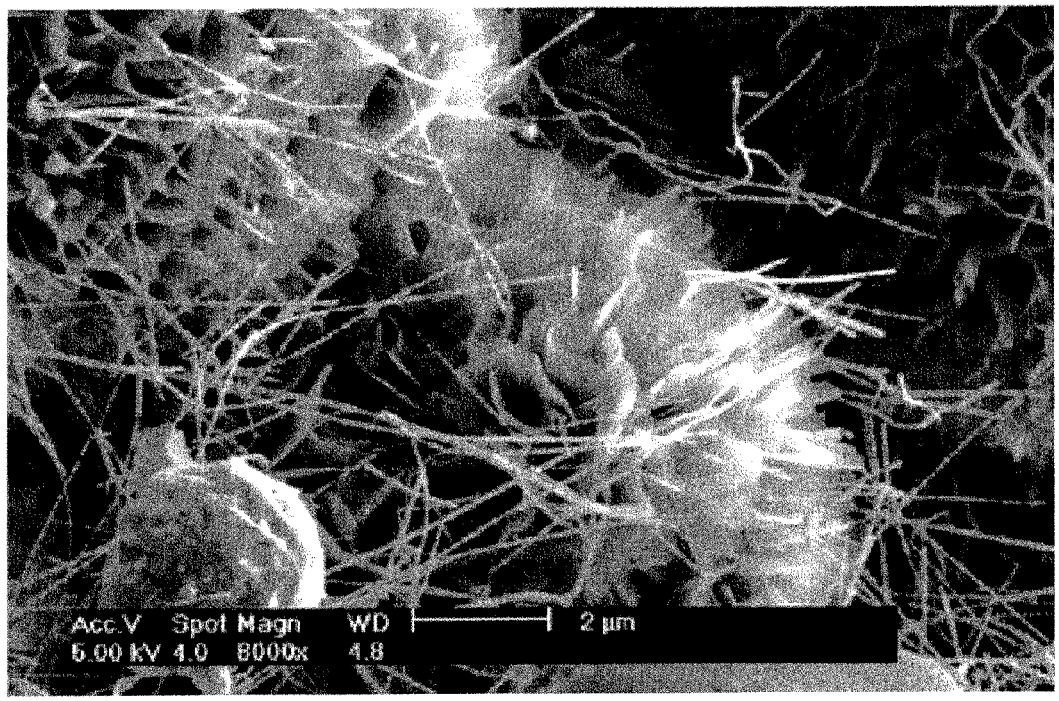
Figure 36:
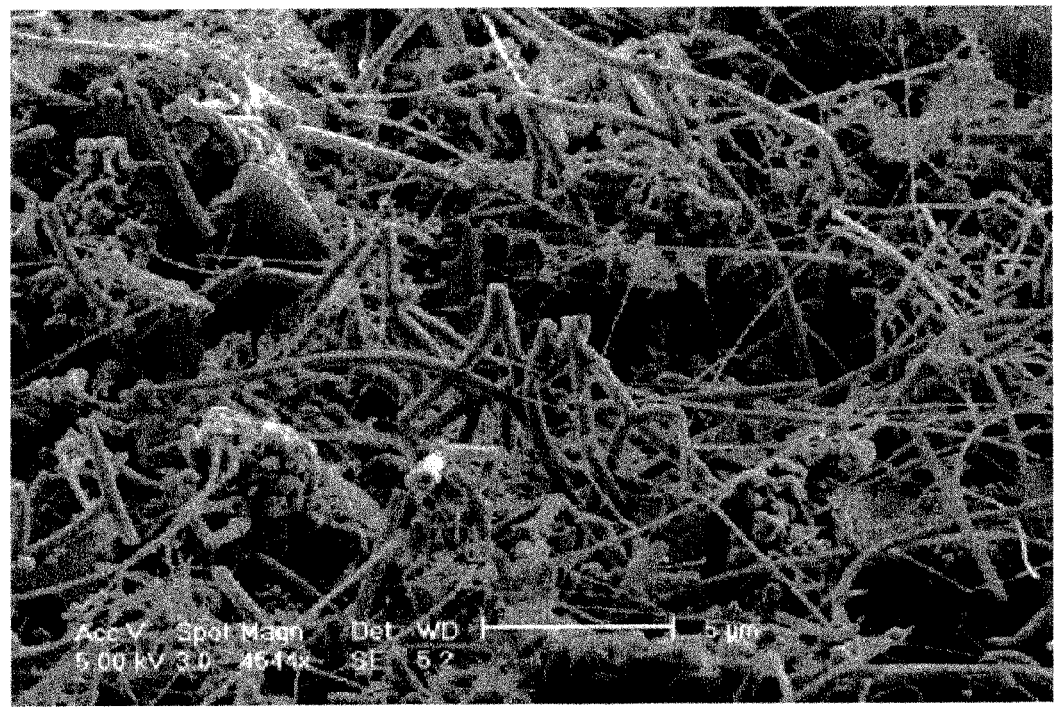
Figure 37:
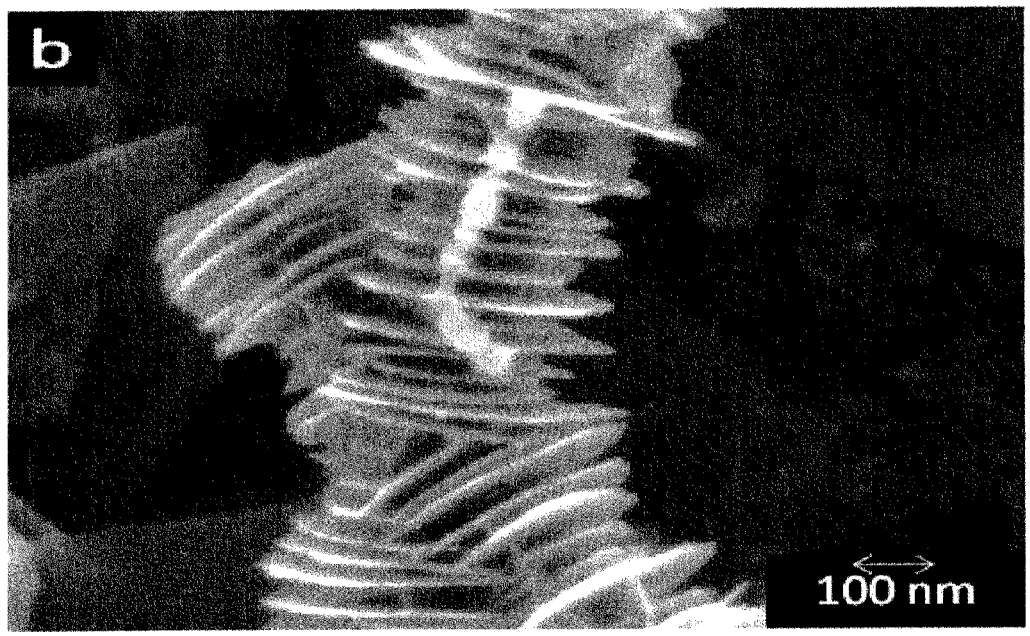

Furthermore, fibrous and rod-like silicon and silicon compound were generated in the generated vapor-phase-grown graphite, and a composite material comprising the vapor-phase-grown graphite and the fibrous and rod-like silicon and silicon compound was obtained. FIGS. 33 and 34 are SEM photographs showing rod-like silicon generated in the vapor-phase-grown graphite. FIG. 35 is SEM photograph showing fibrous silicon, silicon carbide and silicon oxide generated in the vapor-phase-grown graphite. FIG. 36 is an SEM photograph showing a portion where a large amount of rod-like silicon is generated, and FIG. 37 is an SEM photograph showing a portion where among silicon products, disc-like products are coalescing on the fibrous products in a moniliform shape. These products in the sample are listed up in Table 4.

Figure 38:
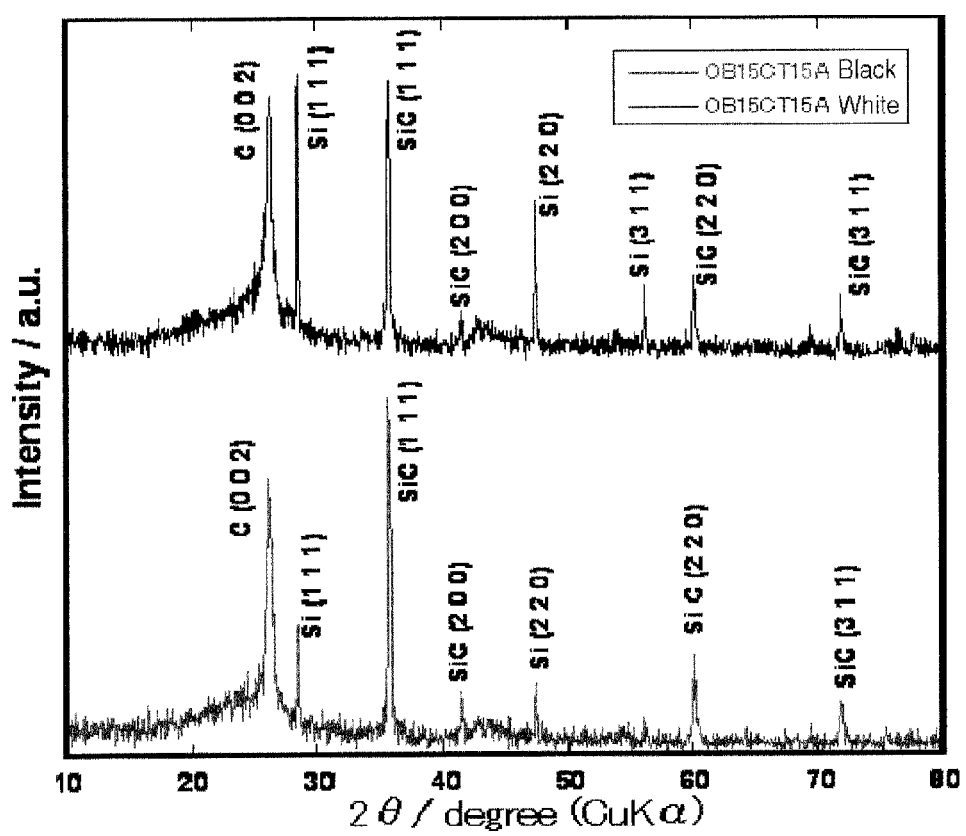

(FIG. 38 shows X-ray diffraction patterns of a portion generated in the form of felt and a portion generated in the vapor-phase-grown graphite (The upper one is a pattern of a portion generated in the form of felt and the lower one is a pattern of a portion generated in the vapor-phase-grown graphite). In both of X-ray diffraction patterns of FIG. 38, diffraction patterns of graphite, silicon (Si) and silicon carbide (SiC) are observed, and it can be confirmed that these fibrous products are composed of Si and SiC. Silicon oxide is in an amorphous form, and an X-ray diffraction pattern thereof could not be obtained.

Figure 40:
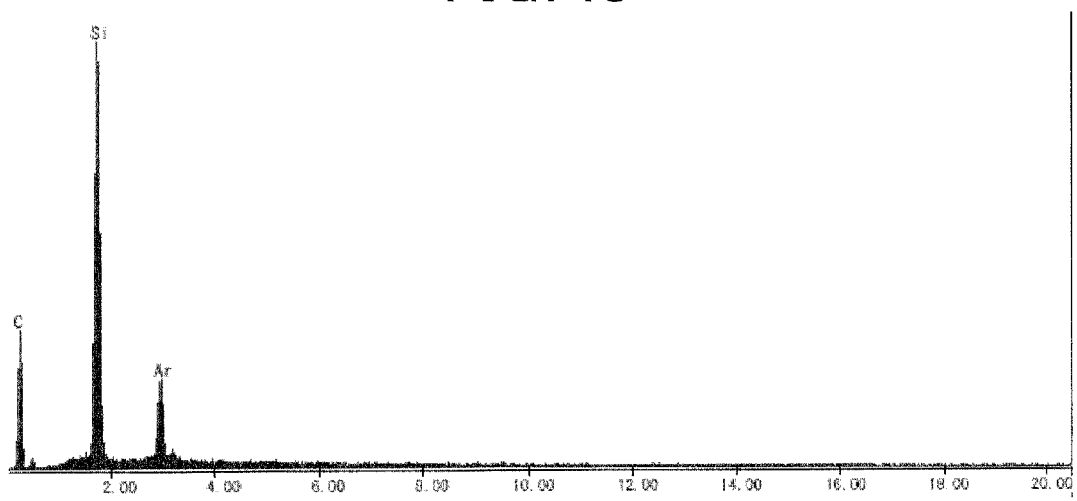
Figure 41:
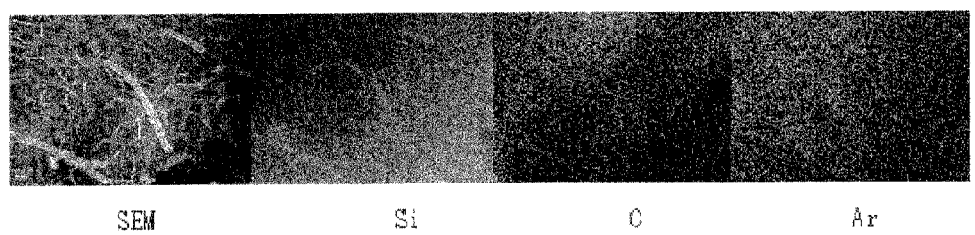

(FIG. 39 is an SEM showing vapor-phase-grown graphite and rod-like silicon, FIG. 40 shows the measuring results of EDX (energy dispersive X-ray spectroscopy) of the portion measured in FIG. 39, and FIG. 41 shows characteristic X-ray map showing existence of each element. From these results, it can be confirmed that rod-like silicon is the product of Si only because a map of C shows nothing with respect to the rod-like portion, as shown in the characteristic X-ray map. The peak represented by Ar in the characteristic X-ray data is derived from the presence of argon gas occluded in the vapor-phase-grown graphite.

Figure 42:
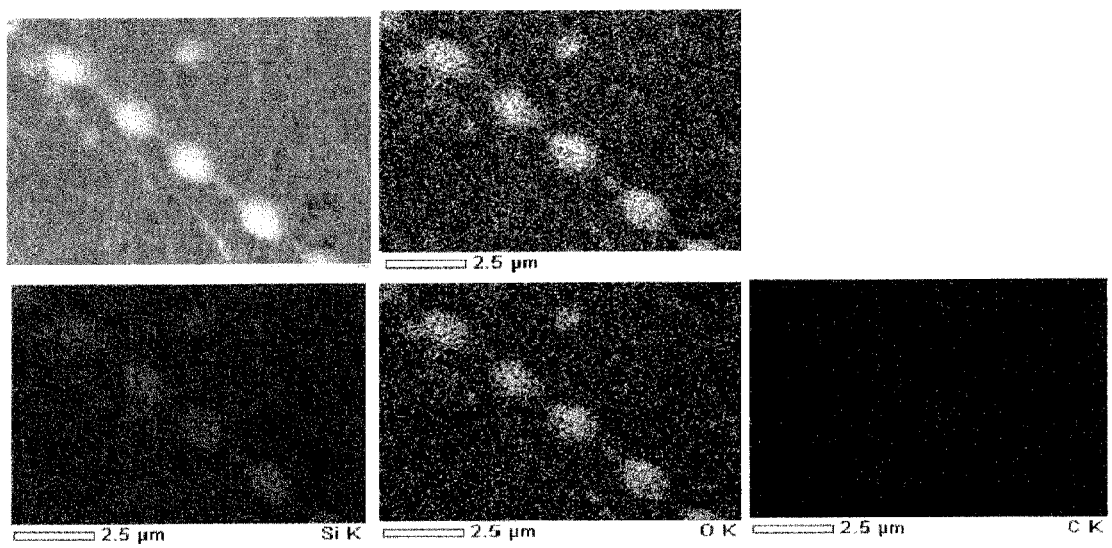
Figure 42:
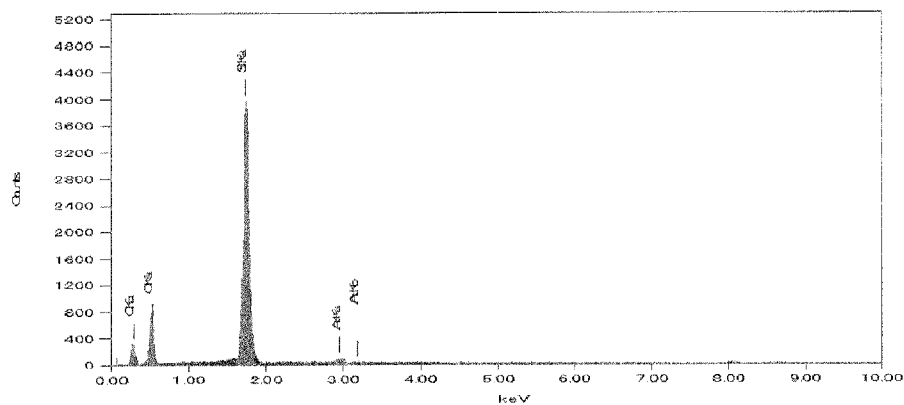

(FIG. 42 shows characteristic X-ray patterns and map of the products generated in a moniliform shape (FIGS. 31 and 32). In this case, a peak and a map indicating the existence of Si and O were observed, and the existence of silicon oxide (SiO, SiO2) was confirmed. However, in the characteristic X-ray spectroscopy, only vicinity portion of surface can be observed, and therefore, it can be considered that fibrous Si and Si in a moniliform shape exist in inner portions of the products.

TABLE 4

Silicon products generated in Example 9

| Designation | Forms | FIG. No. |
|---|---|---|
| Si nano-wire | Wire-like silicon | 28, 29, 30, 35 |
| Si nano-rod | Rod-like silicon | 33, 34, 36 |
| SiC nano-wire | Wire-like silicon carbide | 28, 29, 30, 35 |
| SiO nano-wire | Wire-like silicon oxide | 31, 35 |
| Si nano-chain | Spherical and disk-like silicon is grown in a moniliform on wire-like silicon | 32 |
| SiO nano-chain | Spherical and disk-like silicon oxide is grown in a moniliform on wire-like silicon oxide | 32 |

Example 10

Silicon chips generated when cutting an ingot of silicon for solar cell with a diamond saw together with a coolant were recovered in the form of slurry. The recovered slurry was dried in the air and then dried at 120° C. for twelve hours in a desiccator. In a stainless steel mortar, 80 parts by weight of each of phenol resin powder pre-baked at 900° C., 600° C. and 500° C. and having an average particle size of 20 μm and 20 parts by weight of the dried silicon chips were poured, followed by sufficiently mixing while pulverizing. These starting materials were charged in a screw type graphite crucible made of a material having a bulk density of 1.80 and an open pore ratio of 10%, followed by turning the screw type top cover to seal the crucible containing the starting material. The sealed graphite crucible was charged in hot isostatic pressing equipment, and then, equipment temperature and pressure were increased to 500° C. and 70 MPa using argon gas in three hours. Thereafter, heating at a temperature elevating rate of 500° C. per hour and increase in a pressure were continued to reach a maximum ultimate pressure of 90 MPa and a maximum ultimate temperature of 1400° C. Then, the maximum ultimate temperature and pressure were maintained for one hour, and the temperature was reduced to room temperature and the pressure was decreased.

Figure 43:
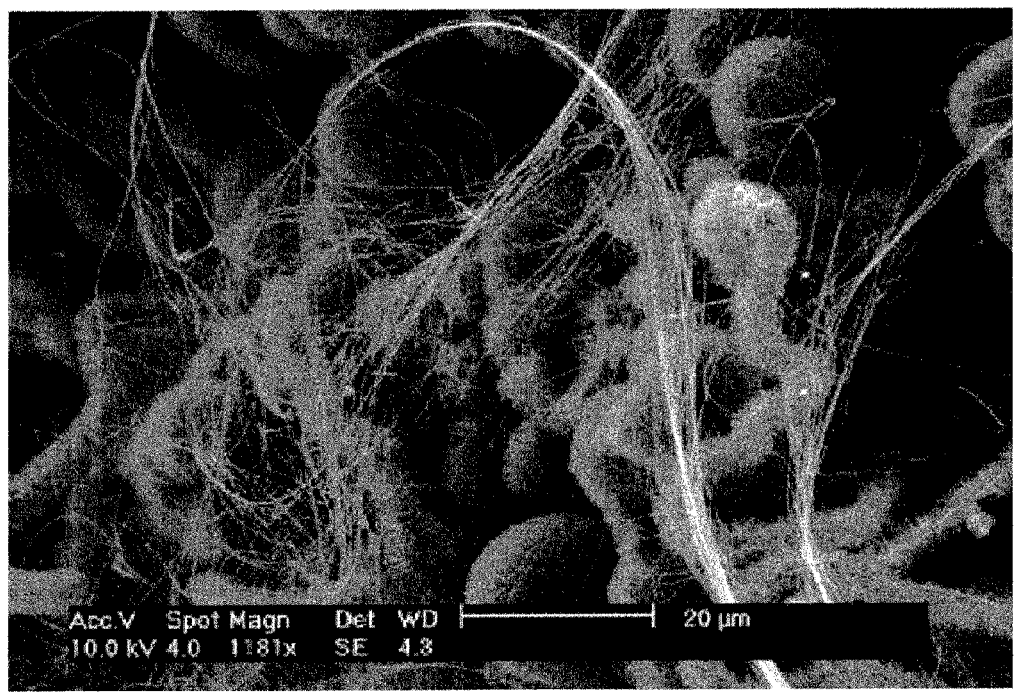
Figure 44:
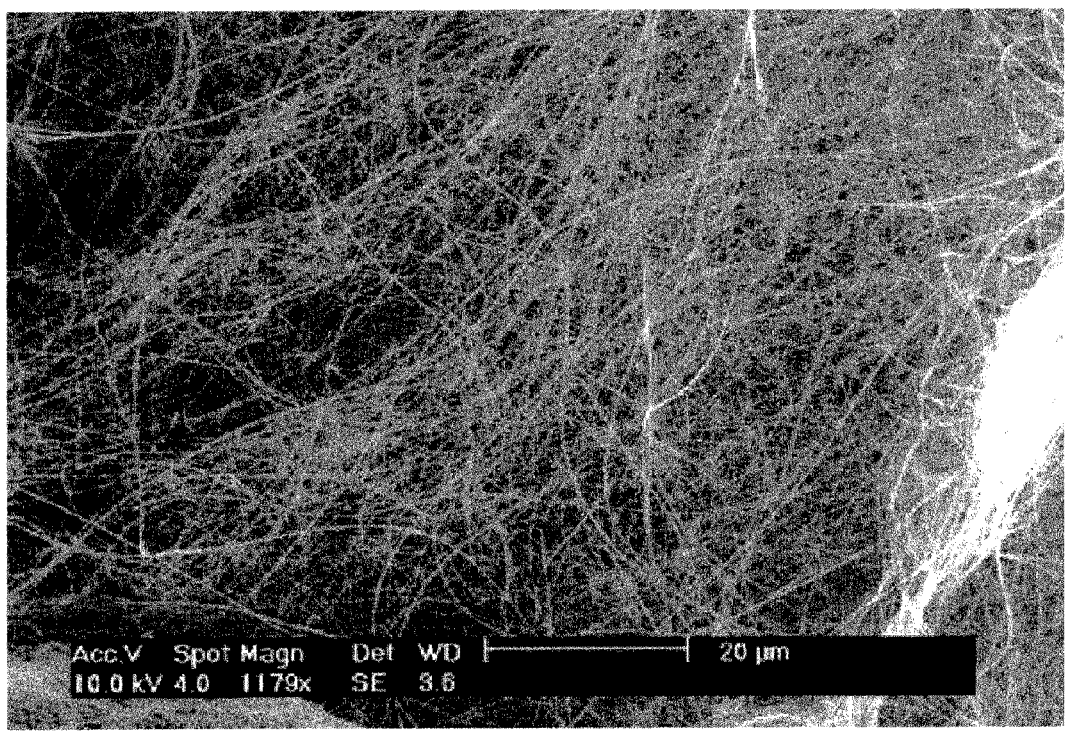

Wire-like silicon was generated in any of three kinds of samples subjected to pre-baking at different temperatures. In the cases of the pre-baking temperatures of 500° C. and 600° C., a large amount of wire-like silicon was generated on the surface and the inside of the sample, and silicon in the form of felt was remarkably observed on the surface of the sample (FIG. 44). In the case of the pre-baking temperature of 900° C., wire-like silicon was generated on the surface, but silicon in the form of felt was not observed on the surface and a small amount of silicon in the form of felt was generated inside the sample (FIG. 43).

<Mass (B) of Thin Sheet Graphite Crystals in the Form of Thin Film>

Example 11

Figure 45:
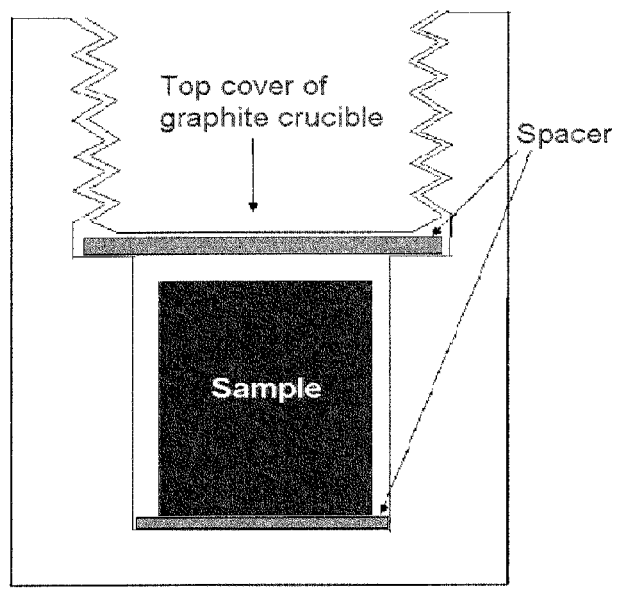

A powder of phenol-formaldehyde resin having an average particle size of 20 μm was pre-baked at a maximum ultimate temperature of 500° C. under inert gas atmosphere. An amount of hydrogen remaining in the starting material after the pre-baking was analyzed in accordance with General Rules for Determination of Hydrogen in Metallic Materials (JIS Z 2614: 1990), and the amount of remaining hydrogen was 40000 ppm. The pre-baked starting material was charged in a screw type graphite crucible made of a material having a bulk density of 1.80 and an open pore ratio of 10% while being interposed between spacers made of glassy carbon, and a screw type top cover was turned to be closed, and thus the crucible containing the pre-baked starting material was sealed. As shown in FIG. 45, the screw of the top cover of the graphite crucible was tightened so that the top spacer is brought into close contact with a guide portion of the graphite crucible by a tightening force of the screw, and thereby, a degree of sealing is increased. After charging the graphite crucible in hot isostatic pressing equipment, a temperature and pressure inside the equipment were increased to 700° C. and 70 MPa, respectively in one hour using argon gas, and thereafter, heating at a temperature elevating rate of 500° C. per hour and increase in a pressure were continued to reach a maximum ultimate pressure of 190 MPa and a maximum ultimate temperatures of 1800° C. Then, the maximum ultimate temperature and pressure were maintained for one hour, and the temperature was reduced to room temperature and the pressure was decreased. The spacers made of glassy carbon were those subjected to mirror grinding.

Figure 46:

When taking out the treated sample, a film-like product of silver color having a metallic gloss had been deposited on the spacer made of glassy carbon, as shown in FIG. 46. This film-like product could be peeled off easily from the spacer, and had strength enough for working as a thin film. When the surface of the obtained film-like product was observed with an electron microscope, a state of each of thin sheet graphite crystals being grown approximately vertically to the surface of the spacer and being aggregated was observed as one embodiment of a mass of thin sheet graphite crystals composed of aggregates in such a state that thin sheet graphite crystals extend from the inside toward the outside. Also, multi-layer graphene grown like flower leaves was included therein. (FIGS. 47 to 51)

<Mass (C) of Thin Sheet Graphite Crystals in the Form of Fiber>

Example 12

A powder of phenol-formaldehyde resin having an average particle size of 20 μm was pre-baked at a maximum ultimate temperature of 600° C. under inert gas atmosphere. The pre-baked starting material was charged in a screw type graphite crucible made of a material having a bulk density of 1.80 and an open pore ratio of 10%, and a screw type top cover was turned to be closed, and thus the crucible containing the pre-baked starting material was sealed. After charging the graphite crucible in hot isostatic pressing equipment, a temperature and pressure inside the equipment were increased to 700° C. and 70 MPa, respectively in one hour using argon gas, and thereafter, heating at a temperature elevating rate of 300° C. per hour and increase in a pressure were continued to reach a maximum ultimate pressure of 190 MPa and a maximum ultimate temperature of 1400° C. Then, the maximum ultimate temperature and pressure were maintained for one hour, and the temperature was reduced to room temperature and the pressure was decreased. An apparent density of the treated sample was 1.60, and a true density thereof was 2.09. Measurement of a density was carried out by a helium gas substitution pycnometer method using a densimeter AccuPyc 1330-PCW available from Shimadzu Corporation, in a state of the sample being pulverized into a fine powder.

Figure 52:
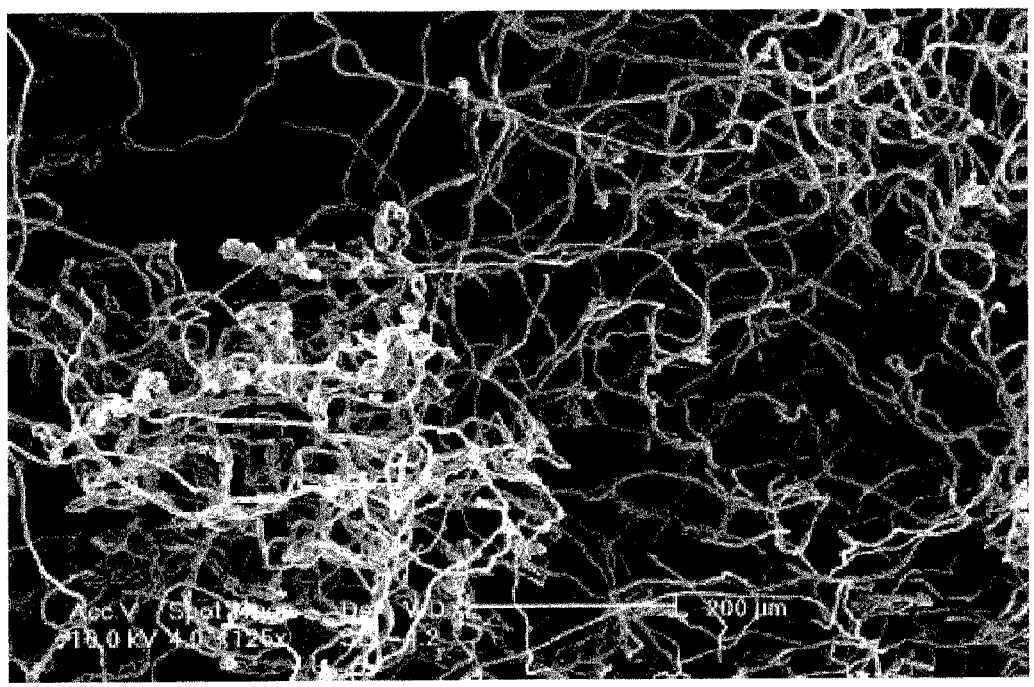
Figure 53:
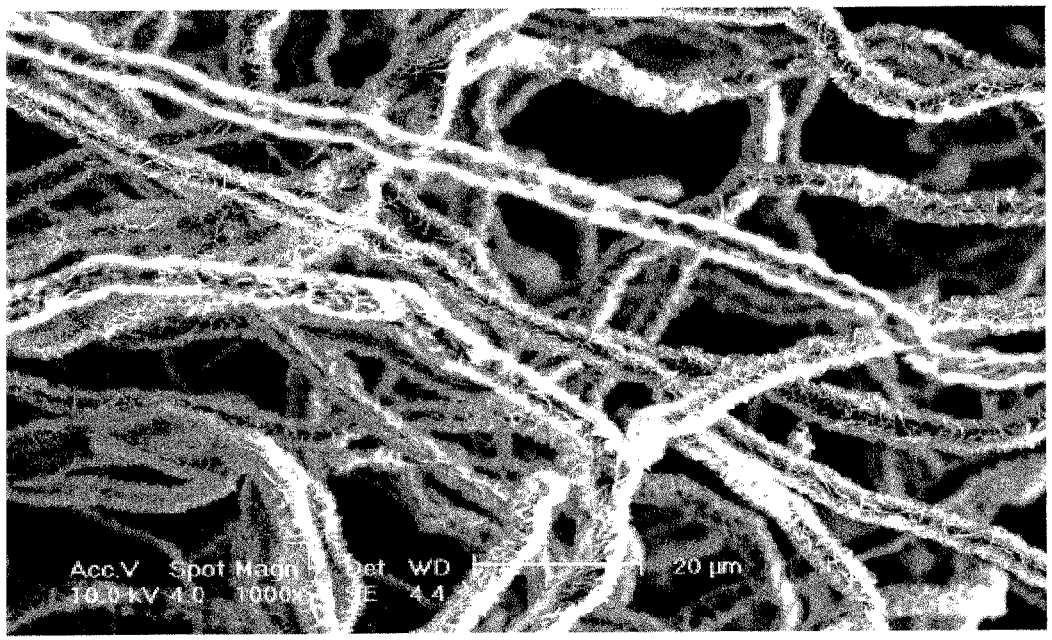
Figure 54:
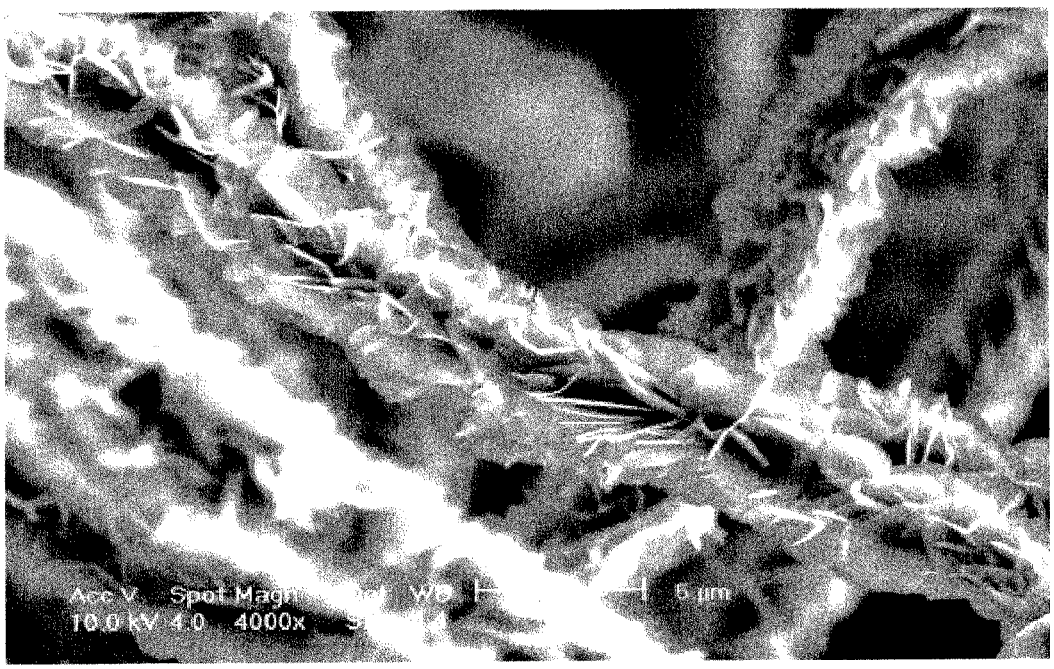

On the treated sample, vapor-phase-grown fibers having a diameter of several microns and a length of from several microns to several millimeters were generated (FIGS. 52 to 54). These fibers showed one embodiment of a mass of thin sheet graphite crystals composed of aggregates in such a state that thin sheet graphite crystals extend from the inside toward the outside, and were in the special form that the thin sheet graphite crystals grow from the center of the fibers toward the outside thereof. Though these fibers existed inside the material, they were grown as fairy long fibers around the surface portion.

Example 13

Treatment was carried out in the same manner as in the preceding Example except that in the HIP treatment, after having reached 700° C., the inside temperature was increased at a temperature elevating rate of 700° C. per hour and a maximum ultimate temperature was set to 1450° C. An apparent density of the treated sample was 1.66, and a true density thereof was 2.05. Measurement of a density was carried out by a helium gas substitution pycnometer method using a densimeter AccuPyc 1330-PCW available from Shimadzu Corporation, in a state of the sample being pulverized into a fine powder.

Figure 55:
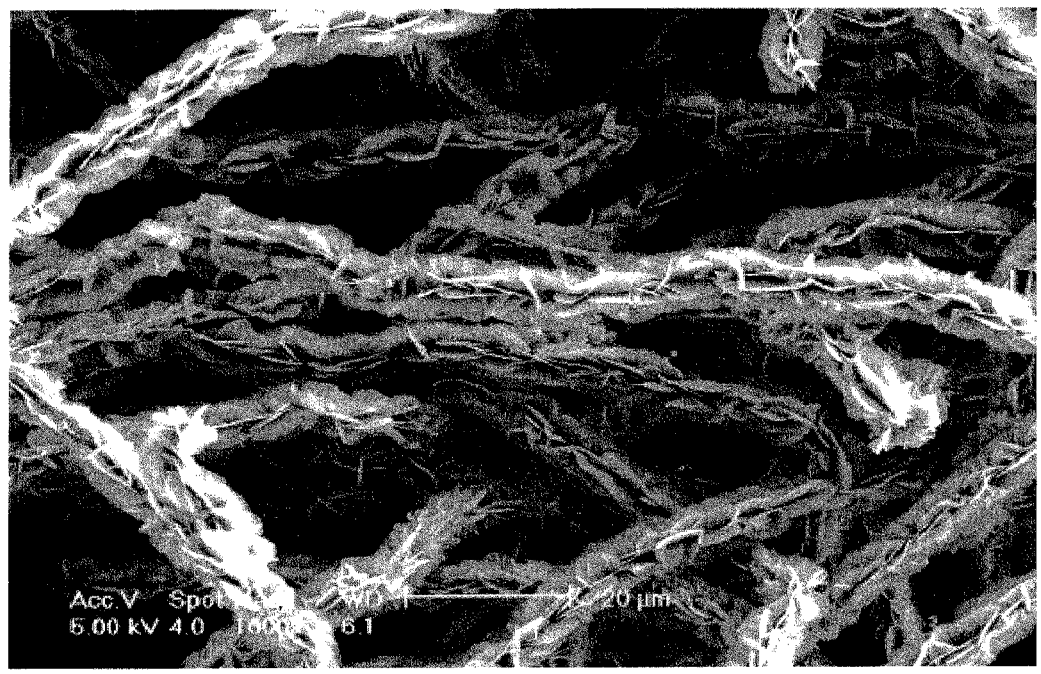
Figure 56:
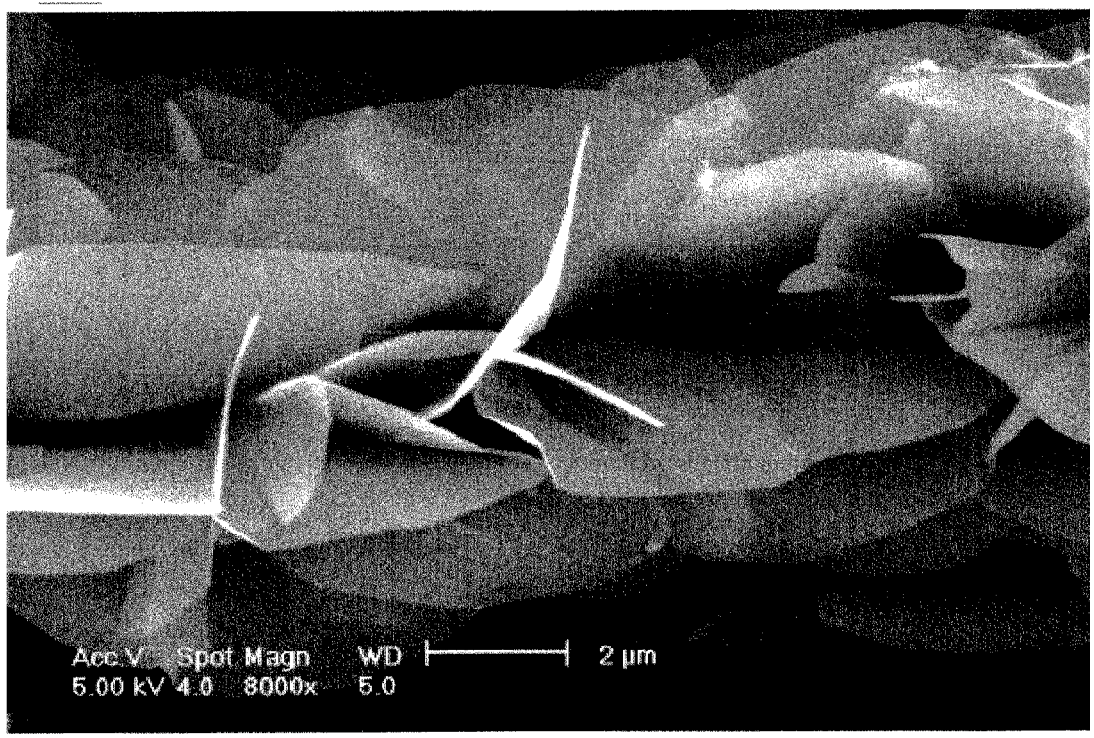

On the treated sample, the products in the same form as in the preceding Example had been formed (FIGS. 55 and 56).

Example 14

Treatment was carried out in the same manner as in the preceding Example except that a maximum ultimate temperature during pre-baking was set to 500° C. and in the HIP treatment, after having reached 700° C., the inside temperature was increased at a temperature elevating rate of 500° C. per hour and a maximum ultimate temperature was set to 1800° C. An apparent density of the treated sample was 1.77, and a true density thereof was 2.07. Measurement of a density was carried out by a helium gas substitution pycnometer method using a densimeter AccuPyc 1330-PCW available from Shimadzu Corporation, in a state of the sample being pulverized into a fine powder.

Figure 57:
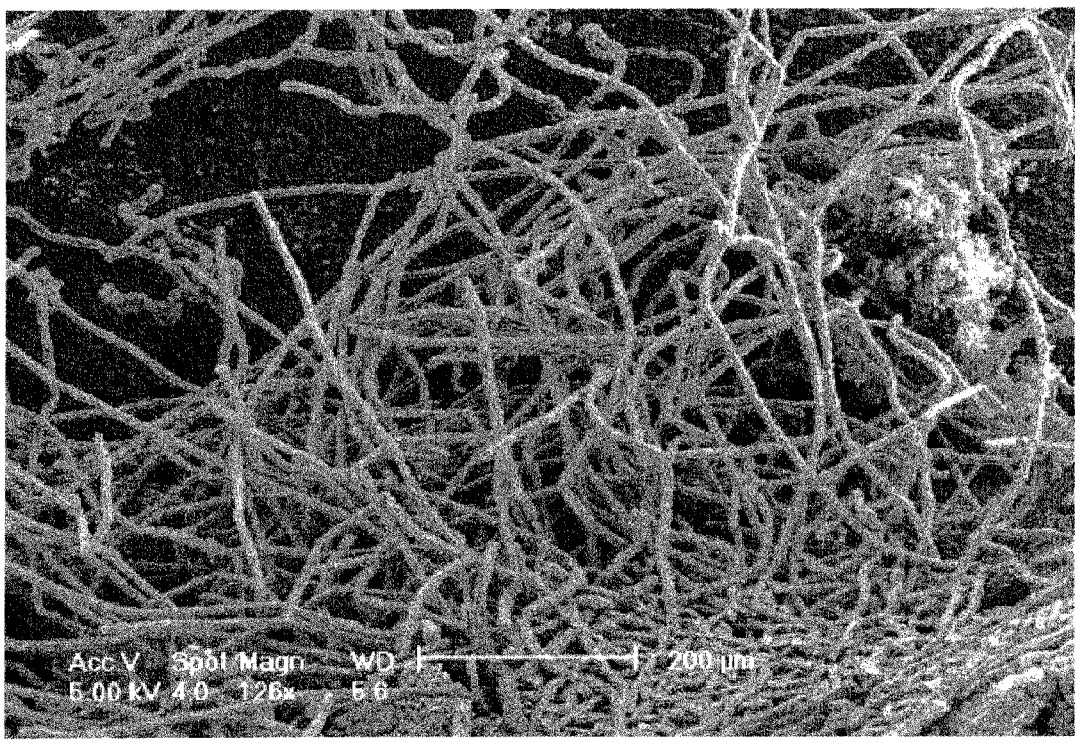
Figure 58:
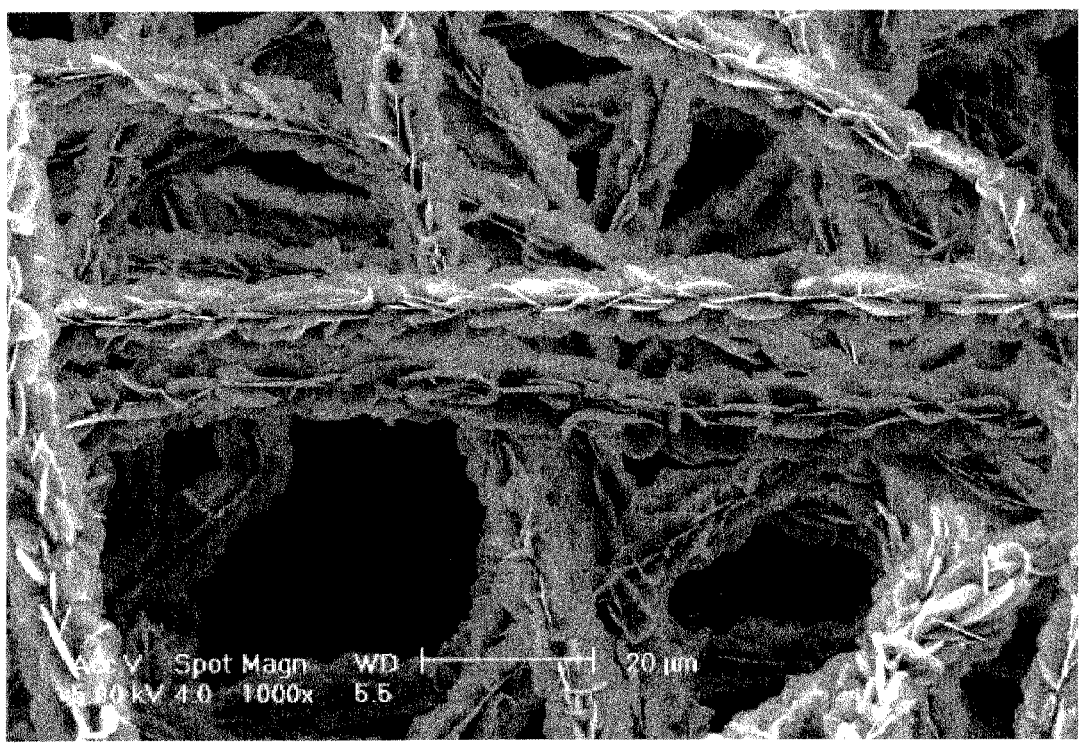

On the treated sample, the products in the same form as in the preceding Example had been formed (FIGS. 57 and 58).

<Graphene-Laminated CNF>

Example 15

A spherical phenol resin was pre-baked at a maximum ultimate temperature of 600° C. in a stream of nitrogen. An amount of hydrogen remaining in the starting material after the pre-baking was measured in accordance with General Rules for Determination of Hydrogen in Metallic Materials (JIS Z 2614: 1990), and the amount was 24000 ppm. Ten liters of methoxyethanol (available from NACALAI TESQUE, INC., purity 99%) was mixed to 1 mol of cobalt acetylacetonate (available from NACALAI TESQUE, INC., special grade, hereinafter referred to as Co(AcAc)2). At the moment, because Co(AcAc) 2 started solidifying just after the mixing, the mixture was sufficiently pulverized and stirred with a glass rod or a stirrer. Thereafter, 100 ml of distilled water were gradually added dropwise quantitatively with a syringe or a micropipette. A precipitate separated out after starting of the addition of distilled water was allowed to stand overnight, and then the solution containing the precipitate was subjected to filtration under reduced pressure using an aspirator with a diaphragm pump, thereby recovering the precipitate only. The obtained precipitate was air-dried in a draft for 24 hours. The cobalt precipitate was subjected to dry blending with the pre-baked starting material so that the cobalt concentration in the starting material to be subjected to HIP treatment would become 5000 ppm assuming that the whole cobalt was separated out in the precipitate (cobalt precipitate). This mixture was charged in a screw type graphite crucible, and the screw of the top cover was tightened to seal the crucible. The sealed graphite crucible containing the starting material was charged in the HIP equipment and was heated up to 1450° C. at a temperature elevating rate of 500° C. per hour while conducting hot isostatic pressing at 190 MPa using argon gas.

A large amount of fibrous carbon was generated on the surface of the treated sample. Graphene-laminated CNF (FIG. 59) having a diameter of from about 200 nm to about 1000 nm and a length of from about 10 μm to about several millimeters existed on the obtained product. A large amount of long fibers was generated on the surface portion of the sample, and short fibers were generated around the spherical phenol resin.

Example 16

A spherical phenol resin was pre-baked at a maximum ultimate temperature of 600° C. in a stream of nitrogen.

Cobalt chloride hexa-hydrate was dissolved in ethanol to prepare a 0.6 mol/liter solution. Then, to 500 ml of this solution was poured 120 g of the pre-baked phenol resin, followed by sufficiently stirring with a stirrer. A residue obtained by filtering ethanol was put in a ceramic vessel and heated in the air in an electric oven at 400° C. over five hours to prepare the pre-baked starting material carrying a catalyst. A cobalt concentration measured by fluorescent X-ray analysis (SEM-EDX) was 3000 ppm. The pre-baked starting material carrying the catalyst was charged in a screw type graphite crucible, and the screw of the top cover was tightened to seal the crucible. The sealed graphite crucible containing the starting material was charged in the HIP equipment and was heated up to 1400° C. at a temperature elevating rate of 300° C. per hour while conducting hot isostatic pressing at 190 MPa using argon gas.

Figure 61:
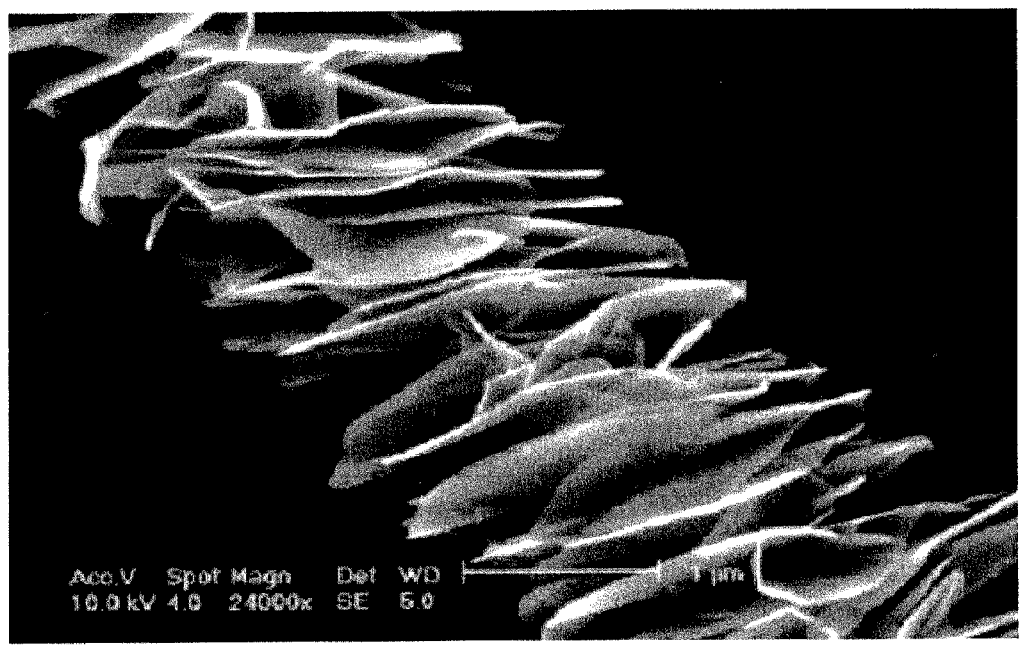

A large amount of graphene-laminated CNF having a diameter of from about 0.5 micron to about several microns was generated in the treated sample. (FIG. 60) A thickness of one layer of the graphene-laminated CNF was about several nanometers. (FIG. 61)

<Cluster of Thin Sheet Graphite Crystals of the Present Invention>

Example 17

Figure 62:
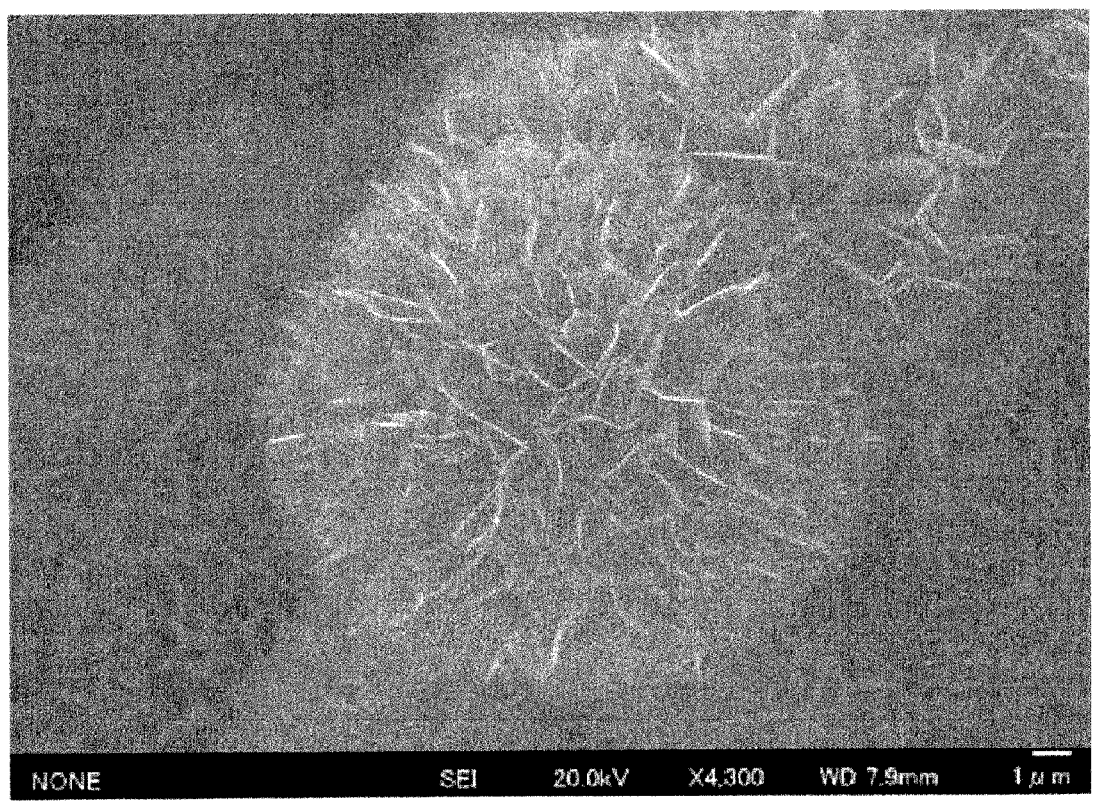
Figure 63:
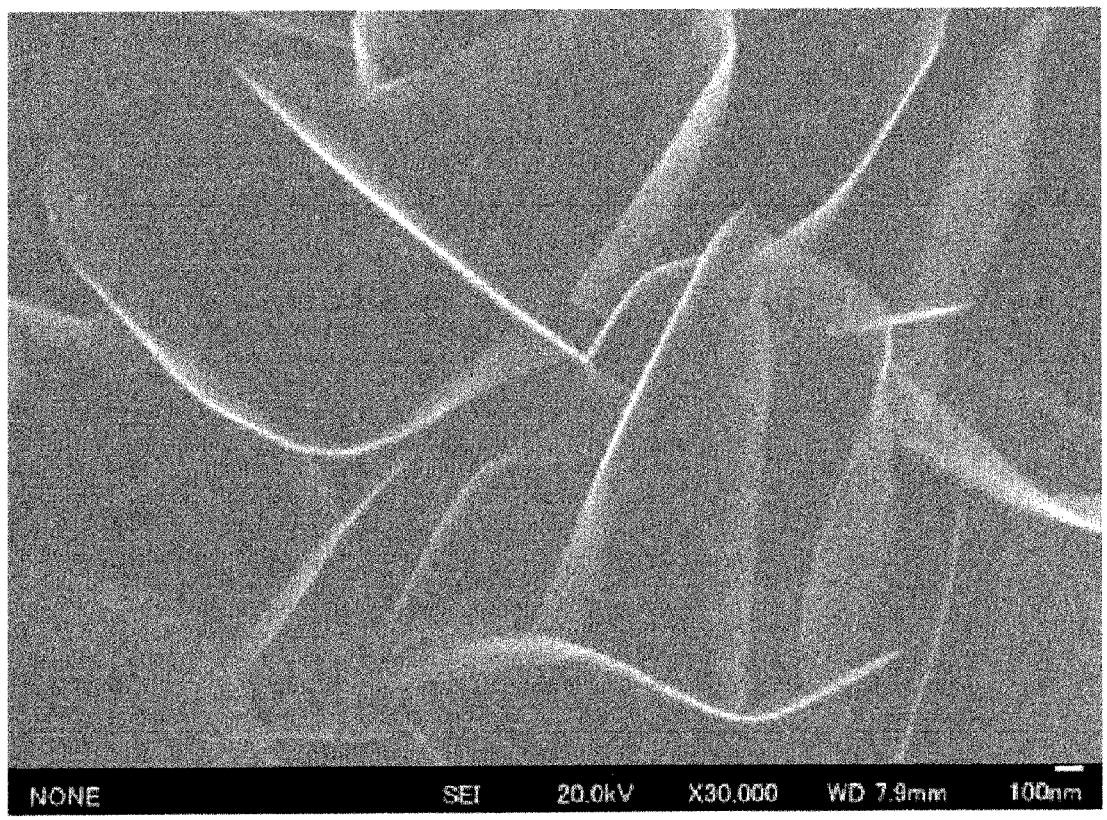

A phenol formaldehyde resin powder having an average particle size of 20 μm was pre-baked at a maximum ultimate temperature of 600° C. under inert gas atmosphere. An amount of hydrogen remaining in the starting material after the pre-baking was measured in accordance with General Rules for Determination of Hydrogen in Metallic Materials (JIS Z 2614: 1990), and the amount was 20000 ppm. The pre-baked starting material was charged in a screw type graphite crucible made of a material having a bulk density of 1.80 and an open pore ratio of 10%, and a screw type top cover was turned to be closed, and thus the crucible containing the pre-baked starting material was sealed. After charging the sealed graphite crucible in hot isostatic pressing equipment, a temperature and pressure inside the equipment were increased to 700° C. and 70 MPa, respectively in one hour using argon gas, and thereafter, heating at a temperature elevating rate of 500° C. per hour and increase in a pressure were continued to reach a maximum ultimate pressure of 190 MPa and a maximum ultimate temperature of 1800° C. Then, the maximum ultimate temperature and pressure were maintained for one hour, and the temperature was reduced to room temperature and the pressure was decreased. A true density of the obtained product in the form of bulk was measured by a helium gas substitution pycnometer method using a densimeter AccuPyc 1330-PCW available from Shimadzu Corporation, and the measured true density was 2.17. An SEM of the obtained vapor-phase-grown graphite is shown in FIG. 62, and an enlarged SEM thereof is shown in FIG. 63. Thin sheet graphite crystals (multi-layer graphene) extending from the inside toward the outside are aggregated to form a cluster.

<Thin Sheet Graphite Crystals and Wrinkled and Shrunk Graphite Crystals Thereof>

Example 18

Figure 65:
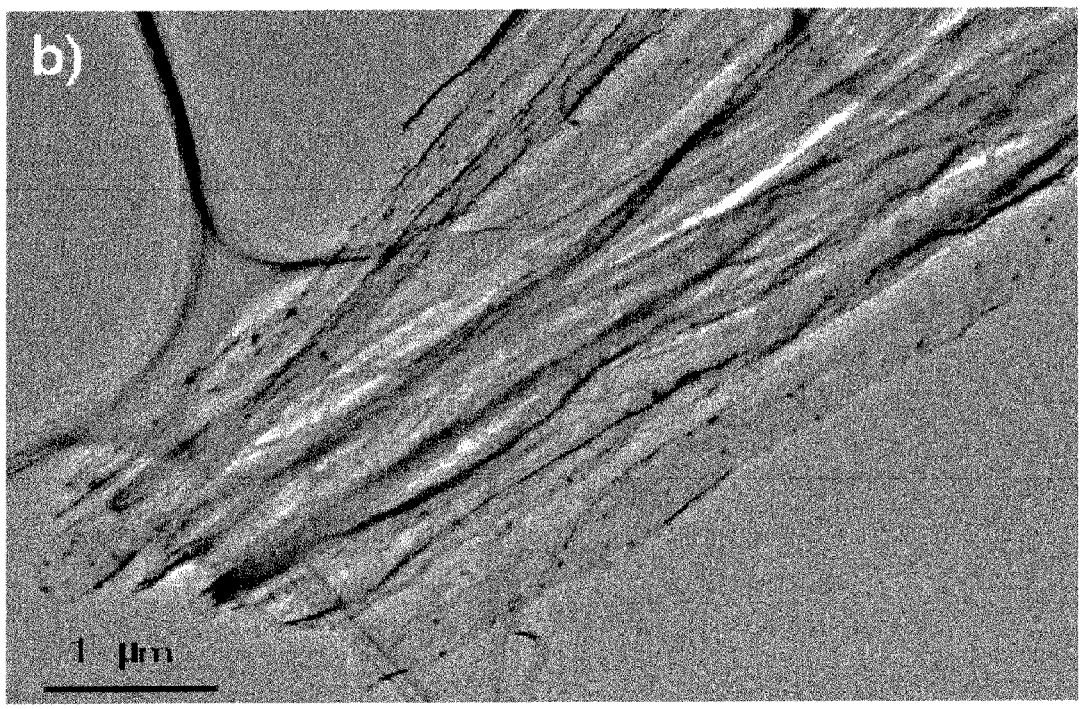
Figure 66:
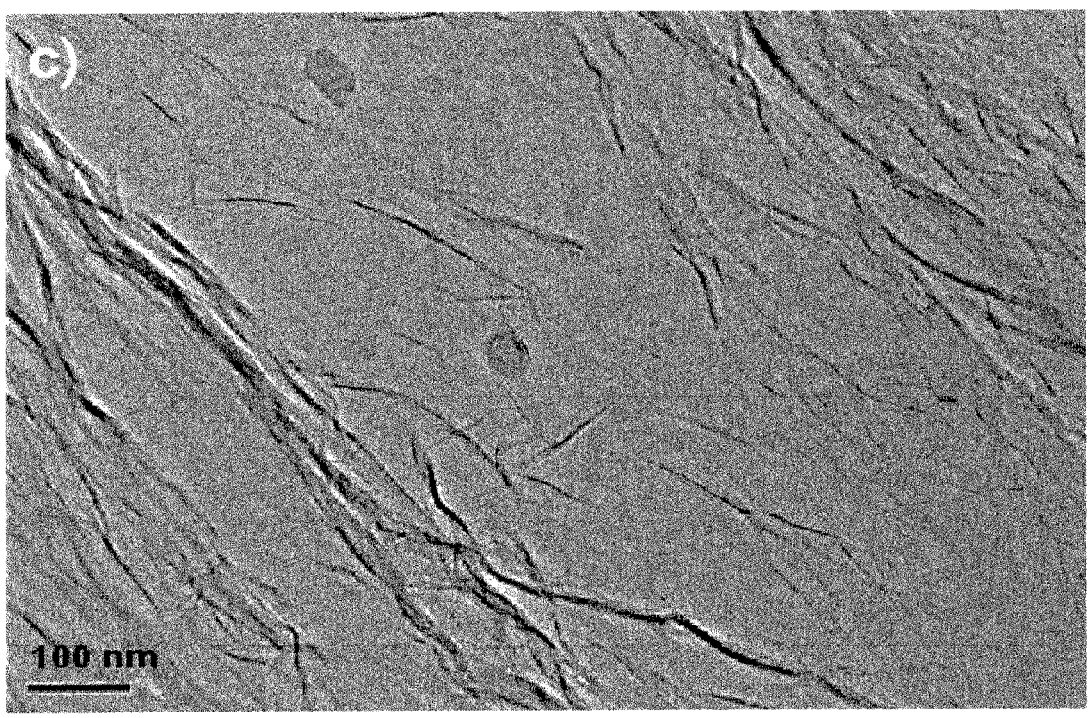
Figure 67:
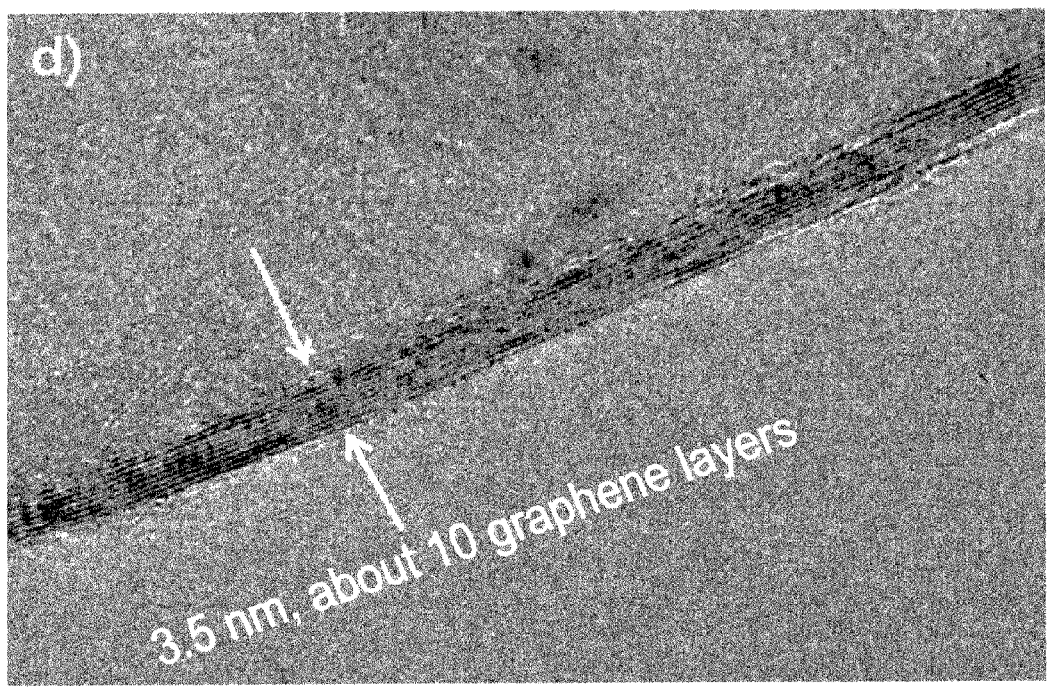

The vapor-phase-grown graphite obtained in the preceding Example was pulverized in an agate mortar, and the pulverized sample was poured into dimethylformamide to prepare a solution containing 5% by weight of graphite. An ultrasonic wave was applied to this solution with an ultrasonic cleaner (at a frequency of 42 kHz for 30 minutes), and then a solid content was settled down by centrifuging (at an acceleration rate of 700 G for 30 minutes). By using a supernatant of the obtained solution, graphene dispersed in the solution was filtrated with a micro grid for TEM observation, and TEM observation of components collected on the micro grid was carried out. As a result of the TEM observation, many wrinkled and shrunk multi-layer graphenes (in the form of reed screen) were observed as shown in FIGS. 64 and 65. Further, many graphenes in the form of thin sheet (thin sheet graphite crystals, i.e. multi-layer graphenes) were observed as shown in FIG. 66. FIG. 67 shows a lattice image by TEM of an edge part of multi-layer graphenes obtained in the form of thin sheet, and a state of graphene layers being laminated in about 10 layers was observed. From this, it was confirmed that a multi-layer graphene laminated sheet having a thickness of 3.5 nm had been obtained.

<Cluster of Graphite Crystals Obtained by Partly Cleaving the Thin Sheet Graphite Crystals of the Cluster of Thin Sheet Graphite Crystals of the Present Invention>

Example 19

Figure 68:
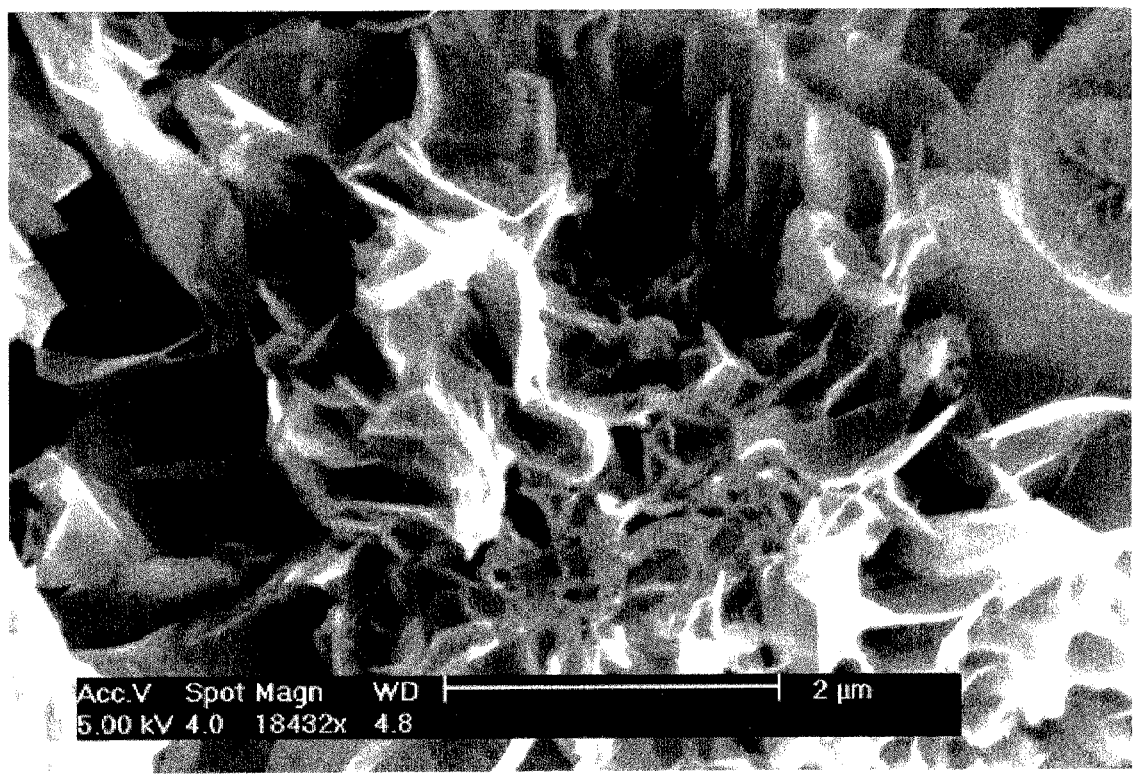
Figure 69:
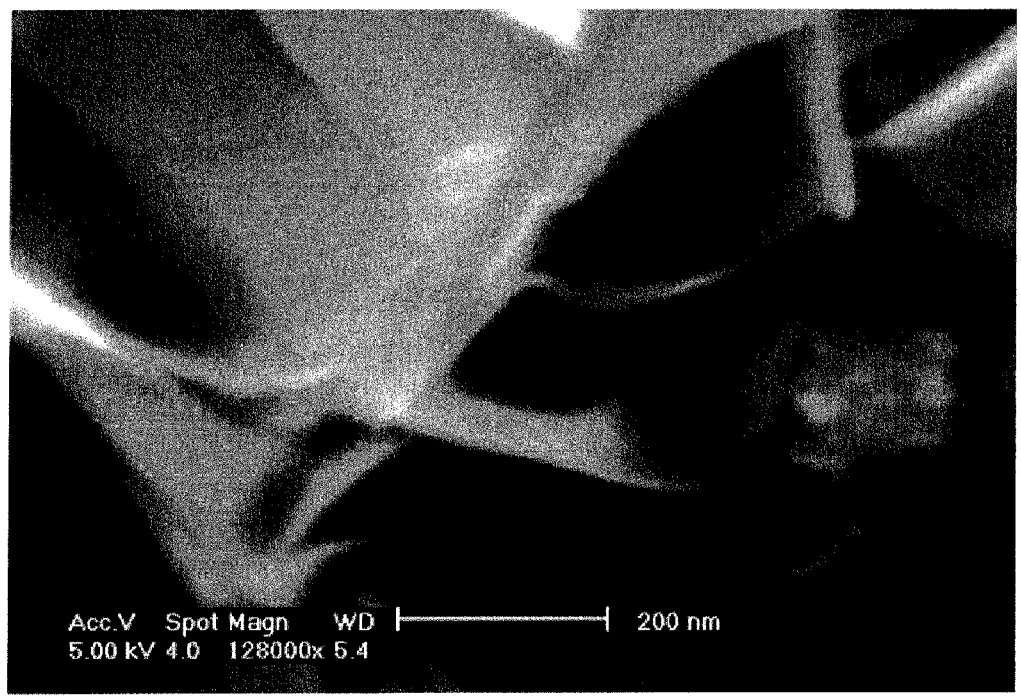

Into an Erlenmeyer flask made of glass was placed 5 g of the cluster of thin sheet graphite crystals of the present invention obtained in Example 1 as Sample No. 2, and a solution mixture containing 80 ml of concentrated sulfuric acid and 20 ml of concentrated nitric acid was added thereto, followed by 24-hour reaction while stirring with a stirrer made of Teflon (registered trademark). In about 30 minutes after the starting of the reaction, the massive sample started collapsing gradually due to generation of a graphite-sulfuric acid intercalation compound in which sulfuric acid ion was intercalated between the graphite layers. After completion of the reaction, the mixture became a dispersion containing fine particles dispersed in the solution. After the reaction, the sample was dried and charged in a magnetic ceramic crucible, and subjected to rapid heat treatment by putting the magnetic crucible containing the sample into an electric oven heated to 700° C. By the rapid heat treatment in the electric oven set to 700° C., the heat-treated sample was expanded to a volume three times as large as the initial volume. FIGS. 68 and 69 show SEM of the heat-treated sample, and it was observed that the multi-layer graphene was in a state of being cleaved into thinner multi-layer graphene due to rapid decomposition and release by heat treatment of sulfuric acid ion from between the multi-layer graphene layers <Cluster of Thin Sheet Graphite Crystals>

Example 20

Figure 70:
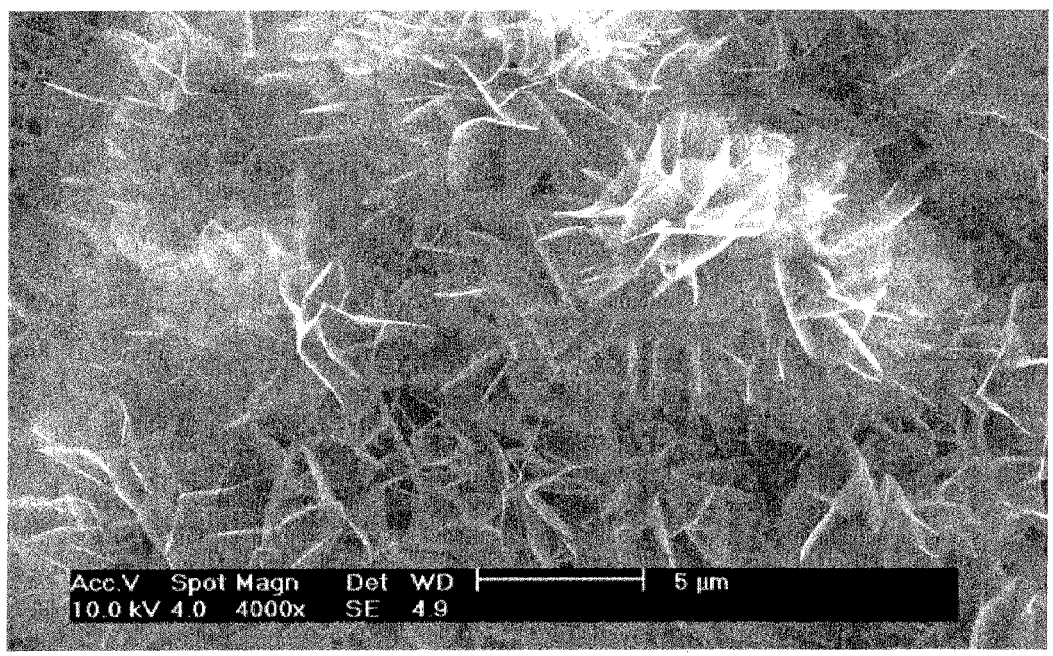

A PET resin (an average particle size of about 3 mm) in the form of pellet was pre-baked at a maximum ultimate temperature of 600° C. under inert gas atmosphere. The starting material after the pre-baking (pre-baked starting material) was pulverized and classified to obtain a pre-baked starting material having an average particle size of from about 10 μm to about 100 μm. An amount of hydrogen remaining therein was 22000 ppm. The pre-baked starting material was charged in a screw type (triangular screw) graphite crucible made of a material having a bulk density of 1.80 and an open pore ratio of 10%, and a screw type top cover was turned to be closed, and thus the crucible containing the pre-baked starting material was sealed. After charging the graphite crucible in hot isostatic pressing equipment, a temperature and pressure inside the equipment were increased to 600° C. and 70 MPa, respectively in one hour using argon gas, and thereafter, heating at a temperature elevating rate of 500° C. per hour and increase in a pressure were continued to reach a maximum ultimate pressure of 190 MPa and a maximum ultimate temperature of 1500° C. Then, the maximum ultimate temperature and pressure were maintained for one hour, and the temperature was reduced to room temperature and the pressure was decreased. The sample obtained after the treatment was a cluster of thin sheet graphite crystals (true density: 2.08, apparent density: 1.33, bulk density: 0.75, total pore ratio: 63.9). An SEM of the obtained cluster of thin sheet graphite crystals is shown in FIG. 70. It is seen that the obtained cluster of thin sheet graphite crystals has a structure comprising many aggregated thin sheet graphite crystals in the form of flower leaf having a size of several microns and an extremely thin thickness.

Example 21

Treatment was carried out in the same manner as in Example 20 except that a phenol formaldehyde resin (an average particle size of 20 μm) was used instead of the PET resin as a starting material, pulverizing and classifying were not carried out, and the treating conditions shown in Table 5 were used, and thereby, each sample was obtained (Example 21-1 to Example 21-6).

TABLE 5

| | Pre-baking | HIP treatment | | |
|---|---|---|---|---|
| Example | temperature ° C. | Pattern for increasing temperature and pressure | Maximum ultimate temperature ° C. | Compressed gas |
| 21-1 | 1000 | Pressure was increased to 140 MPa before temperature reaching 1000° C., and thereafter, temperature was increased at a rate of 500° C./hr. | 2500 | Ar gas |
| 21-2 | 890 | Pressure was increased to 120 MPa before temperature reaching 800° C., and thereafter, temperature was increased at a rate of 500° C./hr. | 2500 | Ar gas |
| 21-3 | 890 | Pressure was increased to 120 MPa before temperature reaching 800° C., and thereafter, temperature was increased at a rate of 500° C./hr. | 2000 | Ar gas |
| 21-4 | 890 | Pressure was increased to 120 MPa before temperature reaching 800° C., and thereafter, temperature was increased at a rate of 500° C./hr. | 2000 | $N_2$ gas |
| 21-5 | 890 | Pressure was increased to 120 MPa before temperature reaching 800° C., and thereafter, temperature was increased at a rate of 500° C./hr. | 1800 | Ar gas |
| 21-6 | 600 | Pressure was increased to 120 MPa before temperature reaching 600° C., and thereafter, temperature was increased at a rate of 500° C./hr. | 1800 | Ar gas |

A true density, an apparent density, a bulk density and a total pore ratio of each of the thus obtained sample are shown in Table 6.

TABLE 6

| Example | True density g/cm³ | Apparent density g/cm³ | Bulk density g/cm³ | Total pore ratio % |
|---|---|---|---|---|
| 21-1 | 1.73 | 1.68 | 1.15 | 33.5 |
| 21-2 | 1.84 | 1.73 | 1.05 | 42.9 |
| 21-3 | 1.88 | 1.61 | 1.10 | 41.5 |
| 21-4 | 1.93 | 1.82 | 0.99 | 48.7 |
| 21-5 | 2.04 | 1.85 | 0.97 | 52.5 |
| 21-6 | 2.16 | 1.21 | 0.70 | 67.6 |

Industrial Applicability

The present invention makes it possible to provide a cluster of thin sheet graphite crystals composed of aggregates in such a state that thin sheet graphite crystals extend from the inside toward the outside, a nano-silicon material of one-dimensional shape, and a graphite-silicon composite material comprising the thin sheet graphite crystals and the nano-silicon material of one-dimensional shape. Any of them are useful as electrode materials for lithium ion batteries and hybrid capacitors and heat-releasing materials, and any of the production methods thereof are efficient and highly productive.

Moreover, the present invention provides thin sheet graphite crystals and/or wrinkled and shrunk graphite crystals thereof and/or roll-shaped graphite crystals thereof, which are useful as a transparent conductive film, a conductive film, a heat-conductive film and an adding material therefor.

Explanation Of Symbols

1 Cover of crucible
1*a* Peripheral portion of cover of crucible
2 Crucible body
2*a* Inner wall of top of crucible body
3 Pre-baked starting material
4 Spacer
5 Sleeve
6 Particles of pre-baked starting material
6*a* Gas
6*s* Surface of particles of pre-baked starting material
7 Vapor-phase-grown graphite
7*a* In-plane direction of graphite hexagonal planes (direction of "a" axis of graphite crystal)
7*c* Direction of "c" axis of graphite crystal

The invention claimed is:
1. A method for producing a cluster of thin sheet graphite crystals composed of aggregates in such a state that thin sheet graphite crystals extend from the inside toward the outside, comprising:

preparing a powdery and/or particulate material of an organic compound pre-baked to an extent of containing remaining hydrogen, charging the powdery and/or particulate material in a closed vessel made of a heat resistant material, and subjecting the powdery and/or particulate material together with the vessel to hot isostatic pressing treatment using a compressed gas atmosphere, wherein, a pre-baking temperature is 1000° C. or lower, a maximum temperature in the hot isostatic pressing treatment is 900° C. or more and lower than 2000° C., and the maximum temperature in the hot isostatic pressing treatment is higher than the pre-baking temperature, wherein a diameter or a width of the thin sheet graphite crystals is from 0.1 μm to 500 μm.

2. The production method of claim 1, wherein the closed vessel made of a heat resistant material is of triangular screw type having an open pore ratio of less than 20%.

3. The production method of claim 1, wherein hot isostatic pressing treatment is carried out in such a state that a part or the whole of periphery of the pre-baked powdery and/or particulate material of an organic compound charged in the closed vessel made of a heat resistant material is covered with a spacer and a sleeve.

4. The production method of claim 1, wherein one or more carbon materials selected from the group consisting of carbon fiber, natural graphite, artificial graphite, glassy carbon and amorphous carbon are mixed to the pre-baked powdery and/or particulate material of an organic compound.

5. A method for producing a cluster of graphite crystals, in which the thin sheet graphite crystals are partly cleaved, comprising preparing an intercalation compound of graphite composed of, as a host material, the cluster of thin sheet graphite crystals produced by the method of claim 1, and subjecting the intercalation compound to rapid heating.

6. A method for producing a graphite-silicon composite material, comprising a cluster of thin sheet graphite crystals composed of aggregates in such a state that thin sheet graphite crystals extend from the inside toward the outside and a nano-silicon material of one-dimensional shape, the method comprises:

preparing a powdery and/or particulate material of an organic compound pre-baked to an extent of containing remaining hydrogen, mixing a silicon powder thereto, charging the mixture in a closed vessel made of a heat resistant material, and subjecting the mixture together with the vessel to hot isostatic pressing treatment using a compressed gas atmosphere, wherein, a pre-baking temperature is 1000° C. or lower, a maximum temperature in the hot isostatic pressing treatment is 1320° C. or more and lower than 2000° C., and the maximum temperature in the hot isostatic pressing treatment is higher than the pre-baking temperature, wherein a diameter or a width of the thin sheet graphite crystals is from 0.1 μm to 500 μm.

7. The production method of claims 6, wherein the silicon powder is one having a particle size of less than 500 μm.

* * * * *